United States Patent [19]
Kuzumoto et al.

[11] Patent Number: 5,479,428
[45] Date of Patent: Dec. 26, 1995

[54] LASER APPARATUS

[75] Inventors: Masaki Kuzumoto; Yushi Takenaka; Junichi Nishimae; Kenji Yoshizawa; Takashi Yamamoto, all of Hyogo, Japan

[73] Assignee: Mitsubishi Denki Kabushiki Kaisha, Tokyo, Japan

[21] Appl. No.: 339,234

[22] Filed: Nov. 10, 1994

Related U.S. Application Data

[62] Division of Ser. No. 7,231, Jan. 21, 1993, Pat. No. 5,373,528.

[30] Foreign Application Priority Data

Jan. 22, 1992 [JP] Japan .................................. 4-009076
Oct. 23, 1992 [JP] Japan .................................. 4-307858

[51] Int. Cl.⁶ ...................................................... H01S 3/03
[52] U.S. Cl. ........................ 372/61; 372/35; 372/64; 372/87
[58] Field of Search ............................. 372/61, 64, 87, 372/88, 35

[56] References Cited

U.S. PATENT DOCUMENTS

| | | | |
|---|---|---|---|
| 4,719,639 | 1/1988 | Tulip | 372/66 |
| 4,939,738 | 7/1990 | Opower | 372/95 |
| 5,048,048 | 9/1991 | Nishimae et al. | 372/95 |
| 5,140,606 | 8/1992 | Yarborough et al. | 372/87 |
| 5,172,389 | 12/1992 | Horiuchi et al. | 372/87 |
| 5,220,576 | 6/1993 | Krueger et al. | 372/87 |
| 5,379,316 | 1/1995 | Karabe et al. | 372/61 |

FOREIGN PATENT DOCUMENTS 0392485  10/1990  Germany .

OTHER PUBLICATIONS

R. Nowack et al., "High Power $CO_2$ Waveguide Laser of the 1 kW Category", *SPIE Proceedings*, vol. 1276, Mar. 1990, pp. 18 and 19.

*Primary Examiner*—James W. Davie
*Attorney, Agent, or Firm*—Burns, Doane, Swecker & Mathis

[57] ABSTRACT

According to the present invention there is provided a laser apparatus capable of efficient oscillation with an excitation power source with comparatively low frequency, wherein discharge is obliquely generated within the rectangular section of a discharge space. There is also provided a laser apparatus with a pair of preliminary discharge excitation electrodes which can readily initiate discharge. There is further provided a laser apparatus capable of efficient oscillation with an excitation power source with comparatively low frequency, wherein provided is a pair of discharge excitation electrodes located in the major side direction of discharge space whose length is more than three times as long as that of minor side direction thereof. There is further provided a laser apparatus with a pair of discharge excitation electrodes whose dimension is smaller than that of a pair of dielectric plates, which apparatus can prevent undesirable discharge. There is also provided a laser apparatus with more than three discharge spaces at least one of which is given a lower electric field having the apparatus oscillate efficiently. There is further provided a laser apparatus with an improved oscillation efficiency wherein furnished are dielectric double pipes creating a substantially large discharge space.

11 Claims, 46 Drawing Sheets

MAJOR SIDE DIRECTION

MINOR SIDE DIRECTION

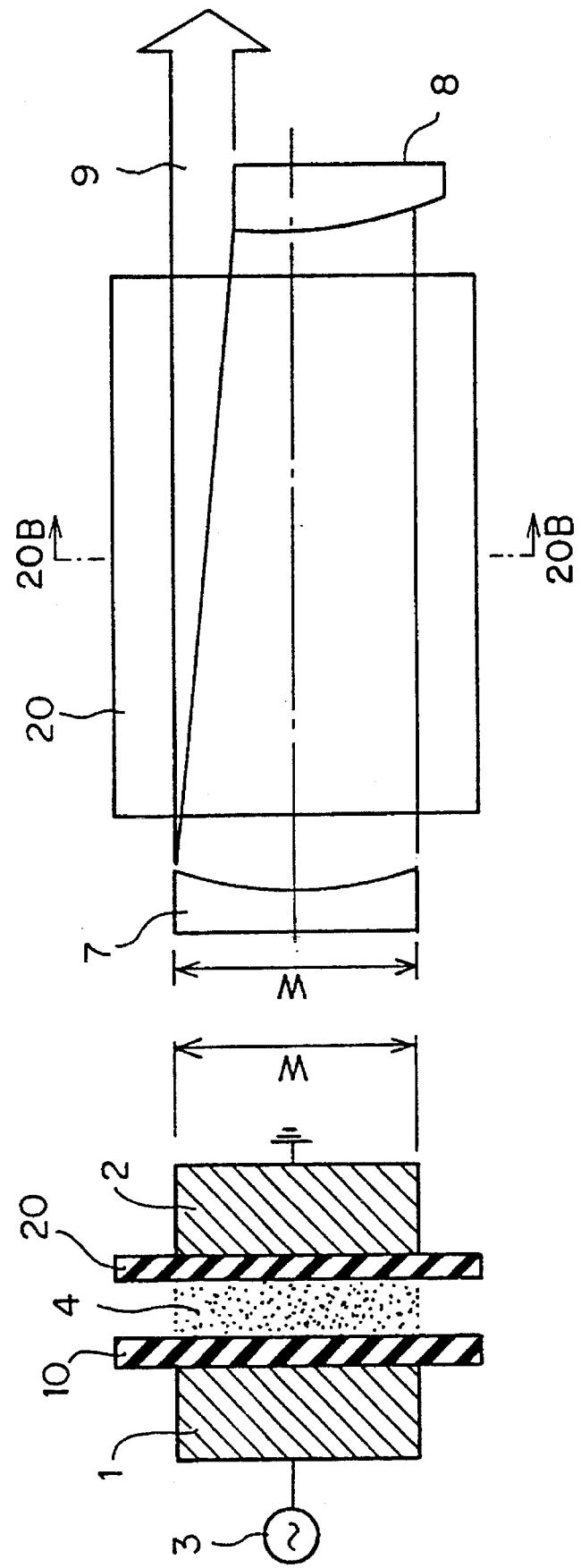

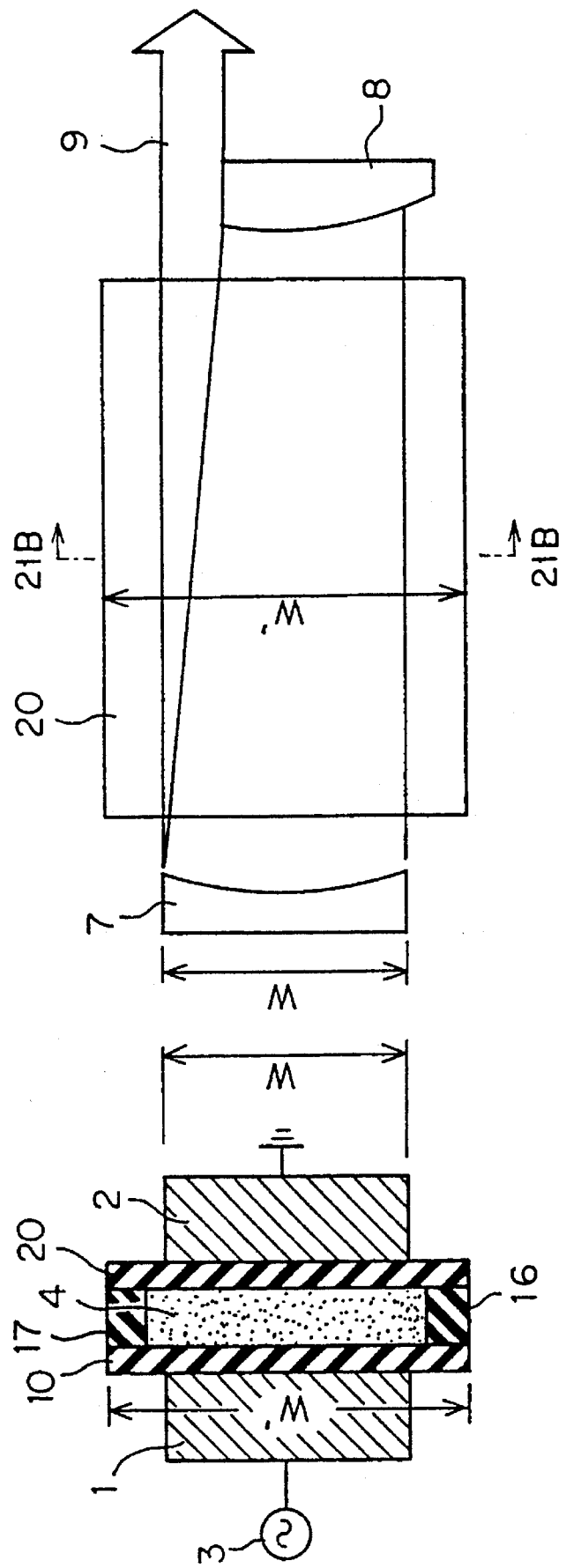

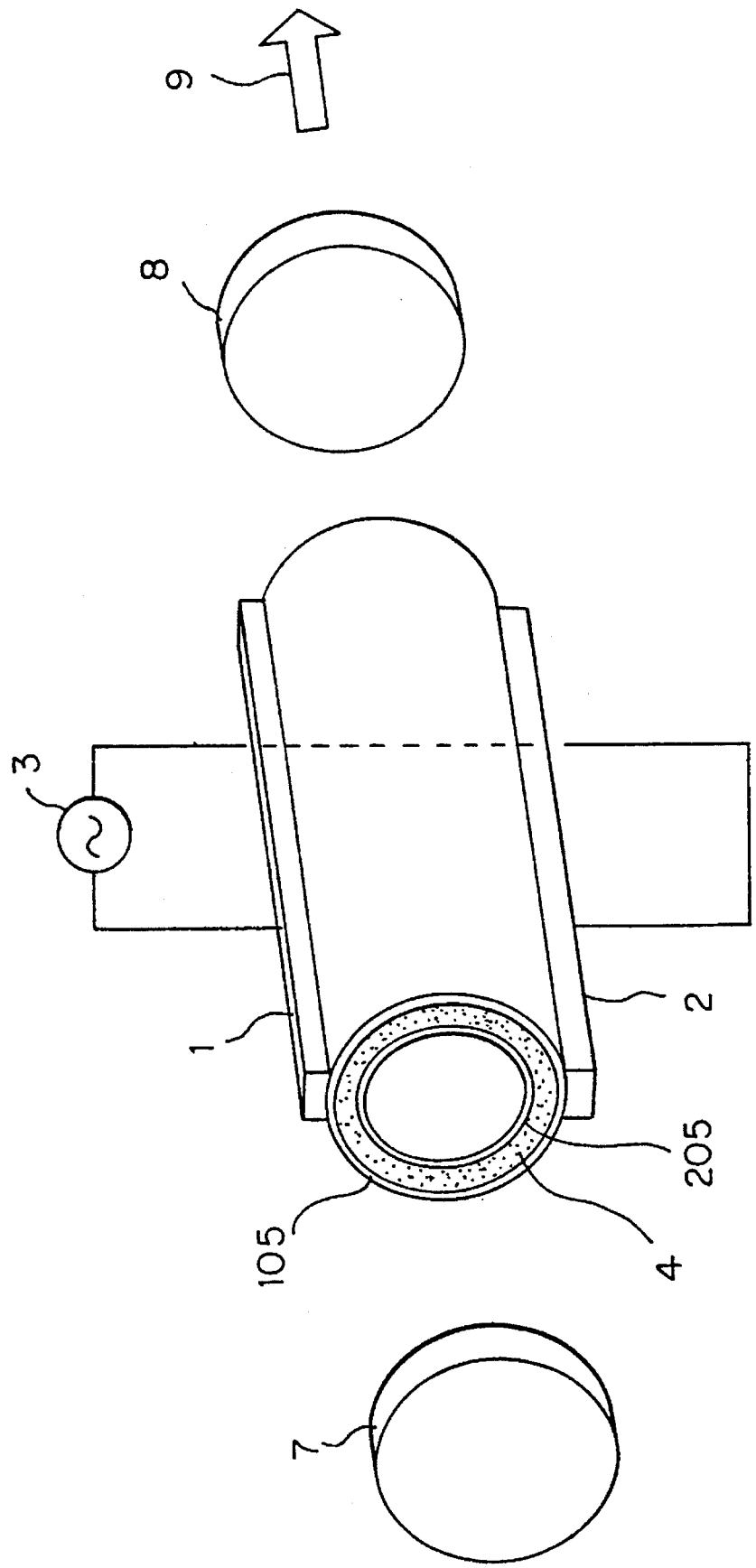

LASER APPARATUS

This application is a divisional of application Ser. No. 08/007,231, filed Jan. 21, 1993 now U.S. Pat. No. 5,373,528.

BACKGROUND OF THE INVENTION

1. Field of the Invention

This invention relates to a gas laser apparatus which is improved in oscillation efficiency.

2. Prior Art

FIG. 69 is a perspective view showing a conventional carbon dioxide laser apparatus of the wave guide type disclosed, for example, in R. Nowack et al., "High Power $CO_2$ Wave Guide Laser of the 1 kW Category", SPIE (Society of Photooptical Instrumentation Engineers), Vol. 1276, Proceedings, "$CO_2$ Lasers and Application" (1990), pp. 18–28, FIG. 1. Referring to FIG. 69, reference numerals 1 and 2 each denote a discharge exciting metal electrode. Reference numeral 3 denotes an excitation power source (radio frequency power source here) connected to the metal electrode 1. Reference numerals 10 and 20 denote dielectric plates made of, for example, ceramics. The dielectric plates 10, 20 are opposite to each other and held in close contact with the metal electrodes 1 and 2, respectively. Reference numeral 4 denotes a discharge space (filled with mixture gas of $CO_2$—He—$N_2$ which serves as a laser medium) defined between the dielectric plates 10 and 20. Reference numerals 5 and 6 denote arrow marks indicating the directions of coming in and going out of electrode cooling water to and from the electrodes, respectively. Reference numeral 7 denotes a total reflection mirror (resonator mirror). Reference 8 denotes output coupler (resonator mirror). Reference numeral 9 denotes a laser beam, and reference characters 21a and 21b denote inlet and outlet ports, respectively, for electrode cooling water provided at the electrode 1 (similar inlet and outlet ports (not shown) for electrode cooling water are provided also at the electrode 2).

Subsequently, the operation of the apparatus will be described. When the metal electrode 1 is connected to the RF power source 3 and the other metal electrode 2 is connected to the ground, the RF discharge for exciting the laser is caused in the discharge space 4 filled with the mixture gas described above. Thus, the discharge energy is converted into light energy by an optical resonator constituted of the total reflection mirror 7 and the output coupler 8 and is outputted as a laser beam 9 from the output coupler 8.

In a carbon dioxide gas laser, since the energy level at a low level of the laser is low, as the temperature of the gas rises, the low level concentration increases and the laser oscillation efficiency drops. Consequently, the cooling capacity of the laser gas makes a great factor which determines the laser oscillation efficiency. The ratio w/d between the major side (length w) and the minor side (gap length d) of a section of the rectangular discharge space 4 is called aspect ratio, and from the point of view of cooling of the gas serving as a laser medium, it is deduced that, when the aspect ratio is equal, the cooling capacity is similar.

In particular, when the same power is thrown in, if the aspect ratio is equal, then the temperature of the gas is equal. Accordingly, in order to throw in a high power and cool the gas sufficiently to raise the laser oscillation efficiency, the aspect ratio should be set to a high value. In addition, for laser oscillation for which a high power density is required, the minor side d should be set to a small value.

The cooling capacity for gas with respect to the length d of the minor side of the section of the rectangular discharge space 4 is shown in FIG. 70. In FIG. 70, a solid line indicates a power density at which the temperature of the gas is 250° C. where the composition of the gas is He—$N_2$—$CO_2$=80—10—10 (%; rate in volume, molar fraction). It can be seen from FIG. 70 that the cooling capacity for the gas rises as the minor side d decreases.

On the other hand, when the minor side (gap length) d is set to be short, the loss a in the propagation process of the laser light increases. The propagation loss a of the $EH_{nm}$ mode in the rectangular wave guide can be represented by the following formula.

$$a = \frac{u_{nm}^2}{2\pi} \frac{\lambda^2}{(d/2)^2} \frac{\frac{1}{2}(v^2+1)}{\sqrt{v^2-1}} \quad (1)$$

$$v = \sqrt{\epsilon/\epsilon_0} \quad (2)$$

wherein ∥ represents the laser wavelength; $\epsilon$ and $\epsilon_0$ represent the permitivity with respect to the laser wavelength and the dielectric constant in vacuum ($0.8854 \times 10^{-11}$ $CV^{-1}m^{-1}$); and $u_{nm}$ represents the coefficient with respect to the order of each mode.

FIG. 71 shows the result obtained by calculating, from the above formulae, the relationship between the gap length d and the propagation loss a where $Al_2O_3$ (alumina) is used for a dielectric material and a wavelength (10.6 μm) of a carbon dioxide laser is used as a laser wavelength. As a result, the propagation loss a increases in proportion to the gap length $d^{-3}$.

The normal wave guide type carbon dioxide gas laser apparatus is often used in the range of $1.5 \leq d \leq 2.5$ (mm) in consideration of the cooling capacity of gas and the propagation loss of light. Due to the high output, when the length of the dielectric is long, the propagation loss naturally increases. Therefore, it is necessary to increase the gap length d to provide a higher output.

FIG. 72 shows a result of an examination of the influence of the power source frequency of the RF power source 3 upon the output of the carbon dioxide gas laser in the condition of the gap length d=2 mm. It is confirmed that, as the power source frequency increases, the laser output increases dramatically. The reason is given below.

FIG. 73 shows a result of calculation of the electric field distribution in the direction of the gap d varying the frequency of the power source in the condition of the gas pressure of 80 Torr. In FIG. 73, reference character Z denotes a distance in the electric field direction, and Z=0 represents the center of the gap while Z=1.0 (mm) represents a boundary to a dielectric plate. As apparent from FIG. 73, it can be confirmed that, as the power source frequency increases, the region in which the electric field is high decreases while the low electric field region which is suitable for laser oscillation increases. Accordingly, if the power source frequency is raised, the low electric field region increases and the excitation efficiency of the laser rises as seen in FIG. 73.

This variation of the electric field distribution can be explained from a discharge maintaining mechanism. The discharge maintaining mechanism is roughly explained from the relationship between the travel time $t_e$ of electrons through the gap d and the half period $t_s$ of the power source. In particular, in such a case that electrons drifting toward the anode collide with the anode (electrode), since the number of electrons and loss of energy are high, the electric field must provide the energy which compensates for the loss. Accordingly, the high electric field region becomes wide. This corresponds to the case wherein the half period $t_s$ of the power source is longer than the gap travel time $t_e$ of electrons. On the contrary when the variation of the electric field (half period $t_s$ of the power source) is shorter than the travel time $t_e$ of electrons, the polarity of the electrode is reversed (to the negative) before electrons drifting toward the anode arrive at the anode, and consequently, the electrons are urged back and will not collide with the electrode wall. Accordingly, in this instance, the loss in the number of electrons and the energy loss are small and the high electric field region may be made narrow.

Although it may be different depending upon conditions, in the conditions calculated in connection with FIG. 72, since the drifting speed of electrons is almost $10^7$ cm/s, the gap travel time $t_e$ is 0.2 cm (2 mm)/$10^7$ cm/s=$2\times10^{-8}$ sec. The critical frequency at which the time $t_e$ corresponds to one half period of the RF power source 3 is 100 MHz. Accordingly, when the frequency of the RF power source is lower than 100 MHz, the high electric field region becomes wide as shown in FIG. 73 and the lower excitation efficiency drops as shown in FIG. 72.

By the way, the conventional carbon dioxide gas laser apparatus shown in FIG. 69 employs a hybrid resonator in order to generate a laser beam of high convergency from the rectangular discharge space 4. In particular, the hybrid resonator operates, in the direction of the minor side d of the rectangular discharge space 4, as a wave guide resonator in which laser light propagates while being reflected by the dielectric plates 10 and 20, and operates, in the direction of the major side, as an unstable resonator (a resonator of the type in which light is not enclosed completely).

In the case where a wave guide is employed resonator, if the distance ($L_{wm}$) between an end of a wave guide (dielectric plates 10 and 20) and a resonator mirror (reflecting mirror 7 and output coupler 8) is set to a great value, then the rate at which light escapes from the resonator becomes high, and consequently, the output efficiency of a laser beam drops. It is known that the loss by escapement of light increases in proportion to $(L_{wm})^{3/2}$. Thus, for example, in the conditions of the wave length of 10.6 μm ($CO_2$ laser) and the gap length of d=2 mm, in order to suppress the loss of light low, it is necessary to set $L_{wm}$ to a small value of 10 mm or so.

Accordingly, when the applied voltage is raised in order to increase the discharge power, not only the discharge occurs in the main discharge space 4, but also the discharge 41 toward the output coupler 8 occurs as seen in FIG. 74. In this instance, if the discharge occurs toward the output coupler 8, then the energy thrown in to the main discharge space 4 decreases and the laser excitation efficiency drops as seen from FIG. 75. (In FIG. 75, a point Ps denotes a discharge start power to the mirror.)

Further, if corners of the dielectric plates 10 and 20 are present in the proximity of end portions of the metal electrodes 1 and 2, then when the applied voltage rises, the electric field strengths at the corners of the dielectric plates 10 and 20 become high as seen in FIG. 76, and the discharge 42 is liable to be concentrated also at locations around the corners.

Since the conventional laser apparatus is constructed as described above, in the case where the length of the dielectric is desired to be longer in order to obtain a high output wave guide type laser, it is required to set the gap length d to be short in view of cooling whereas it is required to set the gap length d to be long in view of propagation loss of light. This is exactly a contradictory requirement, which is impossible to realize.

Further, if the permitivity ε with respect to the laser wavelength is set to be small from the above-described formulae (1) and (2), the propagation loss a is expected to be reduced. Actually, however, a material having a low permitivity is difficult to be sintered, often making it impossible to manufacture.

As will be described later, the dielectric used in this system is not only required to have a nature as a wave guide path surface but also to have a function as a capacitor for discharge such as a withstand voltage. For this reason, materials which satisfy with these conditions have been extremely restricted.

Further, in the case of the conventional $CO_2$ laser apparatus, the optimal frequency in the laser excitation is in the vicinity of 150 MHz. However, since this frequency is limited for use thereof under the Japanese Radio-wave Law, there remains a great problem in the case of providing a general-purpose apparatus. Moreover, such an RF power source is expensive, and matching between the RF power source and a laser load is difficult. There are many problems as described.

Consequently, the conventional gas laser apparatus further has a problem that, if the applied voltage is raised in order to increase the discharge power, then not only does the discharge occur in the main discharge space but also discharge 41 toward the resonator mirror and discharge 42 concentrated at the corners of the dielectric plates occur, which deteriorates the stability of the laser apparatus.

SUMMARY OF THE INVENTION

The present invention has been made to eliminate such problems as described above, and it is a principal object of the present invention to provide a laser apparatus which can excite the laser readily at a high efficiency even in a frequency region approved, for example, by the radio wave law of Japan or in a low frequency region in which a countermeasure against radio wave leakage is easy.

It is another object of the present invention to provide a laser apparatus which can start the discharge smoothly.

It is a further object of the present invention to provide a stabilized laser apparatus which can suppress the discharge to an optical resonator mirror even upon application of a high voltage and concentration of the discharge at a corner portion of a dielectric.

It is a still another object of the present invention to provide a laser apparatus which can minimize the light absorbing effect in a non-excited and non-cooled space so that a laser can be outputted at a high efficiency even in a high output region.

It is another object of the present invention to provide a laser apparatus wherein laser light exciting spaces are formed and means is provided to solidly turn back laser beams such as a prism, a holding mirror and so forth, whereby when the laser light exciting spaces are connected in series, the equal effects are obtained and the apparatus can be miniaturized and provided at less cost.

It is another object of the present invention to provide a high-output laser apparatus which can minimize the propagation loss of light while being satisfied with the conditions for discharge.

According to a first aspect of the present invention, there is provided a laser apparatus comprising a discharge space for laser excitation having a rectangular section of which ratio between a major side and a minor side is 3 or more and removing a laser beam in the direction intersecting perpendicularly to said rectangular section of said discharge space, characterized in that the discharge is generated obliquely within the rectangular section of said discharge space.

According to a second aspect of the present invention, there is provided a laser apparatus comprising a discharge space for laser excitation having a rectangular section of which ratio between a major side and a minor side is 3 or more and removing a laser beam in the direction intersecting perpendicularly to said rectangular section of said discharge space, characterized in that the discharge is generated obliquely with respect to the direction of an optical axis intersecting perpendicularly to said rectangular section within said discharge space.

According to a third aspect of the present invention, there is provided a laser apparatus comprising a discharge space for laser excitation having a rectangular section of which ratio between a major side and a minor side is 3 or more, removing a laser beam in the direction intersecting perpendicularly to said rectangular section of said discharge space, and generating a hot flow in the direction of the minor side of said rectangular section to cool gas, characterized in that a plurality of electrodes for discharge excitation are provided.

According to a fourth aspect of the present invention, there is provided a laser apparatus comprising a discharge space for laser excitation having a rectangular section of which ratio between a major side and a minor side is 3 or more, and removing a laser beam in the direction intersecting perpendicularly to said rectangular section of said discharge space, characterized in that a hot flow is generated in the direction of the minor side of said rectangular section to cool gas, and a discharge is generated in the direction of the major side of said rectangular section.

According to a fifth aspect of the present invention, there is provided a laser apparatus producing a discharge at a doughnut-like annular section surrounded by an outer pipe and an inner pipe coaxially disposed, an inner periphery of said outer pipe and an outer periphery of said inner pipe being utilized as wave guide paths for a laser beam, and removing a laser beam in the direction intersecting perpendicularly to said annular section, characterized in that said outer pipe is formed from a dielectric, and two or more electrodes for applying an alternating voltage are disposed in the outer periphery of said outer pipe.

According to a sixth aspect of the present invention, there is provided a laser apparatus producing a discharge at a doughnut-like annular section surrounded by an outer pipe and an inner pipe coaxially disposed, an inner periphery of said outer pipe and an outer periphery of an inner pipe being utilized as wave guide paths for a laser beam, and removing a laser beam in the direction intersecting perpendicularly to said annular section, characterized in that said outer pipe is formed from a dielectric, and two or more electrodes for applying an alternating voltage are juxtaposed in the direction of emitting said laser beam in the outer periphery of said outer pipe.

According to a seventh aspect of the present invention, there is provided a laser apparatus comprising a discharge space for laser excitation having a rectangular section of which ratio between a major side and a minor side is 3 or more, and removing a laser beam in the direction intersecting perpendicularly to said rectangular section of said discharge space, characterized in that a hot flow is generated in the direction of the minor side of said rectangular section, and gas cooling means is provided to cool a laser gas in a non-discharge portion through which said laser beam passes.

According to an eighth aspect of the present invention, there is provided a laser apparatus comprising a discharge space for laser excitation having a rectangular section of which ratio between a minor side and a major side is 3 or more, and removing a laser beam in the direction intersecting perpendicularly to said rectangular section of said discharge space, characterized in that a metal electrode is set to be shorter than a dielectric plate used as a reflection surface for a laser light, and a cooling pipe having a cooling function is disposed between a resonator mirror and the metal electrode in a state where the cooling pipe is electrically floated or grounded.

According to a ninth aspect of the present invention, there is provided a laser apparatus comprising a discharge space for laser excitation having a rectangular section of which ratio between a minor side and a major side is 3 or more, and removing a laser beam in the direction intersecting perpendicularly to said rectangular section of said discharge space, characterized in that a cooling pipe for cooling a laser gas having an opening within three times of a diameter of a beam is disposed between a resonator mirror and a laser output window.

According to a tenth aspect of the present invention, there is provided a laser apparatus comprising a discharge space for laser excitation having a rectangular section of which ratio between a major side and a minor side is 3 or more and removing a laser beam in the direction intersecting perpendicularly to said rectangular section of said discharge space, characterized in that a hot flow is generated in the direction of the minor side of said rectangular section to cool a laser gas, and a gas flow is forcibly generated in a non-discharge portion through which said laser beam passes to suppress a rise of a temperature of said laser gas.

According to an eleventh aspect of the present invention, there is provided a laser apparatus comprising a discharge space for laser excitation having a rectangular section of which ratio between a major side and a minor side is 3 or more, and removing a laser beam in the direction intersecting perpendicularly to said rectangular section of said discharge space, characterized in that gas cooling means is provided to generate a hot flow in the direction of the minor side of said rectangular section to cool a laser gas, gas-leakage preventive side plates are provided on both sides of said discharge space, and a laser gas is suppled from substantially the central portion of said side plates and evacuated in vacuum so that a gas pressure within said discharge space is substantially constant.

According to a twelfth aspect of the present invention, there is provided a laser apparatus having a discharge space for laser excitation, said discharge space being arranged so that linear symmetrical axes are two or more, and removing a laser beam in the direction intersecting perpendicularly to a section of said discharge space, characterized in that the laser beam which passes through the section of said discharge space is joined into one using solid beam turn-back means.

According to a thirteenth aspect of the present invention, there is provided a laser apparatus having a rectangular discharge space whose ratio of length between a plurality of major sides and minor sides, the section of said rectangular discharge space being arranged so that linear symmetrical axes are at least more than 2, and removing a laser beam in the direction intersecting perpendicularly to said discharge space section, characterized in that the laser beam which passes through the section of said discharge space is joined into one using solid beam turn-back means.

According to a fourteenth aspect of the present invention, there is provided a laser apparatus having a rectangular discharge space of which ratio of length between a plurality of major sides and minor sides is 3 or more, the section of said rectangular discharge space being arranged into a polygonal shape, and removing a laser beam in the direction intersecting perpendicularly to said discharge space section, characterized in that the laser beam which passes through the section of said discharge space is joined into one using solid beam turn-back means.

According to a fifteenth aspect of the present invention, there is provided a laser apparatus having a plurality of solid laser media, the section of said solid laser media being arranged so that linear symmetrical axes are at least two or more, and removing a laser beam in the direction intersecting perpendicularly to the section of said solid laser media, characterized in that heat is removed from the direction of the major side of said discharge space section to cool gas, and the laser beam which passes through the section of said solid laser media is joined into one using solid beam turn-back means.

According to a sixteenth aspect of the present invention, there is provided a laser apparatus having a plurality of solid laser media, the section of said solid laser media being arranged into a polygonal shape, and removing a laser beam in the direction intersecting perpendicularly to the section of said solid laser media, characterized in that heat is removed from the direction of the major side of said discharge space section, and the laser beam which passes through the section of said solid laser media is joined into one using solid beam turn-back means.

According to a seventeenth aspect of the present invention, there is provided a laser apparatus of the discharge excitation waveguide path type which uses, as a light reflection surface, a dielectric formed of a plurality of materials which are different in the dielectric constant of a laser light to a wavelength, characterized in that said dielectric on the metal electrode side for discharge excitation is formed of a material having a high dielectric constant, and that on the discharge plasma side is formed of a material having a low dielectric constant.

With the laser apparatus according to the first and second aspects of the present invention, since the discharge is caused in oblique directions within the rectangular section of the discharge space, the effective length of the gap can be set to be long, and for this reason, a proportion of a high electric field region for maintenance of discharge reduces, and an average electric-field intensity lowers to increase a laser excitation efficiency.

With the laser apparatus according to the third aspect of the present invention, since a plurality of electrodes for discharge excitation are provided, the effective length of the gap can be set to be long, and for this reason, a proportion of a high electric field region for maintenance of discharge reduces, and an average electric-field intensity lowers to increase a laser excitation efficiency, similarly to the case of the laser apparatus of the above-described first and second aspects.

With the laser apparatus according to the fourth aspect of the present invention, the effective length of gap can be set to be long, and for this reason, a proportion of a high electric field region for maintenance of discharge reduces, and an average electric-field intensity lowers to increase a laser excitation efficiency, similarly to the case of the laser apparatus of the above-described first to third aspects.

With the laser apparatus according to the fifth and sixth aspects of the present invention, since an outer pipe is formed from a dielectric, and a plurality of electrodes for applying an alternating voltage are disposed in the outer periphery of the outer pipe, a doughnut-like annular portion is utilized as a discharge space, whereby the effective length of the gap becomes long. Thereby, a proportion of a high electric-field region for maintenance of discharge reduces, an average electric-field intensity lowers, and a laser excitation efficiency increases.

With the laser apparatus according to the seventh to eleventh aspects of the present invention, a gas temperature does not rise in a non-excitation space where no inverse distribution is produced so that the coefficient of light absorption can be suppressed to a low value and the efficiency for removing the laser increases.

With the laser apparatus according to the twelfth aspect of the present invention, since the effect equal to the case where a plurality of laser light excitation spaces are connected in series is obtained, the laser beams amplified in the respective laser light excitation spaces are solidly turned back and joined into one to assume a state as if they are amplified in a single laser light excitation space. Accordingly, the laser beam emitted from the laser apparatus is not plural but one, thus minimizing the apparatus and reducing the cost.

With the laser apparatus according to the thirteenth and fourteenth aspects of the present invention, a rectangular discharge space having a large aspect ratio can be produced, and a cooling capacity for laser gas can be increased. Accordingly, the effect similar to that of the aforementioned twelfth aspect can be obtained.

With the laser apparatus according to the fifteenth and sixteenth aspects of the present invention, the laser beams are amplified in the solid laser media spaces, and the amplified laser beams are solidly turned back into one to assume a state as if they are amplified in a single solid laser media space. Accordingly, the laser beam emitted from the solid laser apparatus is not plural but one, thus miniaturizing the apparatus and reducing the cost.

With the laser apparatus according to the seventeenth aspect of the present invention, for a dielectric layer for determining a fundamental characteristics of discharge, a conventional material having a high dielectric constant and a high voltage resistance can be used without the necessity of consideration of the propagation loss of light. Furthermore, since a waveguide path surface is formed of a material having a low dielectric constant, a loss of a waveguide path is small. Accordingly, the propagation loss of light can be suppressed to a small value even if a long dielectric is used, thus realizing a waveguide path type laser apparatus of high output.

BRIEF DESCRIPTION OF THE DRAWINGS

FIG. 20A is a plan view showing a gas laser apparatus according to a yet further embodiment of the present invention, and FIG. 20B is a sectional view taken along line A—A of FIG. 20A;

FIG. 21A is a plan view showing a gas laser apparatus according to a yet further embodiment of the present invention, and FIG. 21B is a sectional view taken along line A—A of FIG. 21A;

FIG. 25 is a perspective view showing a gas laser apparatus according to a yet further embodiment of the present invention;

DETAILED DESCRIPTION OF THE PREFERRED EMBODIMENTS

Figure 1:
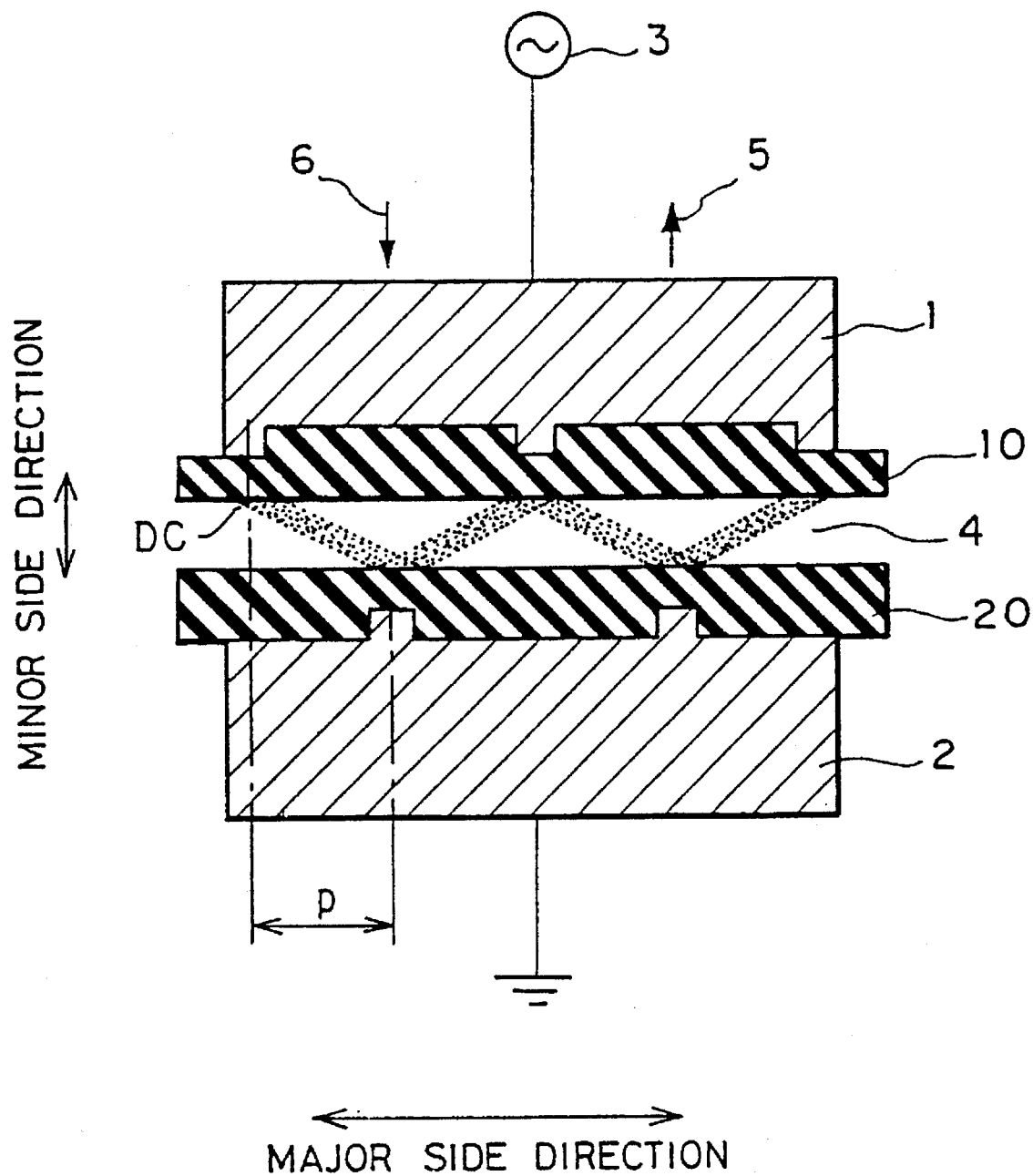
FIG. 1 is a schematic sectional view showing a gas laser apparatus according to an embodiment of the present invention.

In the following, embodiments of the present invention will be described with reference to FIGS. 1 to 32. In those figures, like elements (members) to those described hereinabove with reference to FIGS. 33 to 39 are denoted by like reference numerals and characters, and detailed description thereof is omitted herein.

EMBODIMENT 1

FIG. 1 is a schematic sectional view showing a gas laser apparatus according to the Embodiment 1 of the present invention. The present gas laser apparatus has a rectangular section wherein the ratio between the lengths of the major side and the minor side is equal to or higher than 3, and is extracted a laser beam in the direction perpendicular to the section. Also in the present embodiment, cooling water flows through the electrodes 1 and 2 in order to cool the laser medium.

Figure 69:
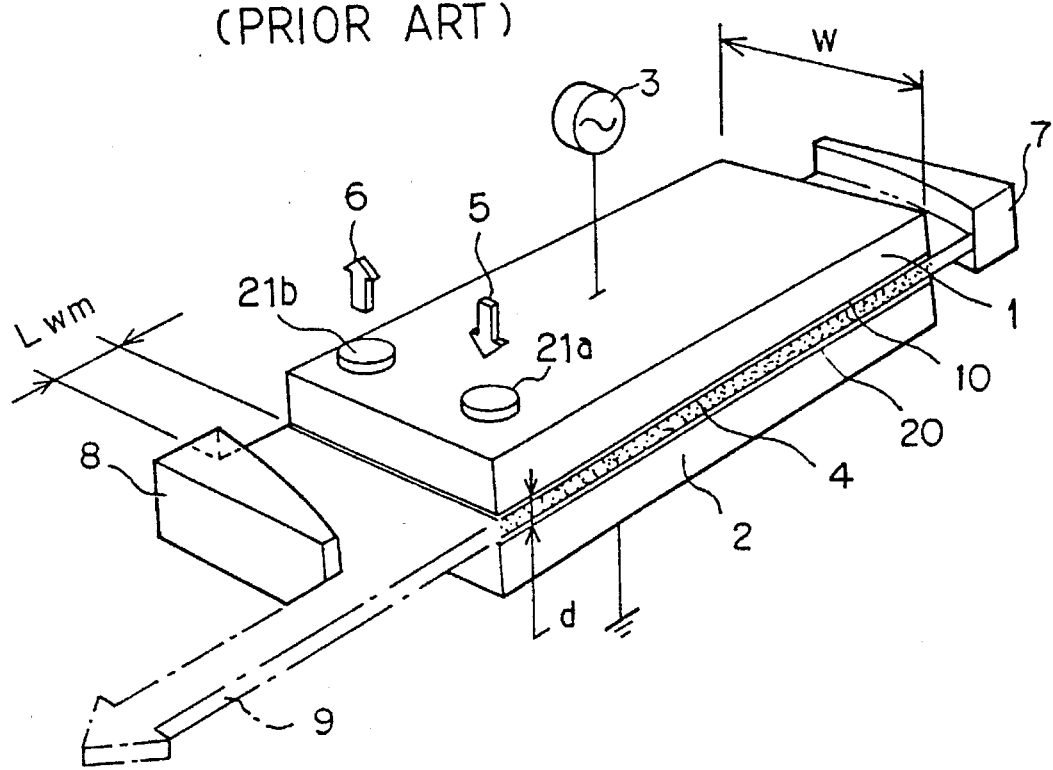
FIG. 69 is a perspective view showing a conventional waveguide path type $CO_2$ laser apparatus.
Figure 70:
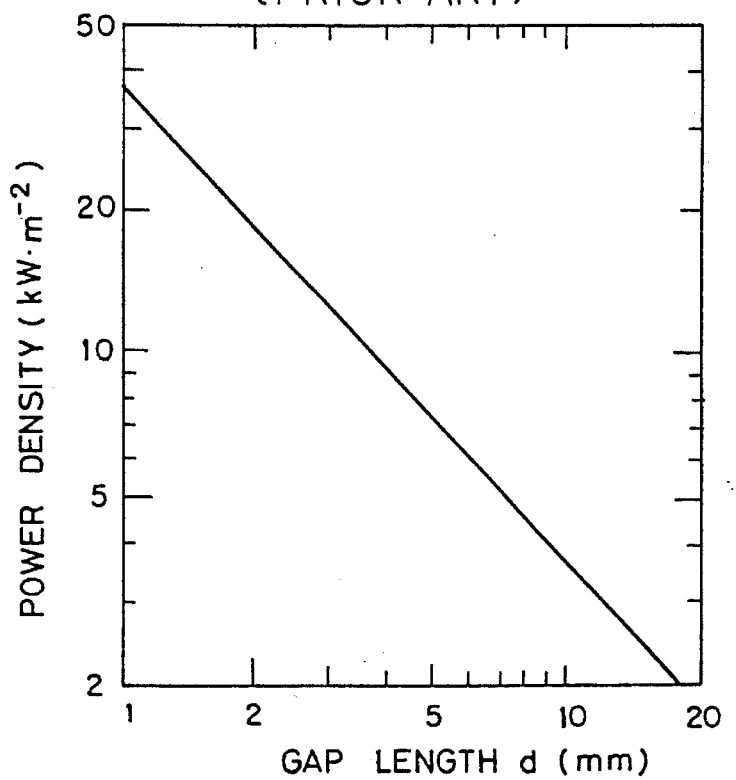
FIG. 70 is a graphic representation showing the relationship between the discharge space and the coefficient of laser excitation in the $CO_2$ laser apparatus shown in FIG. 69.

While the basic construction of the present gas laser apparatus is similar to the conventional gas laser apparatus shown in FIG. 69, in the present embodiment, the dielectric plates 10 and 20 are provided with a thickness distribution in order to provide the electrostatic capacities of the electrodes with a distribution to generate the discharge in oblique directions in the section.

Subsequently, operation of the present gas laser apparatus will be described. When an ac high voltage is applied between the metal electrodes 1 and 2, the discharge is generated in the discharge space 4. In this instance, since discharge energy is poured in in proportion to the electrostatic capacity, if a suitable distribution is provided to the thicknesses of the dielectric plates 10 and 20, then such discharge in oblique directions as indicated by reference character DC in FIG. 1 is caused. According to an experiment of the inventors, it was confirmed that, when a thickness distribution is to be provided to a same dielectric material, the discharge in oblique directions is caused principally if the ratio in thickness between a thinner portion and a thicker portion is set to 1:3 or more.

According to this embodiment, since an equivalent discharge gap length in oblique direction can be set arbitrarily by selecting the pitch (reference p) at thinner portions of the dielectric plates 10 and 20, optimization can be achieved by the power source frequency.

Figure 2:
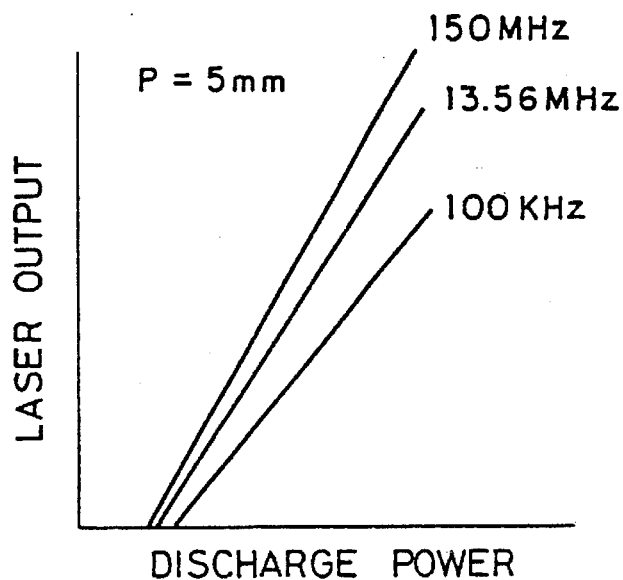
FIGS. 2 and 3 are graphs each illustrating a relationship between the discharge power and the laser output of the gas laser apparatus of FIG. 1.
Figure 3:
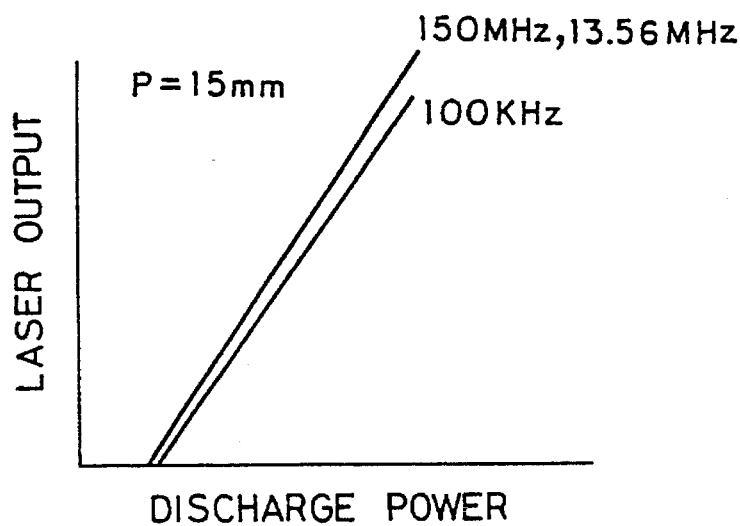

FIGS. 2 and 3 illustrate results of an examination of the power source frequency dependency of the laser output at p=5 mm and 15 mm, respectively, in the condition of the gap length of 2 mm. Under the condition of p=5 mm of FIG. 2, the excitation efficiencies at the power source frequencies of 150 MHz and 13.56 MHz are substantially equal to each other. Further, under the condition of p=15 mm of FIG. 3, also the excitation efficiency at 100 kHz is almost equal, and enhancement in laser excitation efficiency in a low frequency region is confirmed. Accordingly, it can be recognized that, if the equivalent discharge gap length is taken long by the oblique discharge provided by the present embodiment, even where a power source of a lower frequency is used, laser oscillation of a high efficiency is possible.

EMBODIMENT 2

Figure 4:
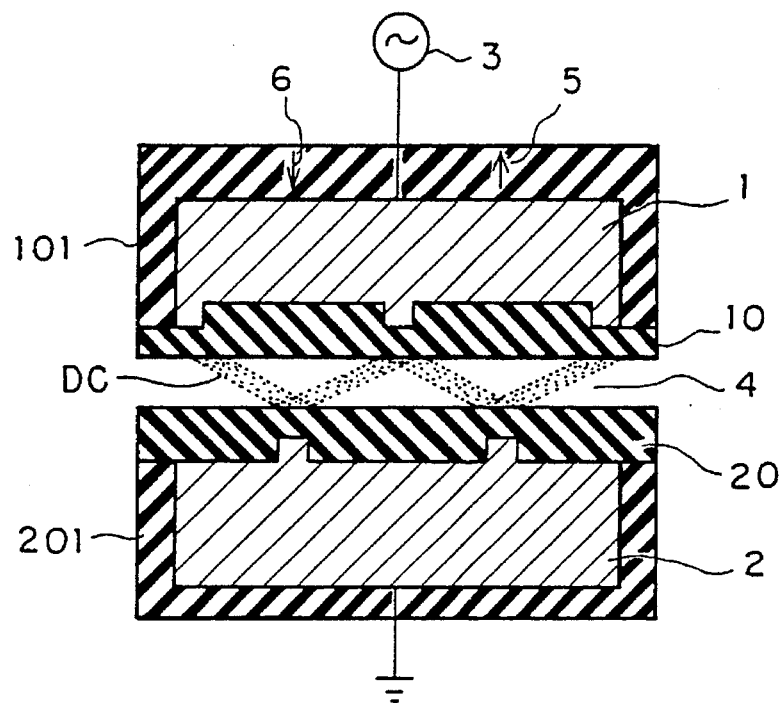
FIG. 4 is a schematic sectional view showing a gas laser apparatus according to another embodiment of the present invention.

It was confirmed that, if the metal electrodes 1 and 2 are molded with dielectric members 101 and 201 having a low dielectric constant as shown in FIG. 4, then it is possible to apply a higher voltage between them and an increase in output power is realized.

EMBODIMENT 3

Figure 5:
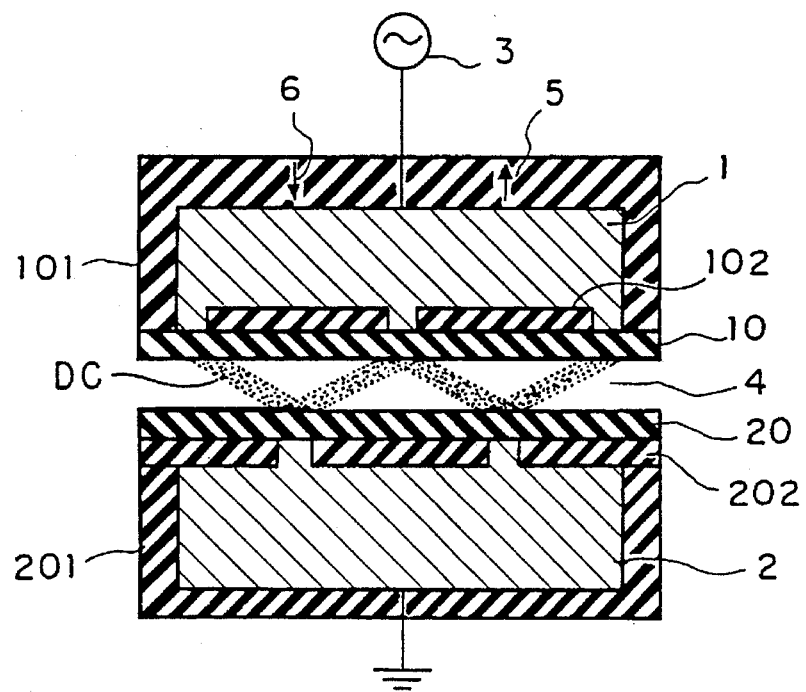
FIG. 5 is a schematic sectional view showing a gas laser apparatus according to a further embodiment of the present invention.
Figure 6:
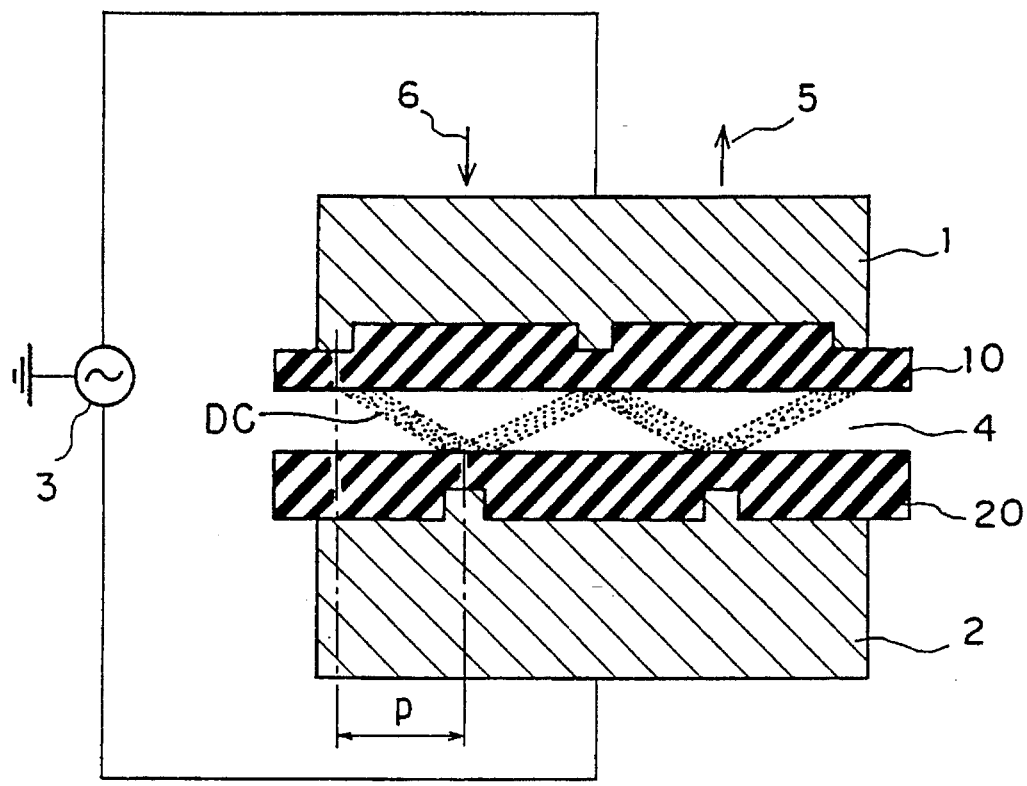
FIG. 6 is a schematic sectional view showing a gas laser apparatus according to a still further embodiment of the present invention.

Meanwhile, even if different dielectrics 102 and 202 are laminated on the dielectric plates 10 and 20, respectively, to form stepped dielectric layers as shown in FIG. 5, similar effects to those of the Embodiment 1 can be obtained. In this instance, if the dielectrics 102 and 202 are formed from a material having a lower dielectric constant than that of the dielectric plates 10 and 20, then it is possible to reduce the thicknesses of the dielectrics 102 and 202 to raise the effect of heat conduction for cooling the mixture gas.

EMBODIMENT 4

Meanwhile, if the neutral point of the power source is grounded so that voltages having the opposite polarities to each other (voltages displaced by 180° from each other in phase) are applied to the metal electrodes 1 and 2, then the insulation distances from the electrodes 1 and 2 to the ground can be designed short, and a compact laser oscillator can be realized.

EMBODIMENT 5

Figure 7:
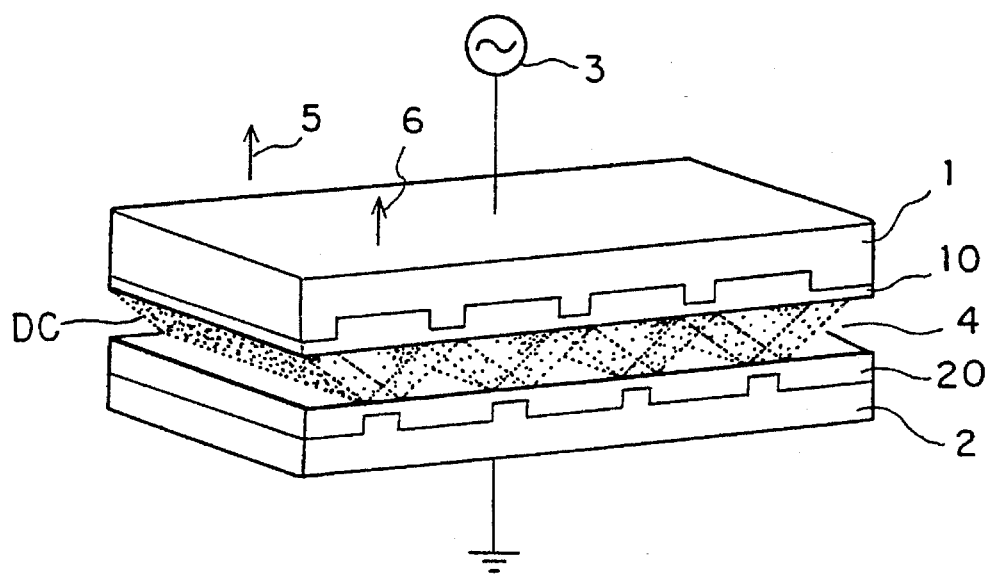
FIG. 7 is a perspective view showing a gas laser apparatus according to a yet further embodiment of the present invention.
Figure 8:
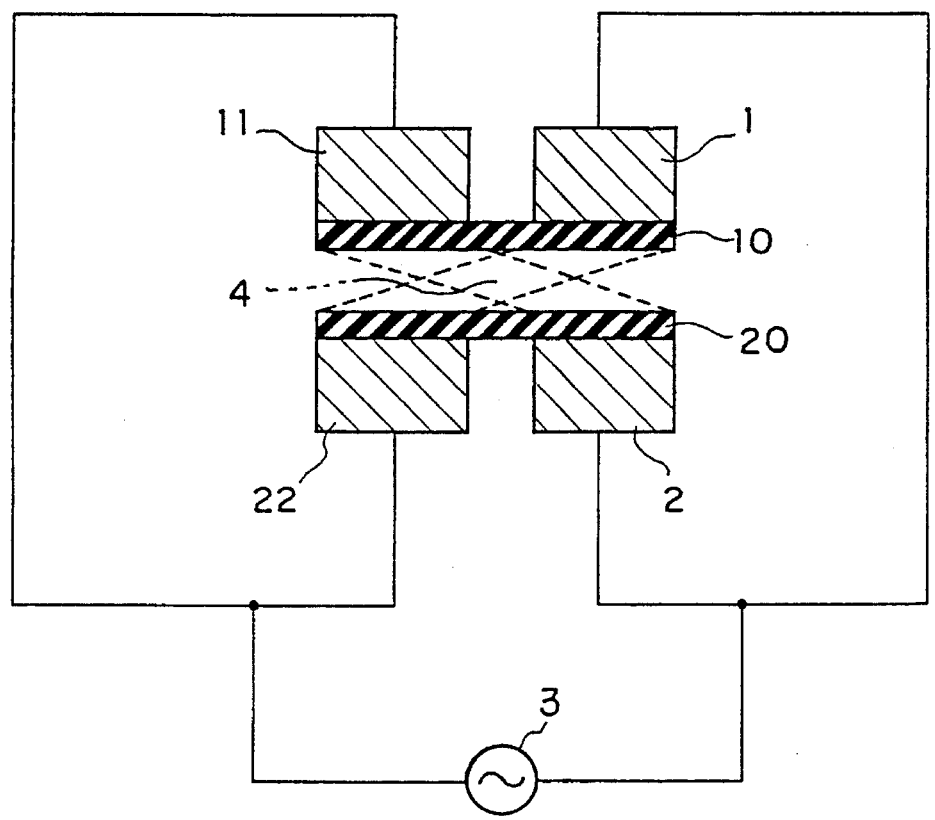
FIG. 8 is a schematic sectional view showing a gas laser apparatus according to a yet further embodiment of the present invention.

While the effects of the oblique discharge in the section of the discharge space 4 perpendicular to the optic axis are described in the Embodiment 1, similar effects to those of the Embodiment 1 can be obtained even if oblique discharge occurs in the direction of the optic axis as shown in FIG. 7.

EMBODIMENT 6

While the cases wherein the discharge is caused in oblique directions by a distribution of the electrostatic capacity are described in the embodiments described above, if, for example, as shown in FIG. 8, the metal electrodes 1 and 2 which are opposed to each other and another pair of metal electrodes 11 and 22 which are opposed to each other are short-circuited by way of the dielectric members 10 and 20 while a high voltage is applied between the adjacent metal electrodes 1 and 11 and the adjacent metal electrodes 2 and 22, then the discharge is caused between obliquely opposed electrodes having different potentials (in short, between the electrodes 1 and 22 and between the electrodes 2 and 11) and between adjacent electrodes (in short, between the electrodes 1 and 11 and between the electrodes 2 and 22). Consequently, similar effects to those described above are obtained. In short, if the discharge can be caused in oblique directions with respect to the dielectric members 10 and 20, then laser excitation of a high efficiency is possible even when a power source of a low frequency is employed.

EMBODIMENT 7

Figure 9:
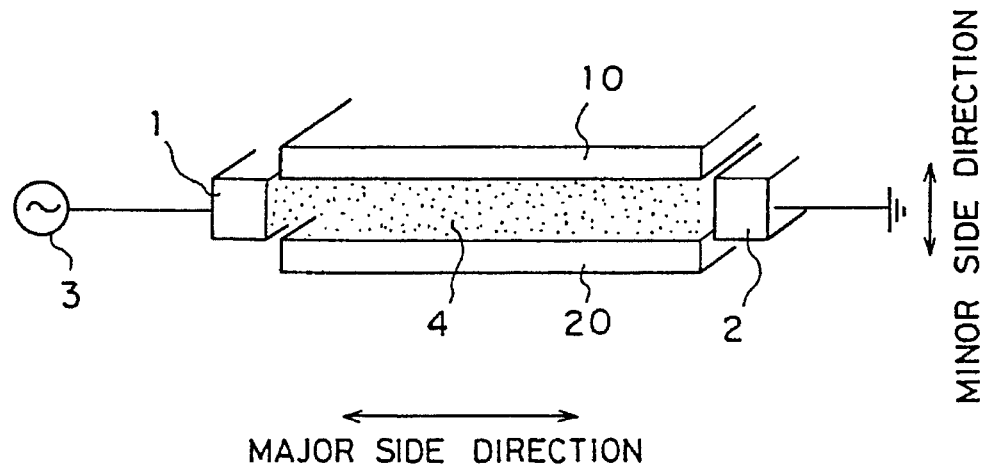
FIG. 9 is a schematic illustration of a gas laser apparatus according to a yet further embodiment of the present invention.

FIG. 9 is a schematic view showing a gas laser apparatus according to the Embodiment 7 of the present invention. The basic construction of the present gas laser apparatus is similar to that shown in FIG. 69. However, in the present embodiment, the discharge electrodes 1 and 2 are disposed in the direction of the major side of the section of the discharge space 4 as shown in FIG. 9, and the discharge is caused in the direction of the major side of the discharge space 4.

Since the ratio between the major side and the minor side (i.e., the aspect ratio) of the discharge space 4 is set equal to or higher than 3 similarly as in the Embodiment 1, the gap length can be increased by three or more times only by changing the direction of the discharge from the direction of the minor side to the direction of the major side. Consequently, the gap travel time $t_e$ of electrons described hereinabove is increased, and the electric field strength is put into a condition optimum for laser oscillation and laser oscillation of a high efficiency is realized even where the RF power source 3 has a low frequency with a comparatively long power source period $t_s$.

Figure 10:
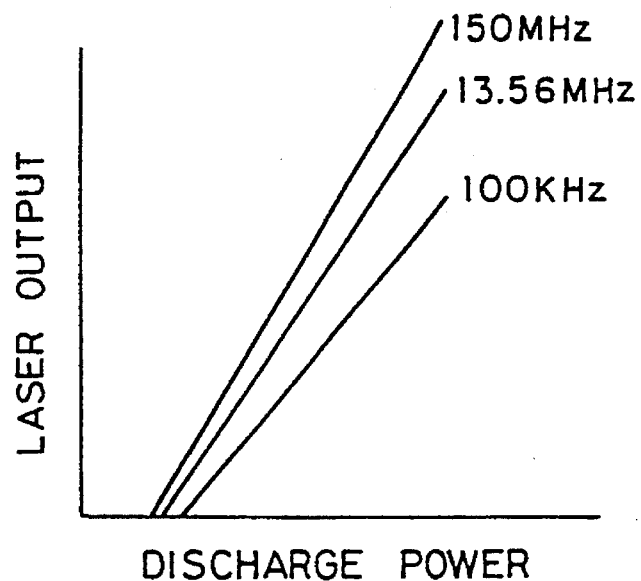
FIG. 10 is a graph illustrating a relationship between the discharge power and the laser output of the gas laser apparatus of FIG. 9.
Figure 11:
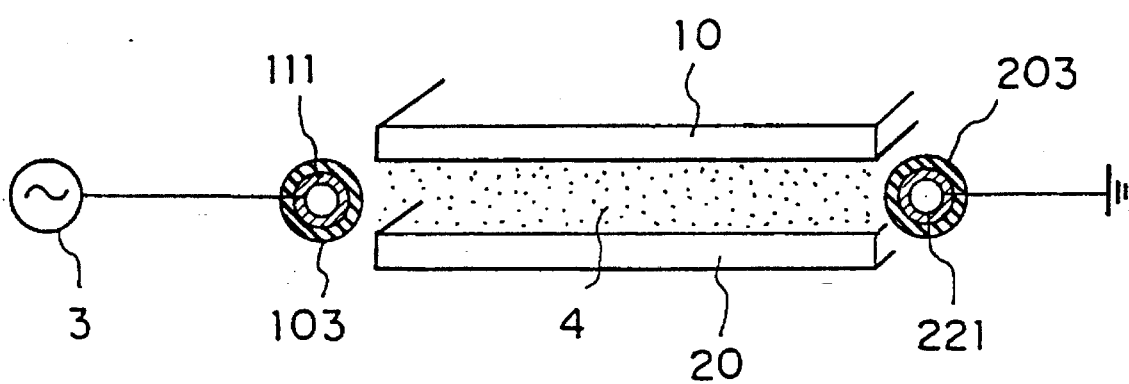
FIG. 11 is a schematic illustration of a gas laser apparatus according to a yet further embodiment of the present invention.
Figure 12:
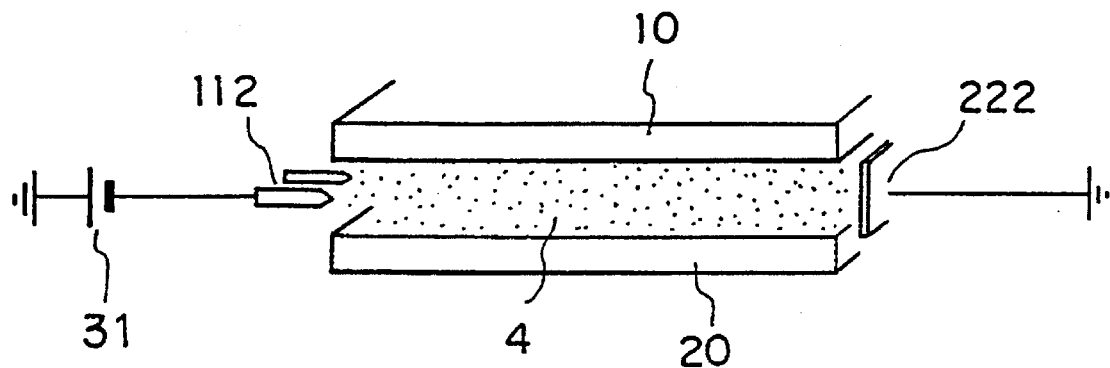
FIG. 12 is a schematic illustration of a gas laser apparatus according to a yet further embodiment of the present invention.
Figure 72:
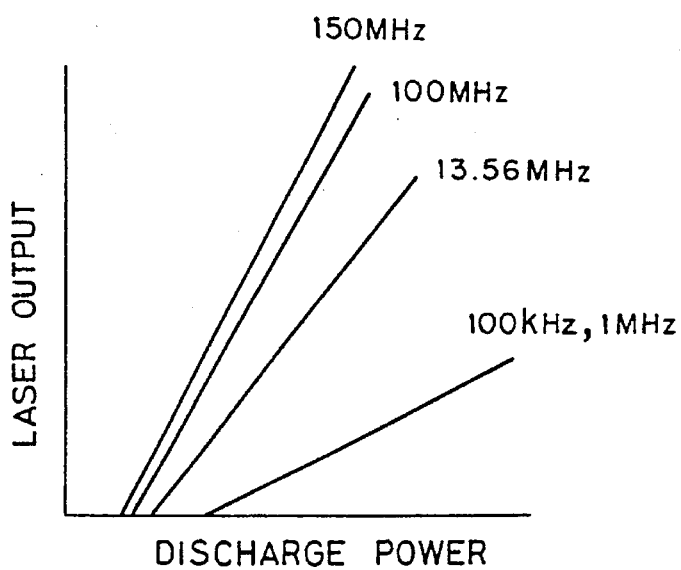
FIG. 72 is a graphic representation showing the relationship between the frequency of the excitation power source and the efficiency of the laser excitation in the laser apparatus shown in FIG. 69.
Figure 71:
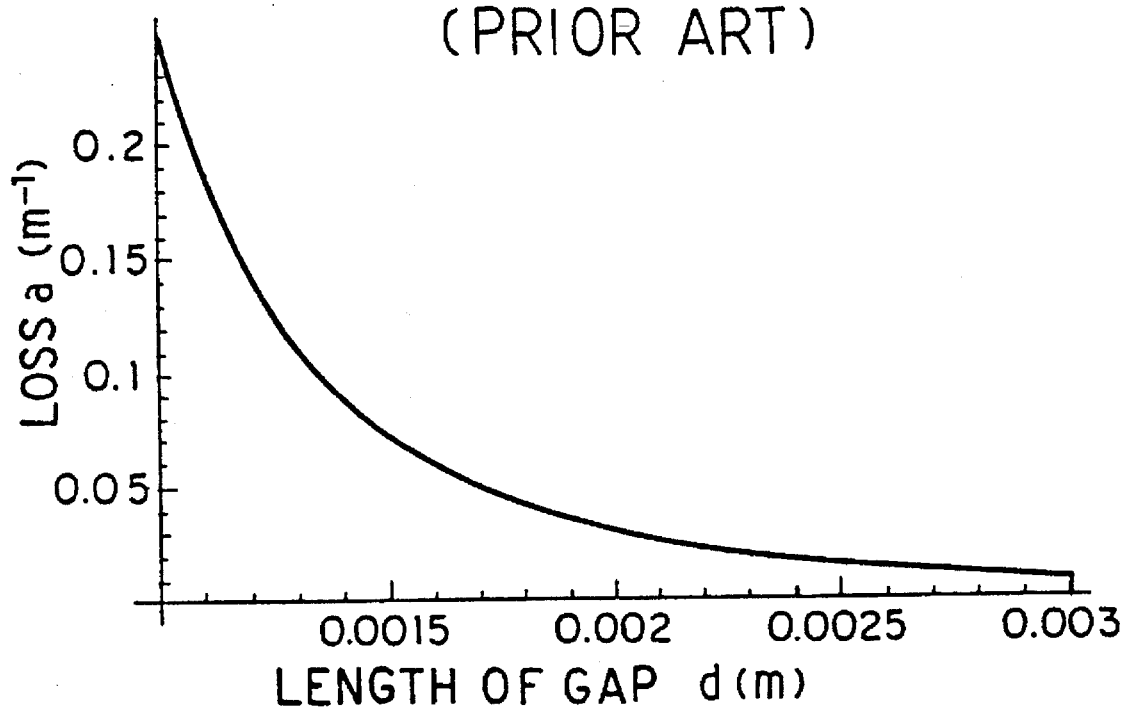
FIG. 71 is a graphic representation showing the gap length and the cooling capacity in the $CO_2$ laser apparatus shown in FIG. 69.
Figure 73:
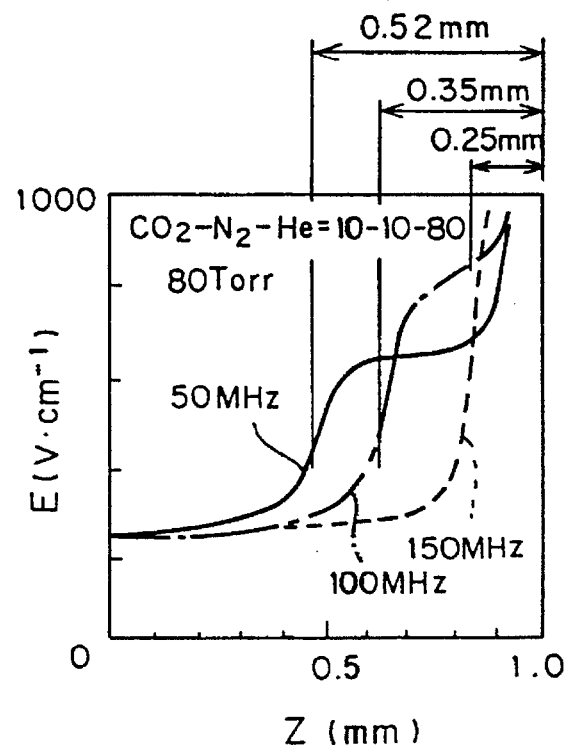
FIG. 73 is a graphic representation showing the relationship between the frequency of the excitation power source and the electric-field distribution in the laser apparatus shown in FIG. 69.

A result of a similar oscillation experiment which was conducted under similar conditions to those of FIG. 72 using the gas laser apparatus of the present embodiment is shown in FIG. 10. It can be seen from FIG. 10 that the laser oscillation efficiency in a low frequency region is improved. If the aspect ratio is further increased, then the laser oscillation efficiency will rely upon the power source frequency little more.

EMBODIMENT 8

In the present embodiment, the construction of the Embodiment 7 described above is modified such that, as shown in FIG. 11, discharge electrodes 111 and 221 are surrounded by dielectric members 103 and 203 of glass or the like, respectively. Also with this construction, similar effects to those of the Embodiment 7 can be exhibited (common with the Embodiment 1 in that a pair of dielectric members are disposed between the discharge electrodes).

EMBODIMENT 9

In the present embodiment, the construction of the Embodiment 7 described above is modified such that, as shown in FIG. 12, a dc power source 31 is employed to excite the laser by the dc glow discharge. The dc power source 31 is connected to a cathode pin electrode 112 and an anode 222. Also with the present construction, similar effects to those of the Embodiment 7 can be exhibited.

EMBODIMENT 10

Figure 13:
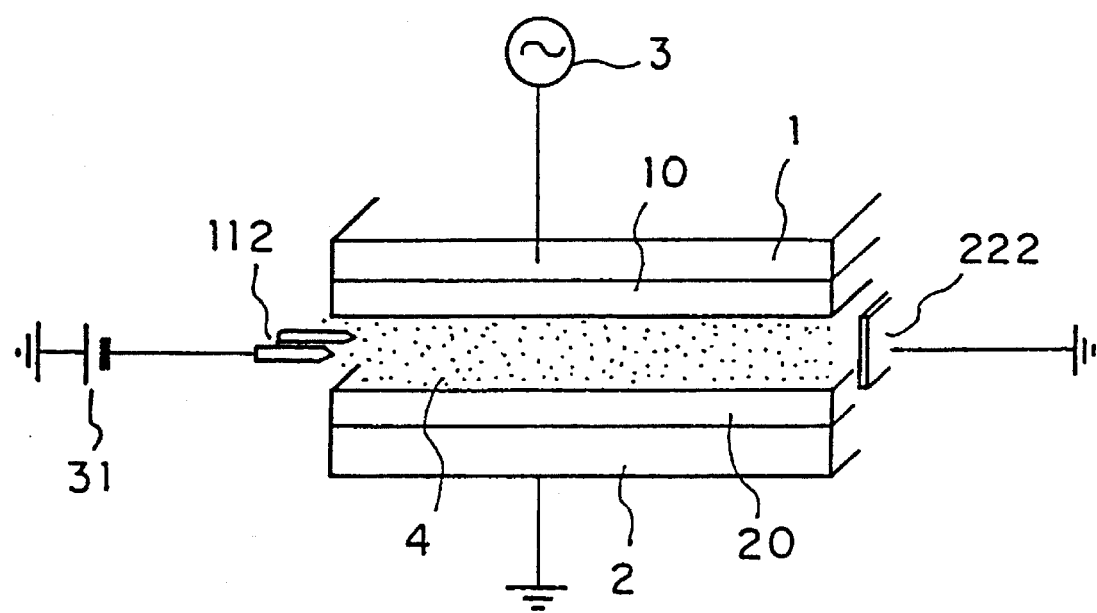
FIG. 13 is a schematic illustration of a gas laser apparatus according to a yet further embodiment of the present invention.

The present embodiment has such construction which is a combination of the constructions of the Embodiments 7 and 9, and as shown in FIG. 13, in the present embodiment, the discharge for supplying energy lower than one half the power in the direction of the major side by the dc power source 31 is caused in the direction of the minor side by the RF power source 3. By this construction, the discharge in the direction of the major side is facilitated (so as to allow the discharge to be caused without applying an over-voltage). Further, the discharge can be stabilized.

It is to be noted that, while a $CO_2$ laser is taken as an example in the embodiments described above, the present invention can be applied to such other gas lasers as a CO laser which are required to assure excitation by low energy electrons similarly to a $CO_2$ laser.

EMBODIMENT 11

Figure 14:
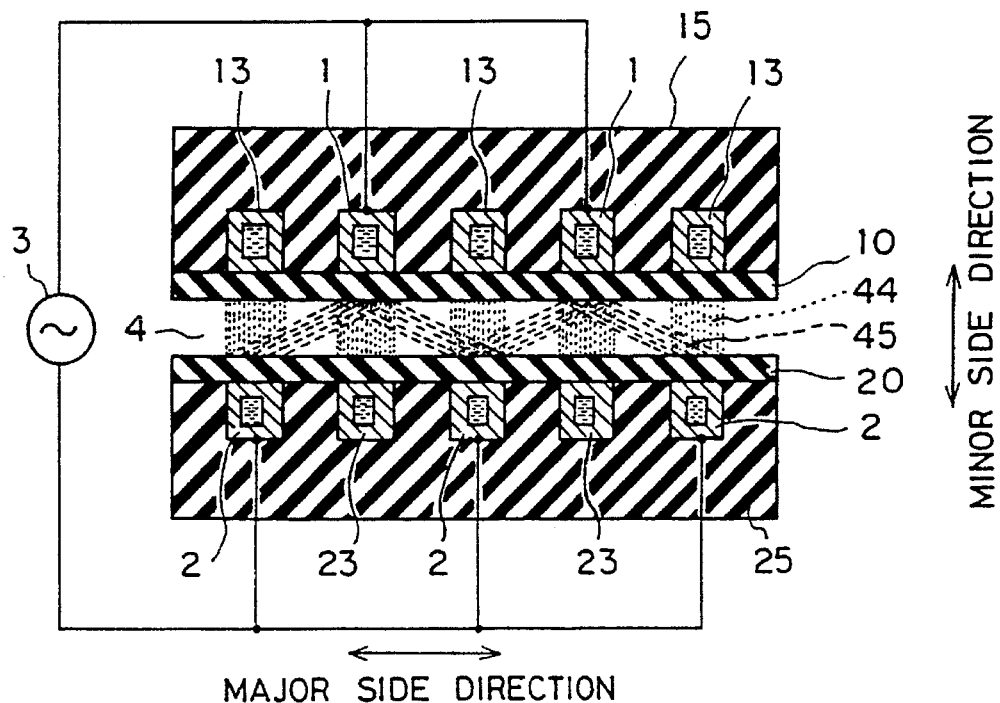
FIG. 14 is a schematic sectional view showing a gas laser apparatus according to a yet further embodiment of the present invention.

FIG. 14 is a sectional view showing a gas laser apparatus according to the Embodiment 11 of the present invention. Referring to FIG. 14, reference numerals 1 and 2 each denote a metal electrode, and 13 and 23 each denote a metal angular pipe (through which cooling water circulates). A plurality of metal electrodes 1 and 2 are connected to the dielectric members 10 and 20, respectively, and are connected to the ac power source 3. The metal electrodes 1 and 2 are disposed in an alternate relationship on the opposite sides of the discharge space 4.

Further, a metal pipe 13 or 23 in the electrically floating condition is disposed between each adjacent ones of metal electrodes 1 or 2. The metal electrodes 1, 2 and the metal angular pipes 13, 23 are cooled individually, and the laser gas in the discharge space 4 is cooled by way of the dielectric plates 10 and 20. Further, dielectric materials 15 and 25 are molded to cover over the entire electrodes 1, 2 and metal angular pipes 13, 23 to prevent the creeping discharge.

Subsequently, operation will be described. If an ac high voltage is applied from the RF power source 3 between the metal electrodes 1 and 2, then the predischarge 44 is caused in the direction of the minor side of the discharge space 4. Then, if the voltage is further raised, the main discharge 45 is caused in oblique directions.

This phenomenon will be described by way of an equivalent circuit of an electrode system shown in FIG. 15. The main discharge (plasma resistance $R_1$) 45 is, on one hand, connected to the power source 3 by way of an electrostatic capacity $C_1$ of the dielectric plate 10 (from the feed electrode 1) and, on the other hand, connected to the power source 3 by way of an electrostatic capacity $C_1$ of the other dielectric plate 20 (from the feed electrode 2).

Meanwhile, the preliminary discharge (plasma resistance $R_2$) 44 is connected, when it is connected to the feed electrode 1 by way of the metal angular pipe 13, to the feed electrode 1 by way the electrostatic capacity $C_1$ of the dielectric plate 10, the metal angular pipe 13 and an electrostatic capacity $C_2$ of the dielectric material 15. On the other hand, when the preliminary discharge 44 is connected to the metal angular pipe 23 by way of the feed electrode 2, it is connected to the feed electrode 2 by way of the electrostatic capacity $C_1$ of the dielectric plate 20. Due to these connection configurations, the preliminary discharge 44 is caused between the metal angular pipe 13 and the feed electrode 2 and similarly between the feed electrode 1 and the metal angular pipe 13.

In the present embodiment, the preliminary discharge starts at a very low voltage because the equivalent gap length in the direction of the minor side is short. Then, the discharge field is put into a weakly ionized condition by ultraviolet rays or charged particles generated by the preliminary discharge 44, and the main discharge 45 is fired at a comparatively low voltage.

Figure 16:
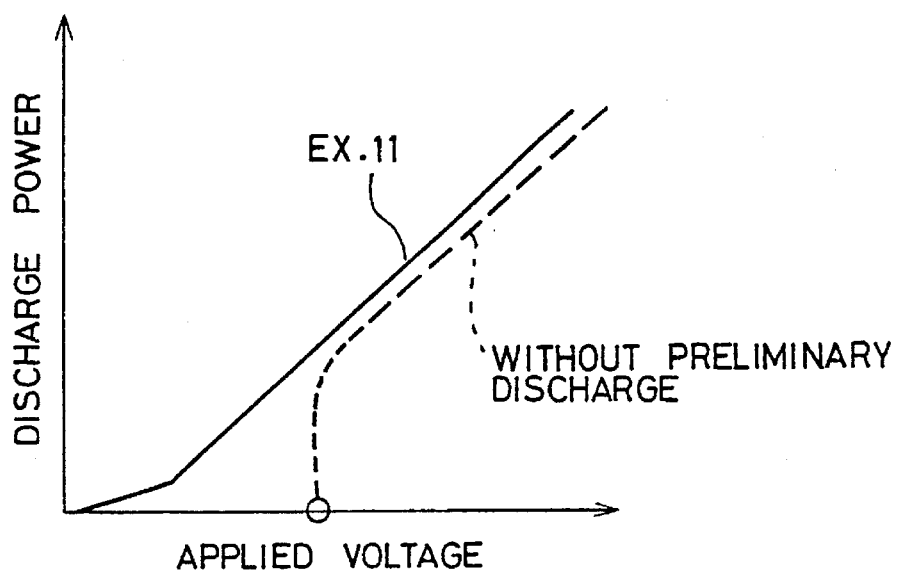
FIG. 16 is a graph illustrating the thrown in power characteristic of the gas laser apparatus of FIG. 14.

A difference in thrown-in power characteristics arising from whether the preliminary discharge is present or absent is shown in FIG. 16. Referring to FIG. 16, a solid line EX. II shows a thrown-in power characteristic when the preliminary discharge 44 is present, and a broken line shows another thrown-in power characteristic when the preliminary discharge 44 is absent. When there is no preliminary discharge, the main discharge 45 is not fired until after a high voltage (over-voltage) is applied once, and high energy is poured into the discharge field suddenly. However, when a preliminary ionizing mechanism is added to cause the preliminary discharge 44 as in the present embodiment, the main discharge 45 is fired smoothly, and an uncontrollable region (region until discharge is reached) which appears in conventional apparatus can be eliminated.

By the way, since the preliminary discharge 44 is the discharge wherein the equivalent gap length is small, there is a drawback that, if the high power is thrown-in for the preliminary discharge 44 is increased, then as described hereinabove in connection with the prior art, the laser excitation efficiency decreases at a low power source frequency below 100 MHz. The inventors confirmed that, if the power to be thrown in for the preliminary discharge 44 is set to a value equal to or lower than 10% of the power to be thrown in for the main discharge 45, then the role of the preliminary discharge can be exhibited sufficiently without deteriorating the excitation efficiency of the laser by (the preliminary discharge)+(main discharge).

Figure 15:
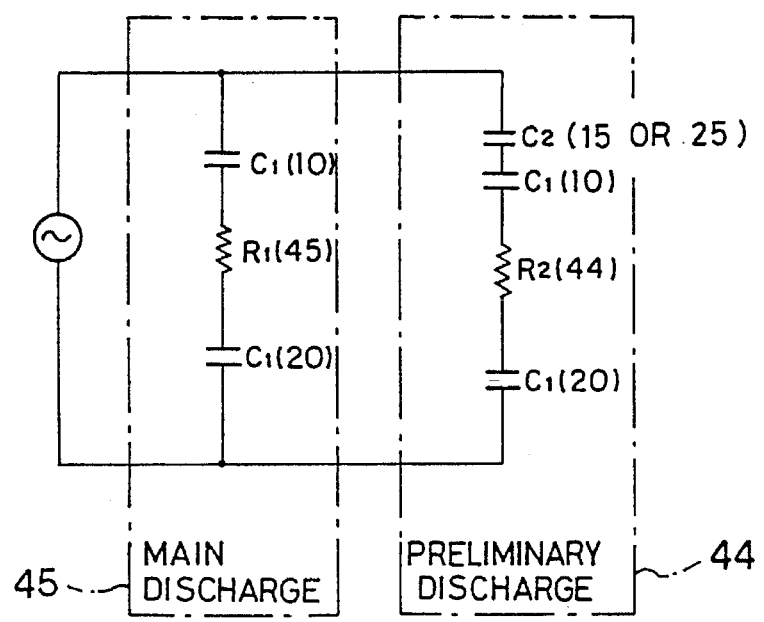
FIG. 15 is a circuit diagram showing an electrically equivalent circuit to the gas laser apparatus of FIG. 14.

In this instance, as seen from FIG. 15, in both of the preliminary discharge 44 and the main discharge 45, the discharge energy (power) is poured in proportion to the electrostatic capacities $C_1$ and $C_1+C_2$, respectively, of the dielectric members corresponding to the discharge. Accordingly, the power to be thrown in for the preliminary discharge 44 can be set equal to or lower than 10% of the electric power to be thrown in for the main discharge 45 by setting the electrostatic capacity of the dielectric members corresponding to the preliminary discharge 44 to a value equal to or lower than 10% of the electrostatic capacity for the main discharge 45.

EMBODIMENT 12

Figure 17:
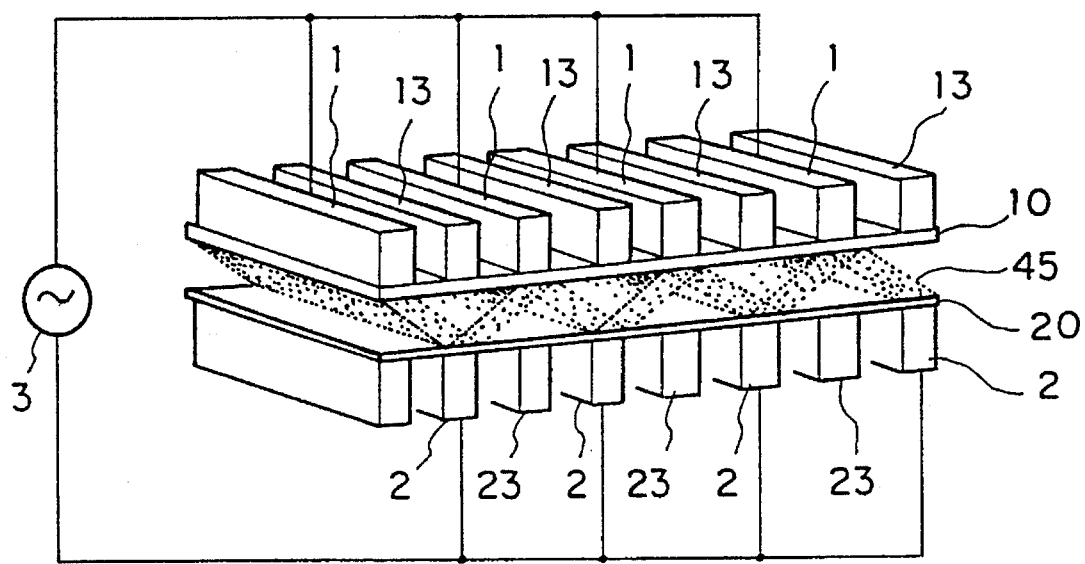
FIG. 17 is a schematic illustration of a gas laser apparatus according to a yet further embodiment of the present invention.

While, in the Embodiment 11 described above, the main discharge (oblique discharge) 45 and the preliminary discharge 44 are described as being caused in the plane perpendicular to the optic axis of the rectangular discharge space 4, similar effects to those of the Embodiment 11 can be obtained even if the main discharge 45 and the preliminary discharge 44 are caused in the direction of the optic axis as in the present Embodiment 12 shown in FIG. 17. However, in FIG. 17, only the main discharge 45 is shown while the preliminary discharge 44 is omitted. Also the dielectric molded elements are omitted.

EMBODIMENT 13

Figure 18:
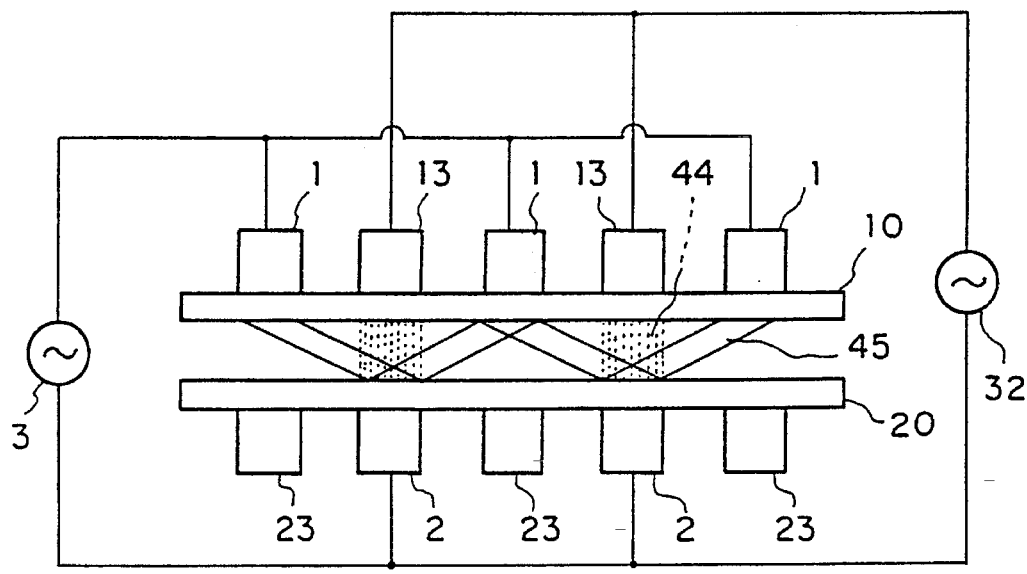
FIG. 18 is a side elevational view of a gas laser apparatus according to a yet further embodiment of the present invention.

Further, while, in the Embodiments 11 and 12, power is fed for the preliminary discharge 44 and the main discharge 45 from the common power source 3, similar effects to those of the Embodiments 11 and 12 can be obtained even if energy is supplied separately for the preliminary discharge 44 and the main discharge 45 from separate power sources 3 and 32 as in the Embodiment 13 shown in FIG. 18.

EMBODIMENT 14

Figure 19:
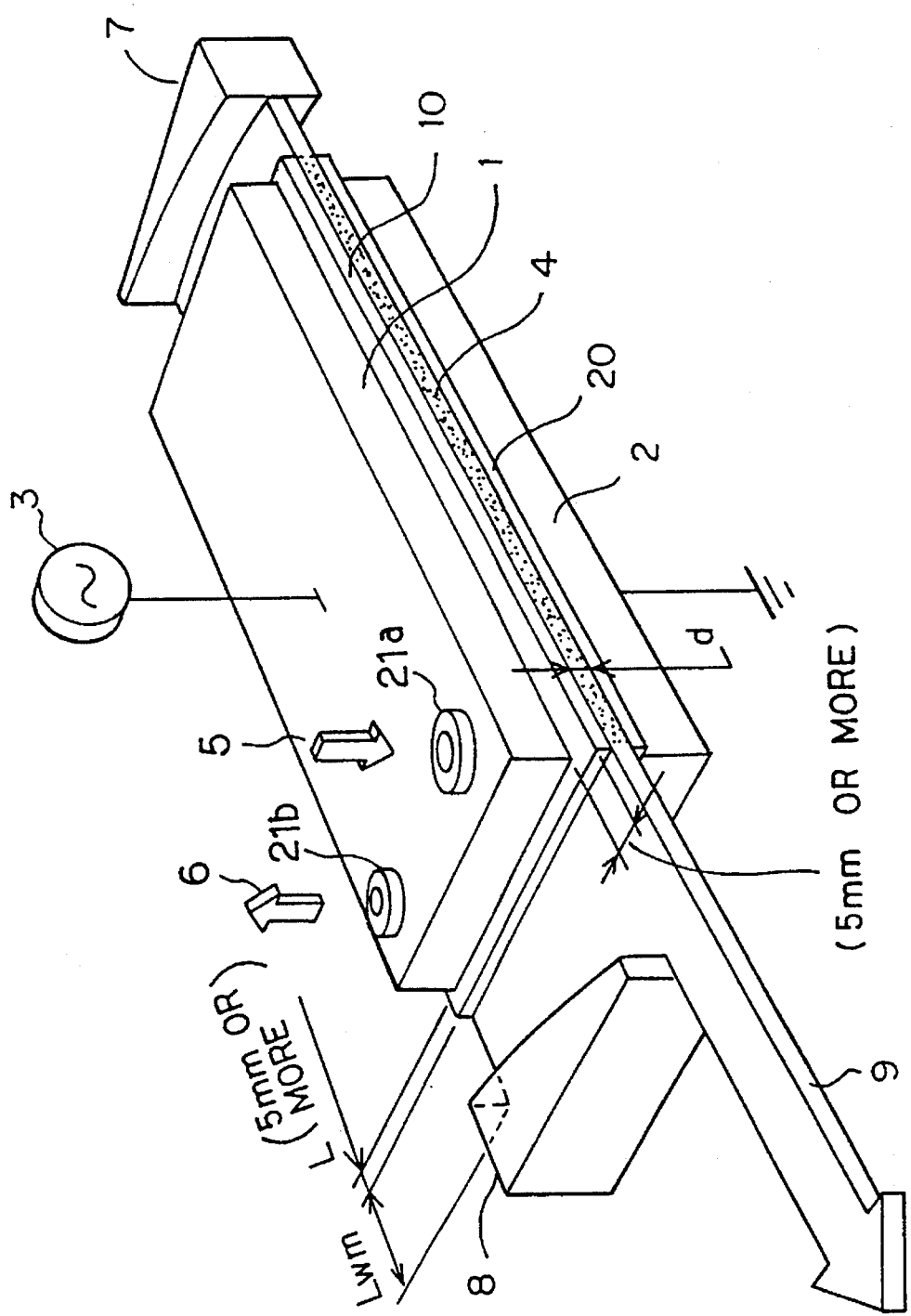
FIG. 19 is a perspective view showing a gas laser apparatus according to a yet further embodiment of the present invention.

FIG. 19 is a perspective view showing a gas laser apparatus according to the Embodiment 14 of the present invention. The gas laser apparatus of the present embodiment is different from the conventional gas laser apparatus shown in FIG. 69 in that the lengthwise dimension and the widthwise dimension of the metal electrodes 1 and 2 are set shorter than the lengthwise dimension and the widthwise dimension, respectively, of the dielectric plates 10 and 20 by 5 mm or more.

Figure 76:
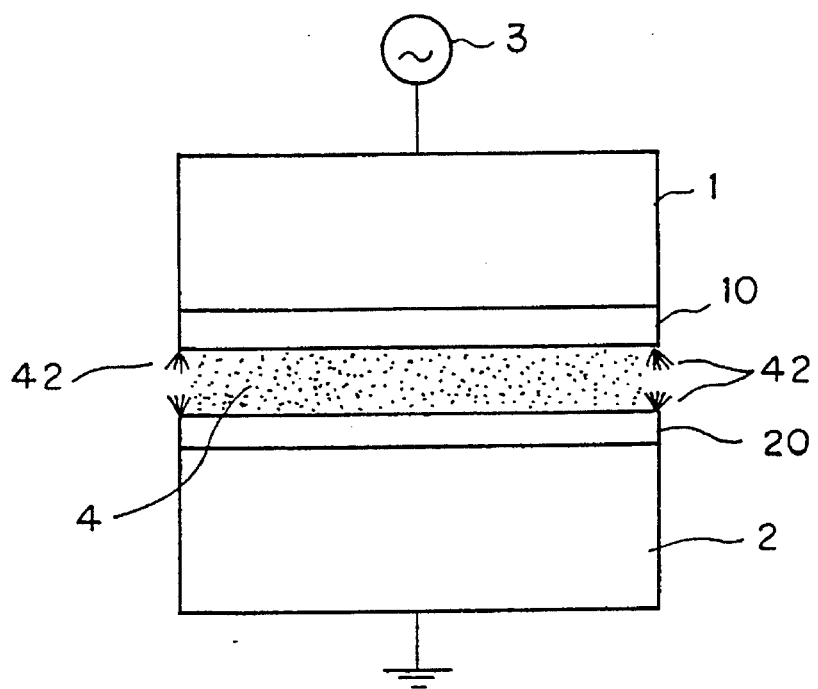
FIG. 76 is an explanatory view of the discharge occurring in the end of a dielectric in the laser apparatus shown in FIG. 69.

In the present embodiment, since the lengthwise dimension and the widthwise dimension of the metal electrodes 1 and 2 are smaller than the lengthwise dimension and the widthwise dimension, respectively, of the dielectric plates 10 and 20 by 5 mm or more, also when the discharge power is increased (when the applied voltage is raised), concentration of the discharge 42 by concentration of the electric field at the corner portions of the dielectric plates 10 and 20 (refer to FIG. 76) can be prevented.

Figure 74:
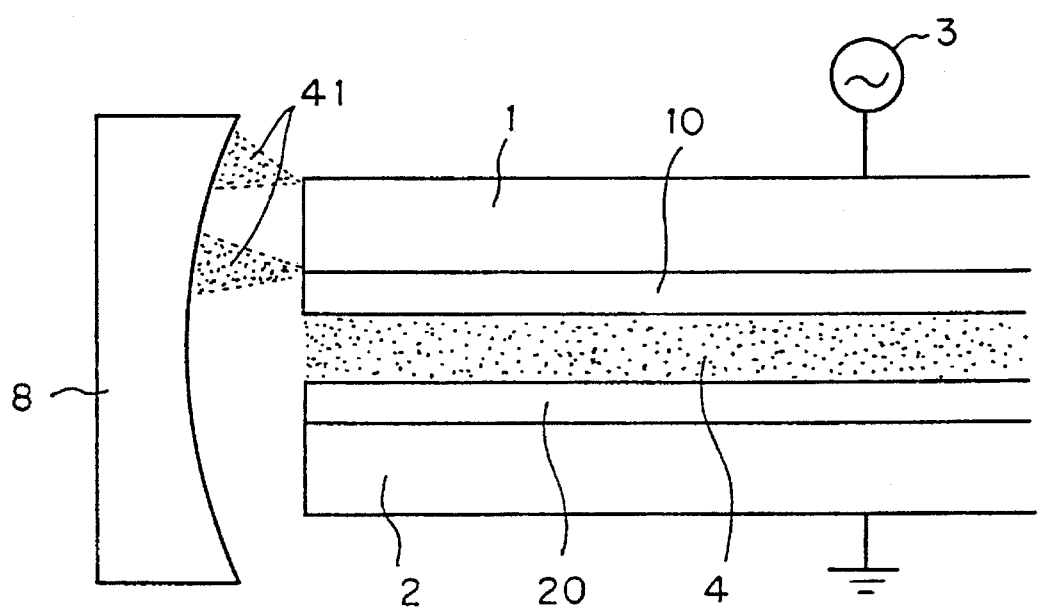
FIG. 74 is an explanatory view of the discharge toward a resonator mirror in the laser apparatus shown in FIG. 69.
Figure 75:
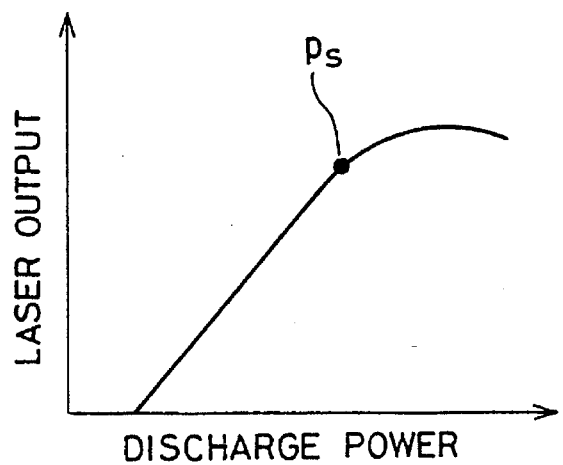
FIG. 75 is a view showing the oscillation characteristics at the time of occurrence of the discharge toward the resonator mirror in the laser apparatus shown in FIG. 69.

Meanwhile, also the occurrence of the discharge 41 toward the output coupler 8 shown in FIG. 74 depends much upon the applied voltage. In the following, the discharge 41 will be described. In the Embodiment 14, where the gap length is represented by d, the distance between the dielectric plates 10, 20 and the output coupler 8 by $L_{wm}$, the difference in length between the metal electrodes 1, 2 and the dielectric plates 10, 20 by L, the discharge starting voltage by V* and the applied voltage peak value by $Vo_p$, the design standard of the distance ($L_{wm}$+L) between the output coupler 8 and the metal electrodes 1, 2 is set in accordance with the following equation (3):

$$L+L_{wm} \geq (Vo_p/V^*)d \qquad (3)$$

($Vo_p$ is an adjustable variable, and V* and d are fixed values.)

It was proved experimentally by the inventors that, under the conditions wherein the equation (3) is satisfied, no discharge 41 toward the output coupler 8 is caused. Further, the discharge power $W_d$ is obtained from the power source frequency f and the dielectric electrostatic capacity C of the discharging section in accordance with the following equation (4):

$$W_d = \pi f C V^* (Vo_p^2 - V^{*2})^{1/2} \qquad (4)$$

(C and f are fixed values.)

Accordingly, as apparent from the equations (3) and (4), when a high discharge power $W_d$ is to be thrown in, $Vo_p$, that is, ($L_{wm}$+ L), should be set to a high value.

Consequently, if the distance ($L_{wm}$+L) between the output coupler 8 and the metal electrodes 1, 2 is set to a large value, then even if the applied voltage is raised, occurrence of the discharge toward the optical resonator mirror 7 can be prevented.

EMBODIMENT 15

Further, if the construction of the Embodiment 14 described above is modified such that the width W of the metal electrodes 1 and 2 is set substantially equal to the width of a laser beam passing between them which is determined by the optical resonator as in the present embodiment shown in FIGS. 20A and 20B, then the discharge energy can be converted into light energy without a loss.

EMBODIMENT 16

In the present embodiment, making use of the fact that the width of the metal electrodes 1 and 2 is smaller than the width W' of the dielectric plates 10 and 20, a pair of spacers 16 and 17 are disposed between the dielectric plates 10 and 20 between which the metal electrodes 1 and 2 are not present as shown in FIGS. 21A and 21B so that the distance between the surfaces (light reflecting faces) of the dielectric plates 10 and 20 is kept fixed.

Consequently, the gap distance between the dielectric plates 10 and 20 can be kept fixed without having an influence on the discharge of a laser beam. It is to be noted that, if the spacers 16 and 17 are constituted from an incombustible material against a laser beam, then a laser beam which may be produced other than in the direction of the regular optic axis by diffracted light of a laser beam or mis-alignment of the resonator causes no undesirable effect.

Further, since the spacers 16 and 17 are formed from an insulating substance such as ceramics, they do not have an influence on the discharge at all and the anticipated objects can be achieved.

Furthermore, if the spacers 16 and 17 are constituted from a metal, they can be produced at a low cost. In this instance, the somewhat pinched discharge is observed at the spacer portions. However, according to the inventors, it was confirmed that the discharge does not have an influence on the laser characteristic.

EMBODIMENT 17

Figure 22:
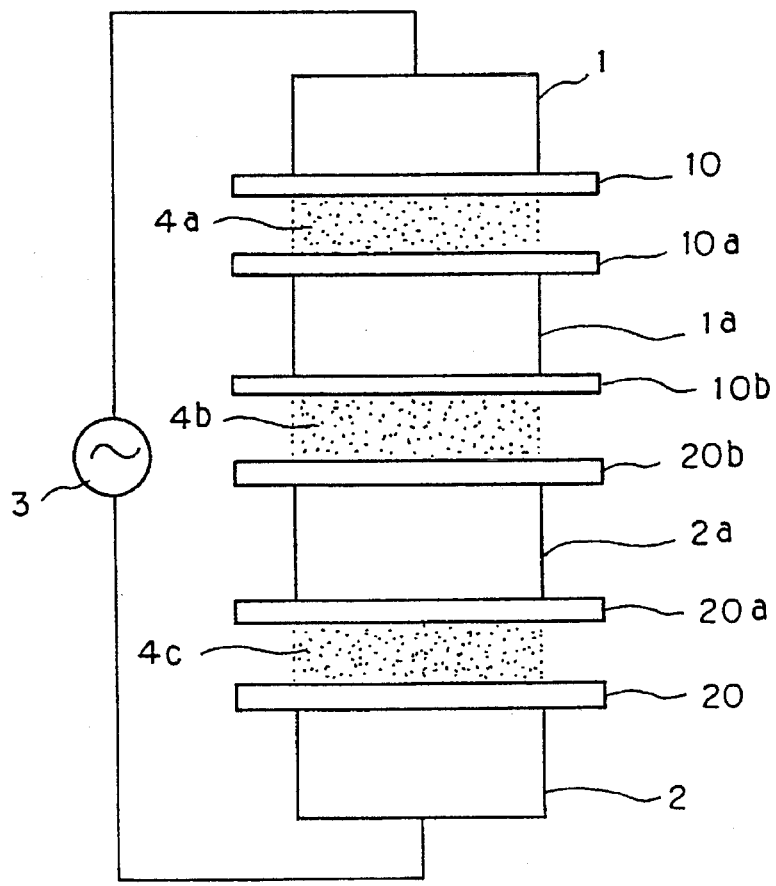
FIG. 22 is a side elevational view of a gas laser apparatus according to a yet further embodiment of the present invention.

FIG. 22 is a sectional view showing the Embodiment 17 of the present invention. Referring to FIG. 22, reference characters 1a and 2a each denote a conducting member, and 10a, 10b, 20a and 20b each denote a dielectric plate. The dielectric plates 10a, 10b, 20a and 20b may each be made of a metal plate which is coated with a dielectric layer. With this construction, the heat transfer rates of the dielectric plates 10a, 10b, 20a and 20b are raised, and the gas cooling efficiency is enhanced.

The dielectric plate 10a is disposed in an opposing relationship to the dielectric plate 10, and the dielectric plate 20a is disposed in an opposing relationship to the dielectric plate 20. Further, the dielectric plates 10b and 20b are disposed in an opposing relationship to each other. And, the conductive bodies 1a and 2a are held between the dielectric plates 10a and 10b and between the dielectric plates 20a and 20b, respectively, so that they are in an electrically floating condition.

Accordingly, the discharge space 4 is divided into three discharge spaces 4a, 4b and 4c. Further, the conductive bodies 1a and 2a and the feed electrodes 1, 2 are kept in a condition in which they are cooled with water.

Subsequently, operation will be described. With the gas laser apparatus of the present embodiment, since the discharge space 4 is divided into the three discharge spaces 4a, 4b and 4c and the feed electrodes 1 and 2 and the conductive bodies 1a, 2a are cooled with water, laser gas produced in the discharge spaces 4a, 4b and 4c is cooled efficiently.

Meanwhile, since a high electric field portion for maintaining the discharge appears in the proximity of each of the feed electrodes 1 and 2, the discharge space 4b which is spaced away from the high electric field portions becomes a region of a low electric field which is suitable for laser oscillation. Accordingly, even when a low frequency power source is employed, if attention is paid to the discharge space 4b, then it is superior in cooling capacity and excitation of a high efficiency is possible.

Further, since the efficiency of a lower frequency power source is higher than the efficiency of a high frequency power source, the laser output which is extracted per unit length of the discharge is as high as that excited by a high frequency. In particular, while the discharge energy thrown into the spaces 4a and 4c makes a loss, since the efficiency of a low frequency power source is higher than the efficiency of a high frequency power source, it is possible to design the efficiency of the entire gas laser apparatus so that it may be equal to the excitation efficiency of a high frequency.

Furthermore, if the light path of a laser beam is turned back so as to utilize the energy of the discharge spaces 4a and 4c again, then the efficiency of the gas laser apparatus can be further enhanced.

EMBODIMENT 18

Figure 23:
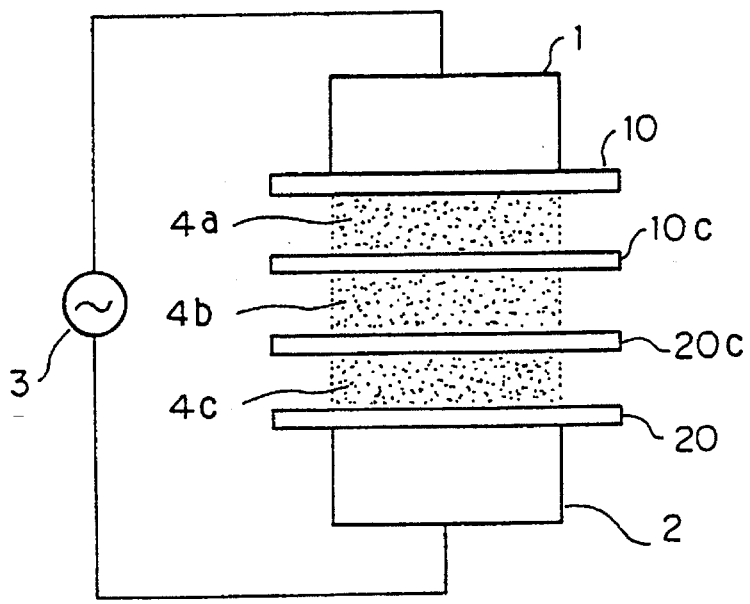
FIG. 23 is a side elevational view of a gas laser apparatus according to a yet further embodiment of the present invention.

While, in the preceding Embodiment 17, the dielectric plates 10a and 10b are provided at the opposite end portions of the conductive body 1a while the dielectric plates 20a and 20b are provided at the opposite end portions of the conductive body 2a and the discharge space 4 is divided into the three discharge spaces 4a, 4b and 4c, similar effects can be obtained even by disposing a pair of dielectric plates 10c and 20c in a predetermined spaced relationship between the discharge spaces 4a, 4b and 4c as in the present embodiment shown in FIG. 23. However, in this instance, it is necessary to cool the dielectric plates 10c and 20c, and accordingly, it is necessary to select a material having a high heat transfer rate.

EMBODIMENT 19

Figure 24:
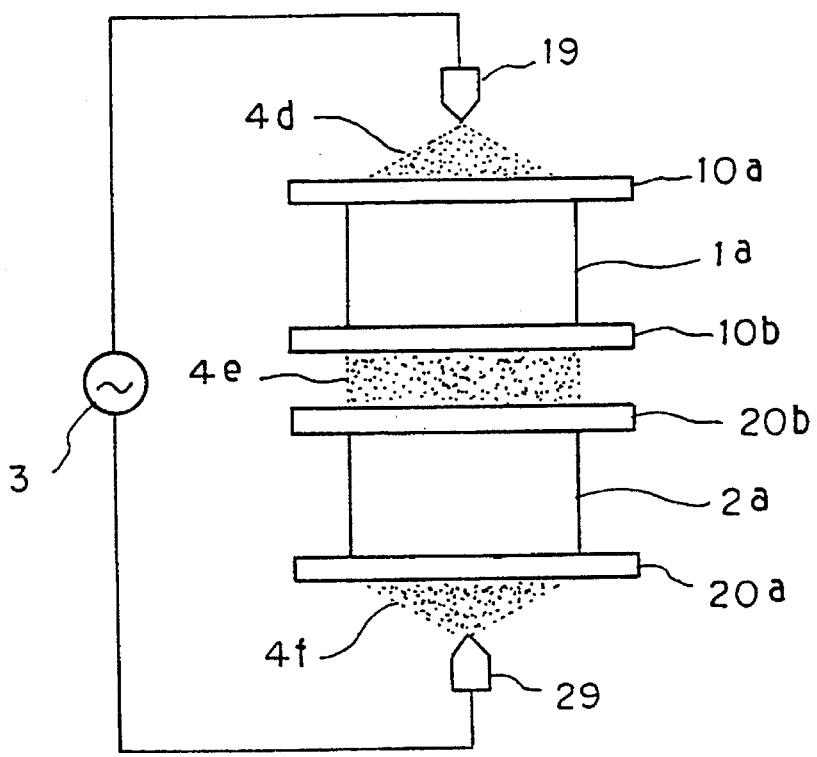
FIG. 24 is a side elevational view of a gas laser apparatus according to a yet further embodiment of the present invention.

Further, while, in the preceding Embodiment 17, the feed electrodes 1 and 2 are coated with dielectric layers, metal electrodes 19 and 29 which are not coated with dielectric layers as shown in FIG. 24 may alternatively be employed. In this instance, the ends of the metal electrodes 19 and 29 should be made sharp or pointed so as to settle the occurring positions of the discharge 4d and 4f from the metal electrodes 19 and 29. It is to be noted that reference character 4e denotes a discharge space.

While a $CO_2$ laser is described by way of an example in the Embodiments 17 to 19, the present invention can be applied to other gas lasers such as a CO laser which are required to cause excitation by low energy electrons similarly to a $CO_2$ laser.

EMBODIMENT 20

FIG. 25 is a perspective view showing the Embodiment 20 of the present invention. Referring to FIG. 25, reference numeral 105 denotes an outer pipe formed in a cylindrical profile, and 205 an inner pipe formed in a cylindrical profile. The outer and inner pipes 105 and 205 are each formed from a dielectric plate and are disposed on a common axis. A discharge space 4 is formed between the outer and inner pipes 105 and 205 and has a cylindrical profile (having a doughnut-shaped section).

The feed electrodes 1 and 2 are disposed on an outer periphery of the outer pipe 105 and connected to the ac power source 3. The inner pipe 205 is formed from a conductor and is normally cooled in an electrically floating condition. Further, the distance (discharge gap: d) between the inner and outer pipes 205 and 105 is set to 2 mm.

In the present embodiment, if a high ac voltage is applied between the electrodes 1 and 2, then the discharge is caused in the discharge space 4. Gas present in the discharge space 4 is excited by the discharge so that a laser beam 9 is extracted to the outside from the optical resonator mirrors 7 and 8 disposed in the proximity of the opposite ends of the discharge space 4. In this instance, the outer surface of the inner pipe 205 and the inner surface of the outer pipe 105 act as wave guides for the laser beam.

Figure 26A:
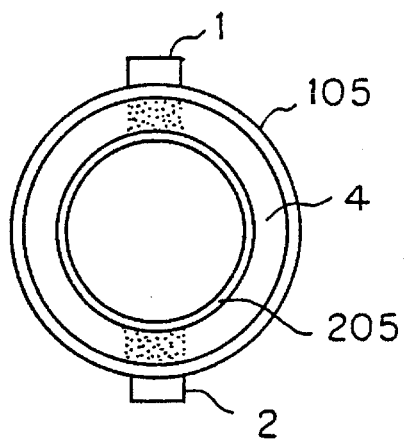
FIGS. 26A and 26B are side elevational views showing manners of the discharge when the applied voltage of the gas laser apparatus of FIG. 25 is low and high, respectively.
Figure 26B:
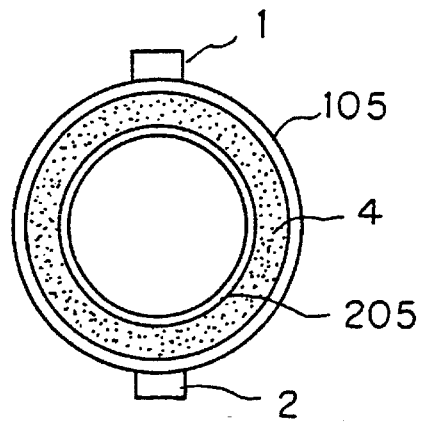

When the applied voltage is low, the discharge is caused only in the proximity of the feed electrodes 1 and 2 as shown in FIG. 26A. However, if compared with the flat plate electrodes shown in FIG. 19 and so forth, the equivalent gap length is twice, and accordingly, excitation with high efficiency is possible. Meanwhile, if the applied voltage rises, then the discharge spreads to the entire discharge space 4 as seen in FIG. 26B, and consequently, good laser excitation having a long equivalent gap length is possible.

EMBODIMENT 21

Figure 27:
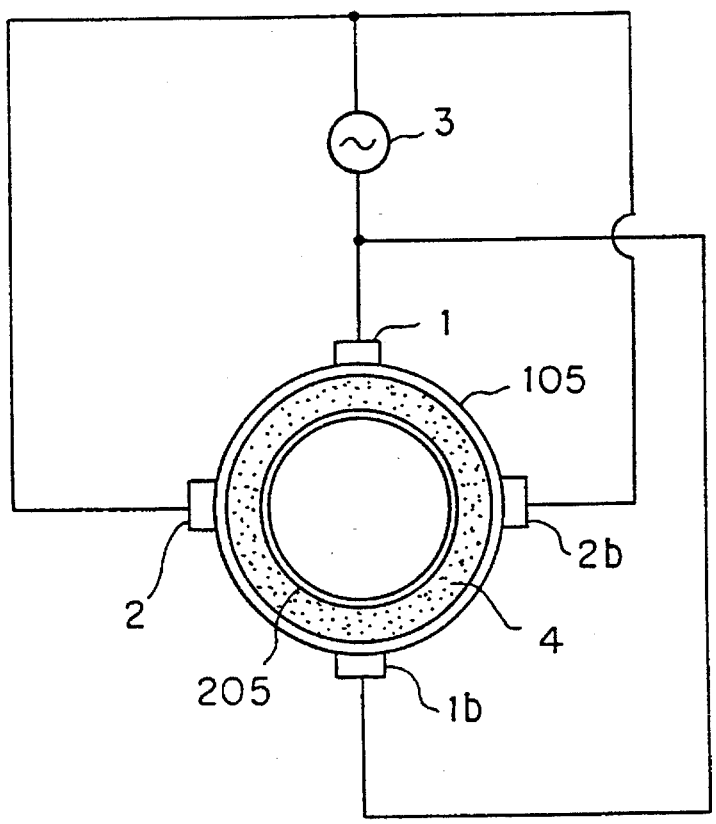
FIG. 27 is a side elevational view of a gas laser apparatus according to a yet further embodiment of the present invention.

Meanwhile, if the construction of the preceding Embodiment 20 is modified such that a plurality of feed electrodes 1b and 2b are provided in addition to the feed electrodes 1 and 2 as shown in FIG. 27, there is an effect that, even if the voltage to be applied to each electrode is low, the discharge spreads to the entire region.

EMBODIMENT 22

Figure 28:
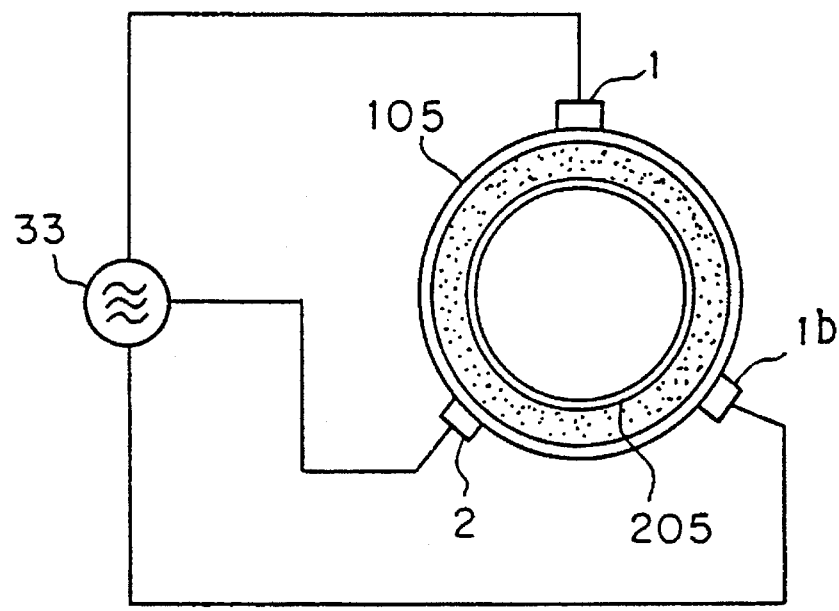
FIG. 28 is a side elevational view of a gas laser apparatus according to a yet further embodiment of the present invention.

While the preceding Embodiments 20 and 21 show an example which employs a common power source, separate power sources may otherwise be connected to the different electrodes. Further, similar effects can be obtained even where a polyphase power source 33 is employed as shown in FIG. 28 (in which the power source 33 shown is a three-phase power source).

It is to be noted that, if the inner pipe 205 shown in FIGS. 25 to 28 is constituted from a dielectric, then concentration of the discharge in the proximity of the feed electrodes is moderated and the further diffusive discharge can be realized.

EMBODIMENT 23

Figure 29:
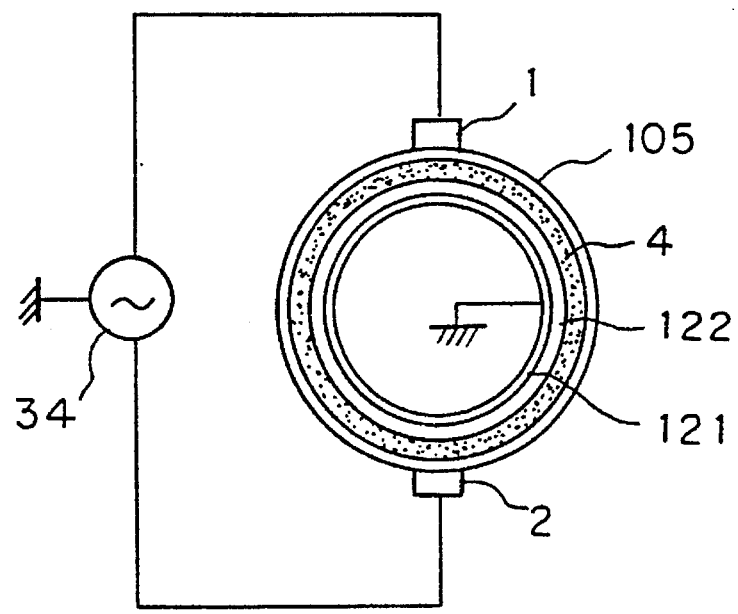
FIG. 29 is a side elevational view of a gas laser apparatus according to a yet further embodiment of the present invention.

Further, if a composite pipe wherein a metal pipe 121 is attached on an inner peripheral face of a dielectric layer 122 of glass or the like is used as the inner tube and cooling water flows in the metal pipe 121 in place of the dielectric layer 122 as shown in FIG. 29, then even if the dielectric layer 122 is damaged by discharge energy, there is no possibility of leakage of water.

Further, in FIG. 29, since the metal pipe 121 is grounded using a neutral point grounding power source 34, the discharge spreads in the entire discharge space 4 at a further low voltage.

EMBODIMENT 24

Figure 30:
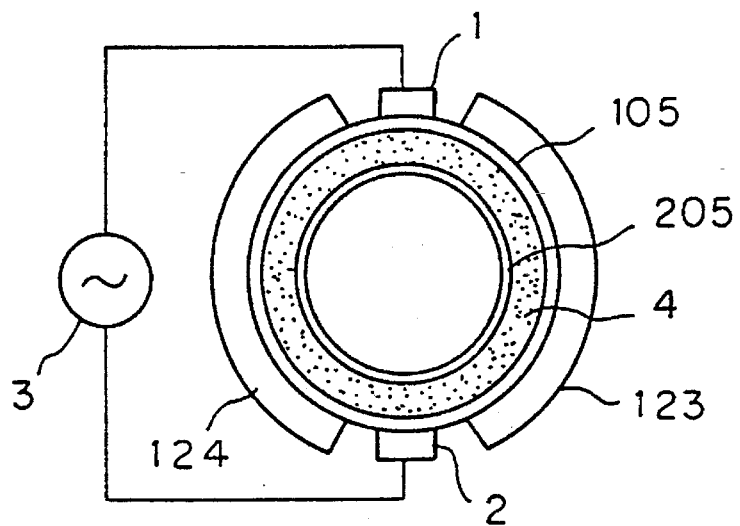
FIG. 30 is a side elevational view of a gas laser apparatus according to a yet further embodiment of the present invention.

Further, the construction of the Embodiment 20 is modified such that a pair of metal elements 123 and 124 which are in an electrically floating condition and have a self cooling function are disposed in an alternate relationship with the feed electrodes 1 and 2 at locations on the outer periphery of the outer pipe 105 where the feed electrodes 1 and 2 are not provided as shown in FIG. 30. Laser gas in the discharge space 4 can be cooled further effectively.

EMBODIMENT 25

Figure 31:
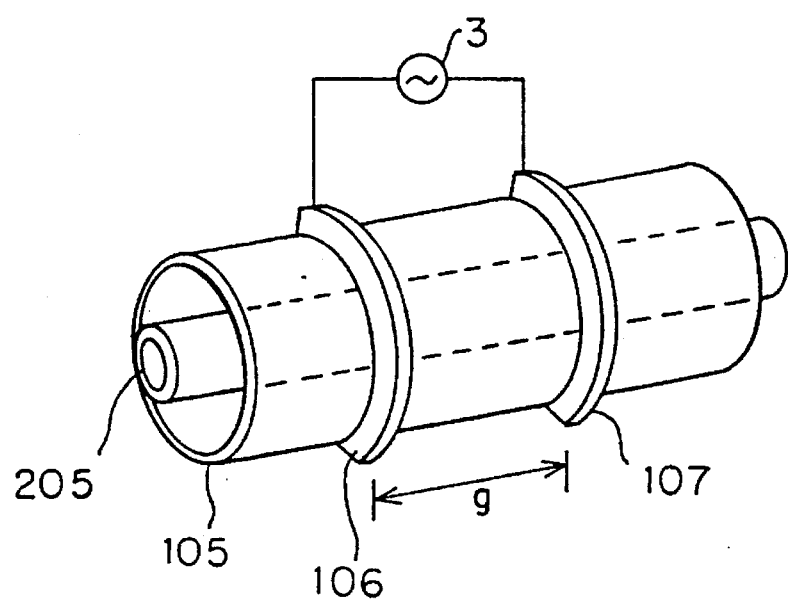
FIG. 31 is a perspective view showing a gas laser apparatus according to a yet further embodiment of the present invention.

While the case wherein the discharge is caused in radial directions of the cylindrical discharge space 4 is described in the Embodiments 20 to 24, the present invention is not limited to this, and quite similar effects to those of the embodiments can be obtained even if a plurality of electrodes 106 and 107 which are divided in the outgoing direction of a laser beam are provided as shown in FIG. 31.

In particular, where the discharge is caused in the direction of the optic axis, the gap length g can be set arbitrarily. Accordingly, laser excitation of a high efficiency can be performed even if a power source of a low frequency is used. In this instance, the uniformity of the discharge on the annular sectional area of the discharge space 4 is very superior.

Further, while the single RF power source 3 is employed in the present embodiment, otherwise a plurality of power sources or such a polyphase power source 33 as shown in FIG. 28 may be employed instead.

EMBODIMENT 26

Figure 32:
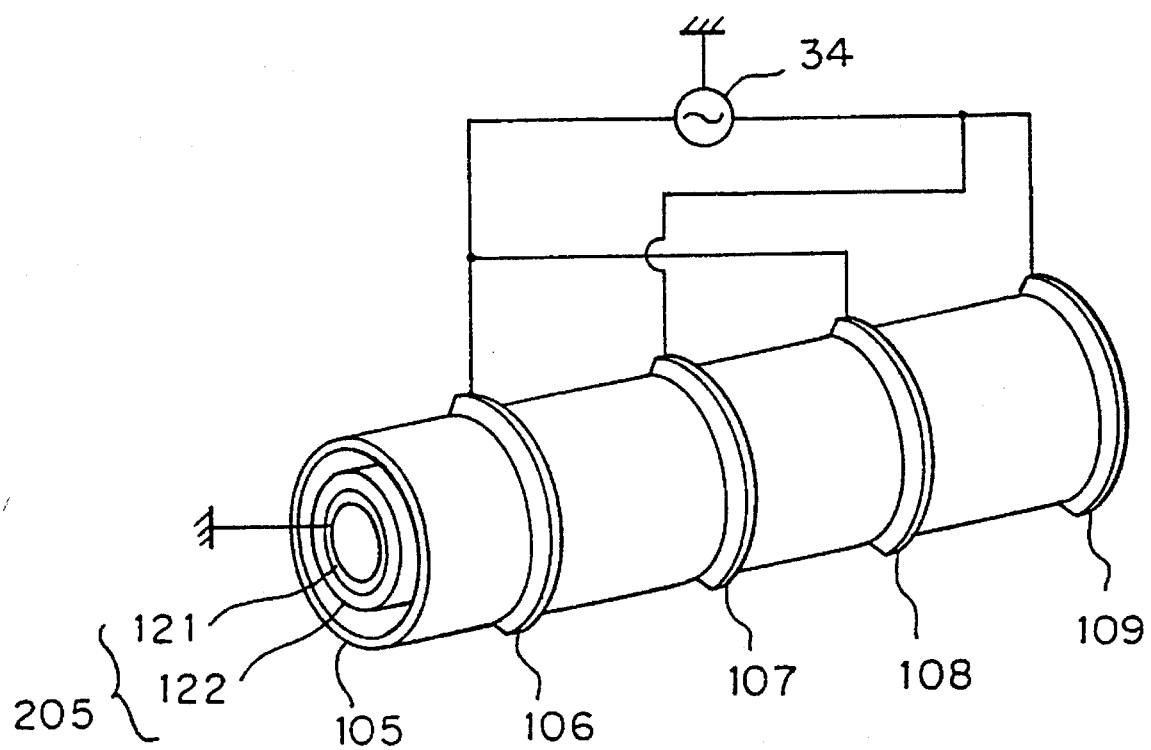
FIG. 32 is a perspective view showing a gas laser apparatus according to a yet further embodiment of the present invention.

The inner tube 205 may be formed from a metal, a dielectric or a metal having a dielectric coated on the surface thereof as described hereinabove in connection with the Embodiments 20 to 25. Particularly where the neutral point grounding power source 34 is used as shown in FIG. 32 and the inner pipe is grounded, when the discharge starts between the metal inner pipe 205 and the feed electrodes 106, 107, 108 and 109, the discharge region is expanded as the applied voltage rises, and accordingly, the construction is practical without the necessity of an over-voltage. Particularly where the metal inner pipe 121 is coated with the dielectric 122, discharge is further uniformed and the effect is high.

Furthermore, while a $CO_2$ laser is described in the Embodiments 20 to 26, the present invention is not limited to this and can be applied to some other gas lasers such as a CO laser which is required to assure excitation by low energy electrons.

EMBODIMENT 27

Figure 33:
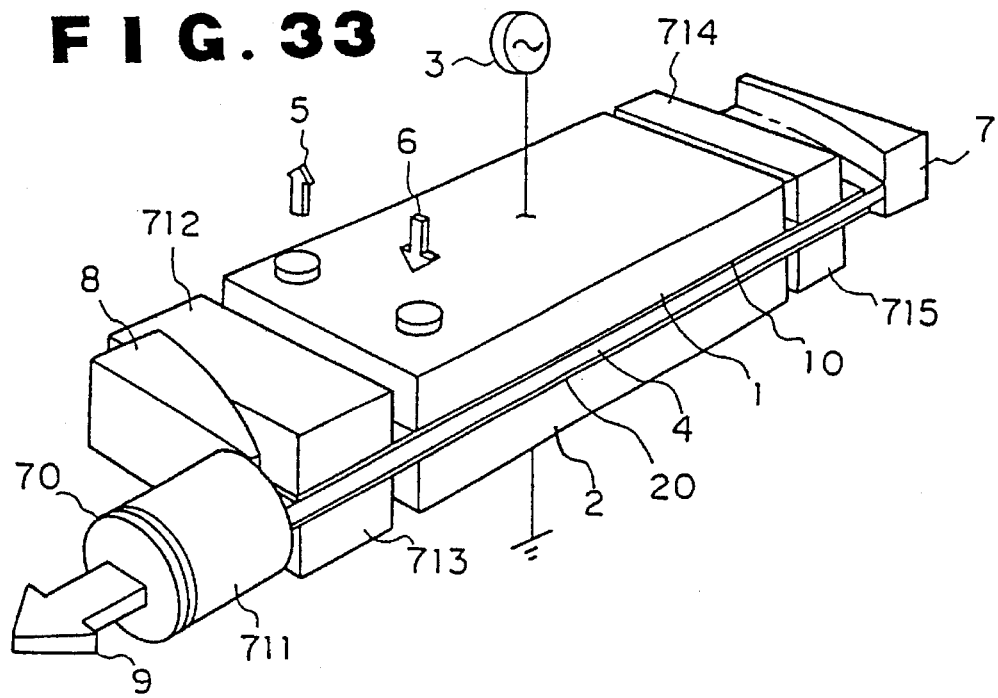
FIG. 33 is a perspective view of a laser apparatus according to an Embodiment 27 of the present invention.

FIG. 33 is a perspective view of a laser apparatus according to Embodiment 27 of the present invention. In this figure, reference numeral 70 designates a laser beam output window as the atmosphere shield window arranged on the side of the output coupler 8 for removing a laser beam. This output window 70 is installed away from the output coupler 8.

Accordingly, a portion between the output coupler 8 and the output window 70 forms a non-discharge portion (a non-excitation portion) through which a laser beam 9 passes. In this non-discharge portion is arranged a cooling duct 711 as a laser gas cooling means.

The cooling duct 711 has a rectangular opening in the central portion thereof. The length of major side and minor side of the rectangular opening is set to three times or less of the major side and the minor side of the laser beam which passes through the cooling duct 711.

Further, in the Embodiment 27, dimensions of the lengths of metal electrodes 1 and 2 are set to be shorter than dimensions of the length of dielectric plates 10 and 20. Both lengthwise ends of the dielectric plates 10 and 20 are extended toward the reflection mirrors 7 and 8 from both lengthwise ends of the metal electrodes 1 and 2.

Accordingly, a portion between the metal electrodes 1, 2 and the reflection mirrors 7, 8 also forms a non-discharge portion (a non-excitation portion). In these non-discharge portions are arranged, as laser gas cooling means, cooling pipes 712, 713 and 714, 715 having a cooling function which are electrically floated or grounded.

Generally, since the output coupler 8 and the output window 70 are arranged away from each other, the laser beam can be naturally propagated to increase a beam diameter at the position of the output window 70.

Figure 35:
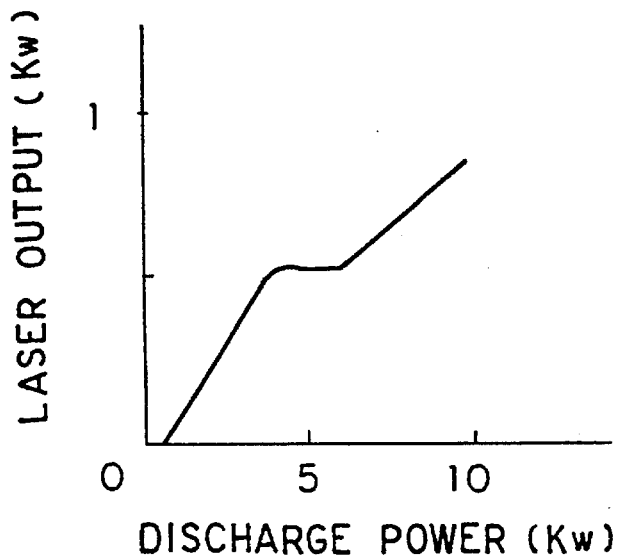
FIG. 35 is a graphic representation showing the laser oscillation characteristics of a conventional laser apparatus in comparison with the laser apparatus shown in FIG. 33.

In FIG. 33, the output coupler 8 and the output window 70 are merely arranged away from each other, FIG. 35 shows the characteristics of laser oscillation of a conventional laser apparatus having no laser gas cooling means.

As will be apparent from FIG. 35, a laser output along with a discharge electric power linearly extends in a low output region. However, a saturation phenomenon of output is once observed at a position where laser output is approximately 500 W, and it has been confirmed that as an input increases, a laser output again increases. It has been found that an inclination (efficiency) of the laser output after saturation is lower than that prior to saturation. It has become clear that the intensity of light at which output is saturated largely depends upon the concentration of carbon dioxide, and the lower the concentration of carbon dioxide, the output saturation is harder to occur.

It has been found as the result of the detailed study that the aforesaid phenomenon is the saturation phenomenon of the output due to the absorption of the laser light of carbon dioxide gas in the non-excitation and non-cooling space. That is, the saturation phenomenon of the output results from the effect of light absorption in the space which is not excited (in which reversal distribution is not formed) and which is not cooled, for example, in the space between the discharge space 4 and the reflection mirrors 7, 8 or between the output coupler 8 and the output window 70.

Figure 36:
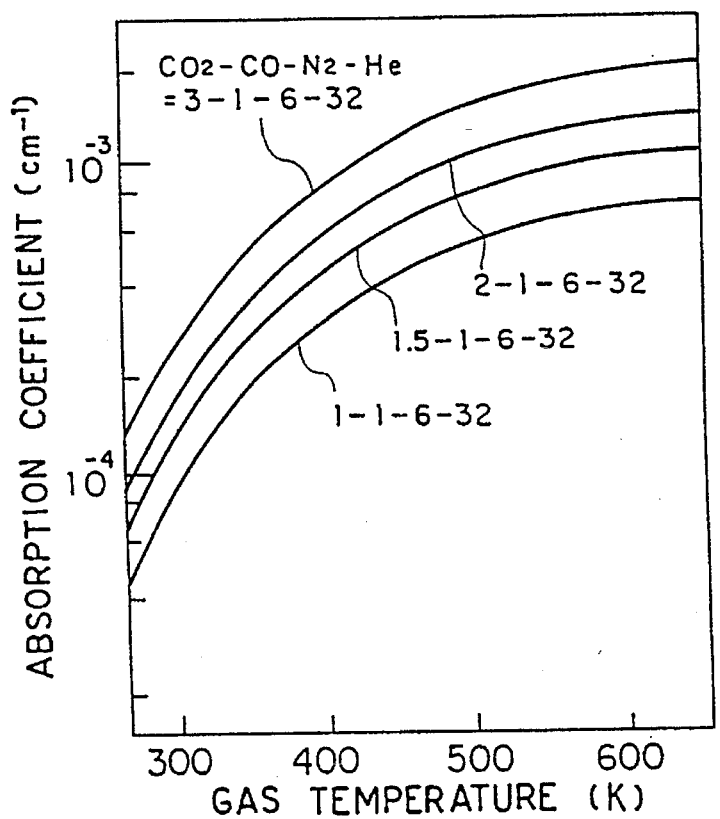
FIG. 36 is a graphic representation showing the relationship between the coefficient of light absorption of carbon dioxide and the gas temperature in the laser apparatus.

Now, the relationship between the coefficient of light absorption of the carbon dioxide gas and the gas temperature is shown in FIG. 36. As will be apparent from FIG. 36, it is understood that as the gas temperature rises, the coefficient of light absorption increases, and finally a saturation occurs. That is, the process is repeated such that in the non-excitation space, the carbon dioxide gas absorbs the energy of the laser beam to induce a rise of gas temperature and the absorption amount of the energy increases. In this process, even if the input increases, the absorption amount of light increases, and therefore the laser output does not increase, and when the gas temperature reaches approximately 600 K., the coefficient of light absorption stops increasing.

As described above, the conventional laser apparatus has problems in that the effect of light absorption increases in the non-excitation space and non-cooling space particularly at the time of high laser output increases, and by this effect of light absorption, the saturation phenomenon of laser output occurs or the oscillation efficiency lowers.

However, in this Embodiment 27, the laser gas cooling means (the cooling duct 711 and the cooling pipes 712, 713, 714 and 715) is provided in the non-discharge portions in the passage of the laser beam (between the output coupler 8 and the output window 70, and between the metal electrodes 1, 2 and the reflection mirrors 7, 8), whereby in the non-discharge portion (non-excitation space) where no reversal distribution occurs, heat caused by light absorption is present but the cooling thereof is sufficiently carried out so that the effect of light absorption can be minimized. Thereby, the rise of gas temperature is small. Accordingly, the coefficient of light absorption is suppressed to a low value, and the laser output with a high efficiency becomes possible.

Figure 34:
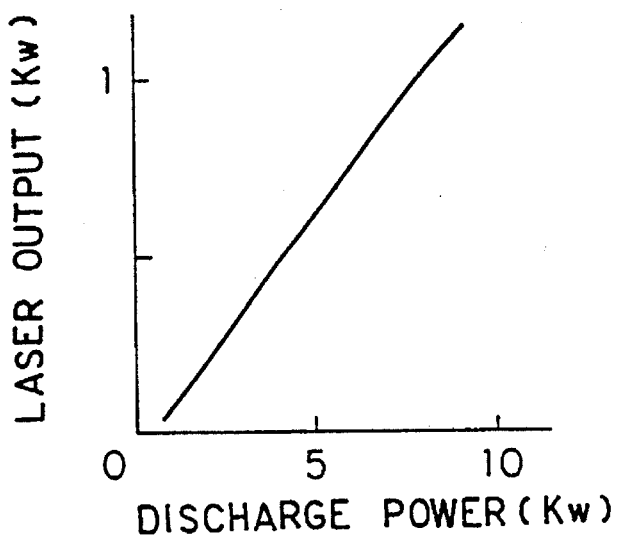
FIG. 34 is a graphic representation showing the laser oscillation characteristics of the laser apparatus shown in FIG. 33.

FIG. 34 is a view showing the characteristics of laser oscillation according to Embodiment 27. As will be apparent from this figure, according to Embodiment 27, the saturation phenomenon of the laser output and the lowering of the oscillation efficiency as seen in FIG. 35 are not at all observed, and the laser apparatus with high efficiency is obtained.

Figure 37:
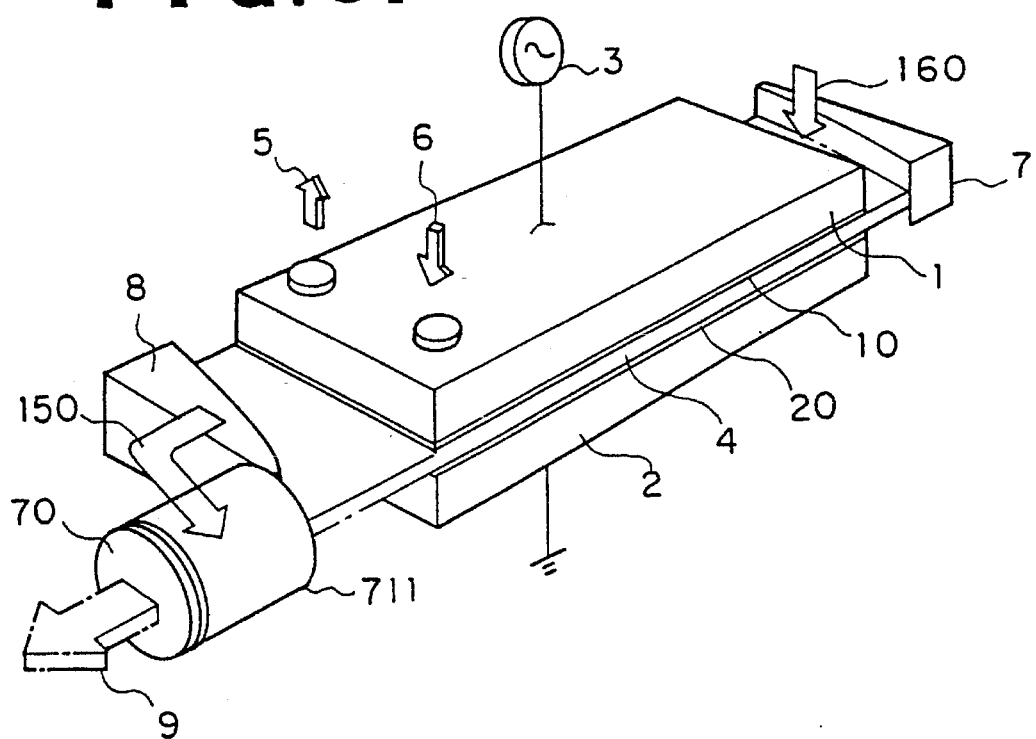
FIG. 37 is a perspective view of a laser apparatus according to an Embodiment 28 of the present invention.

FIG. 37 is a perspective view of a laser apparatus according to Embodiment 28 of the present invention. In the Embodiment 28, a small blower or the like is installed as a gas flow generating means so that as indicated by the arrow in the non-excitation portion, gas flows 150, 160 are forcibly generated, and the temperature rise of the laser gas at the non-excitation portion is suppressed by the gas flows 150, 160. This also provides the effect similar to that of the Embodiment 27.

EMBODIMENT 29

Figure 38:
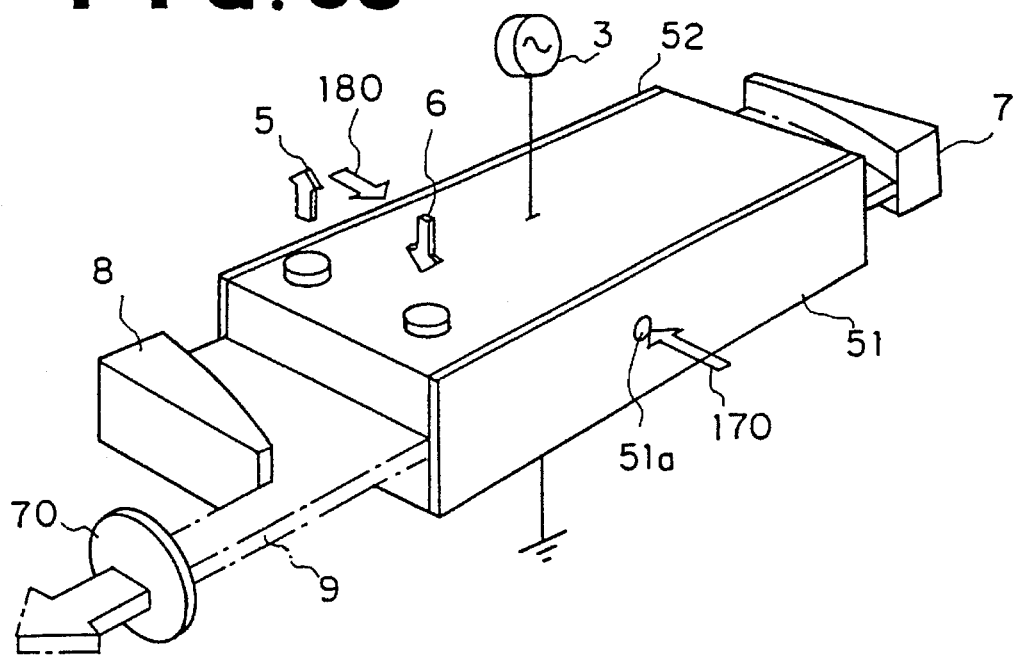
FIG. 38 is a perspective view of a laser apparatus according to an Embodiment 29 of the present invention.

FIG. 38 is a perspective view of a laser apparatus according to Embodiment 29 of the present invention. In this Embodiment 29, side plates 51 and 52 for preventing a leakage of laser gas are provided on both sides of a discharge space 4 formed between dielectric plates 10 and 20. Gas flow passages 51a and 52a (only 51a is shown) are provided in the midst of the side plates 51 and 52. A laser gas is supplied from the gas flow passages 51a and 52a into the discharge space 4 as indicated by arrows 170 and 180, and gas is always exhausted by a vacuum pump (not shown) so that gas pressure in the discharge space 4 is constant.

With the construction as described above, a gas flow occurs from the central portion of the discharge space 4 toward the reflection mirrors 7 and 8, and the similar effect is obtained. In this case, in the discharge space 4, the carbon dioxide gas is subjected to electron collision and dissociated into carbon monoxide and oxygen as given by the following formula:

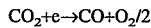

$$CO_2 + e \rightarrow CO + O_2/2$$

For this reason, there is a most generous effect of obtaining an ideal situation wherein in the discharge space, the concentration of carbon dioxide gas is high, and in the non-excitation space, the concentration of carbon dioxide gas is low. From a view point that a low temperature gas flows into the non-excitation portion, the flow of the laser gas (arrows 170, 180) in FIG. 38 may be reversed. That is, it is significant to provide an arrangement wherein a laser gas is introduced from the non-excitation portion into the discharge space 4 and a laser gas is discharged from the central portion of the electrode (gas flow passages 51a, 52a of the side plates 51, 52).

While in the Embodiment 29, the case has been described in which the dissociation phenomenon of the carbon dioxide caused by discharge is utilized to provide a difference in the concentration of carbon dioxide between the excitation space and the non-excitation space, it is to be noted in short that if the concentration of carbon dioxide in the non-excitation space is suppressed to be low, a similar effect is obtained.

EMBODIMENT 30

Figure 39:
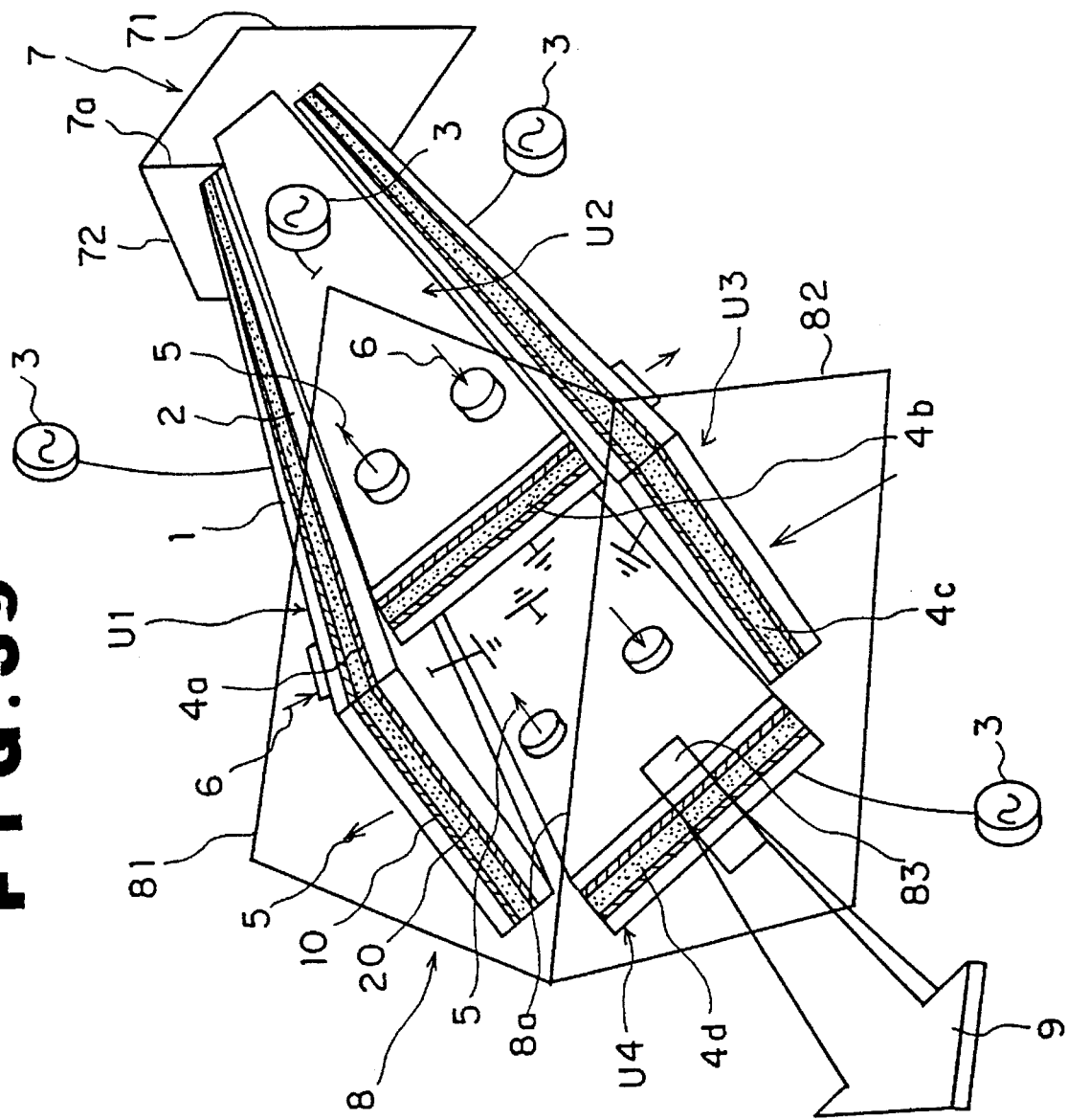
FIG. 39 is a perspective view of a laser apparatus according to an Embodiment 30 of the present invention.

FIG. 39 is a perspective view of a waveguide path type $CO_2$ laser apparatus according to Embodiment 30 of the present invention. In this Embodiment 30, a pair of flat-plate like metal electrodes 1, 2 opposed to each other and dielectric plates 10, 20 plated in close contact with the opposed surfaces of the metal electrodes 1, 2 to form a discharge space 4 having a rectangular section therebetween constitute one unit, and such four units U1, U2, U3 and U4 are arranged to have a polygonal shape in section (a square shape in section).

With such a construction as described, each of four discharge spaces 4a to 4d formed in the four units U1 to U4 is in the state arranged in a polygonal shape (a square shape in section).

In the Embodiment 30, the one metal electrode 1 of each of the units U1 to U4 is connected to an excitation power source (RF power source) 3, and the discharge spaces 4a to 4d are filled with a mixture gas similarly to prior art.

Further, in the Embodiment 30, reflection mirrors 7, 8 arranged oppositely on both lengthwise end openings of the discharge spaces 4a to 4d are comprised of a series of folded mirror plate portions 71, 72 and 81, 82 folded at a suitable angle through folded lines 7a, 8a, their folding directions being arranged to be different by 90°.

Figure 40:
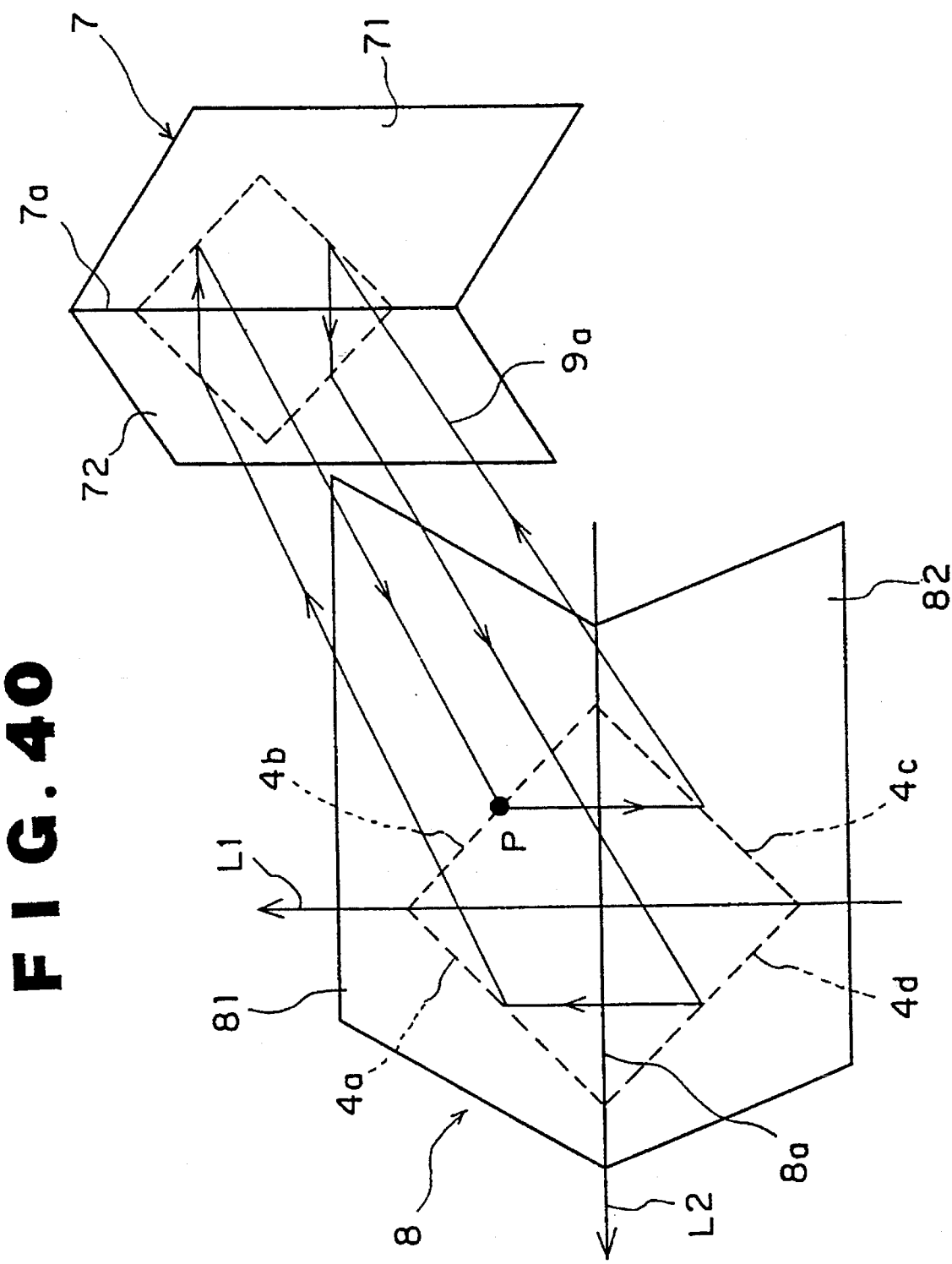
FIG. 40 is a view showing a laser beam light path of the laser apparatus shown in FIG. 39.

More detailedly, in FIG. 40 which shows a beam light path of a laser beam of the waveguide path type $CO_2$ laser apparatus shown in FIG. 39, L1 and L2 represent two linear symmetrical axes which pass a center point of a space section which is surrounded by the discharge spaces 4a, 4b, 4c and 4d to form a beam light path. The reflection mirrors 7 and 8 are arranged so that one out of the linear symmetrical axes L1 and L2 accords with the folding lines 7a, 8a of the reflection mirrors 7, 8, and the directions of the folding lines 7a, 8a are different by 90°.

The linear symmetrical lines L1 and L2 termed herein mean that the space section is symmetrical to left and right with respect to a certain line. For example, in FIG. 40, in the case where the dotted lines are arranged in section of the discharge spaces 4a, 4b, 4c and 4d, when the discharge space section is folded at the portion of the linear symmetric axis L1 or L2, the folded discharge space sections are exactly overlapped to provide an accorded line.

In the reflection mirrors 7 and 8 folded as described above, a rectangular laser beam emitting port 83 as shown in FIG. 39 is provided on the reflection mirror 8 on the laser beam removing side.

In FIG. 40, reference numeral 9a designates a laser beam which is present in the discharge spaces 4a, 4b, 4c and 4d. In FIG. 39, reference numeral 39 designates a laser beam which is emitted from the laser beam emitting port 83.

The operation will be described hereinbelow.

In FIG. 40, the laser beam 9a is reflected downwardly in the direction of the arrow from a black point P of an upper folded mirror plate portion 81 in output coupler 8 and moves forward. The laser beam 9a is turned back and reflected in the direction of one folded mirror plate portion 71 of the other reflection mirror 7 at a lower folded mirror plate portion 82. Then, the laser beam is turned back and reflected in the lateral direction from the folded mirror plate portion 71 toward the other folded mirror plate portion 72 continuous thereto, and thereafter the laser beam is turned back and reflected toward the lower folded mirror plate portion 82 of the one reflection mirror 8 at the folded mirror plate portion 72. In the lower folded mirror plate portion 82, the light beam is turned back and reflected toward the upper folded mirror plate portion 81. In the lower folded mirror plate portion 81, the laser beam is turned back and reflected in the direction of the one folded mirror plate portion 72 (left side in the figure) of the other reflection mirror 7. In this folded mirror plate portion 72, the laser beam is turned back and reflected in the direction of the other folded mirror plate portion 71 (right side in the figure) and thereafter turned back and reflected so as to be returned to the black point P from the folded mirror plate portion 71.

That is, in the output coupler 8, the incident laser beam 9a from the other reflection mirror 7 is turned back and reflected vertically, and in the other reflection mirror 7, the incident laser beam 9a from the output coupler 8 is turned back and reflected in the lateral direction.

Accordingly, the light path of the laser beam 9a which is turned back at the one reflection mirror 7 and is again reflected in the direction of the output coupler 8 is not reversely returned along one and the same light path unlike the light path of the laser beam before being turned back and reflected as previously mentioned.

The laser beam 9a returned to the one reflection mirror 8 is at a position separately from the black point P (the folded mirror plate portion 81 having the black point P is the folded mirror plate portion 82), and the laser beam 9a is again turned back upwardly (the folded mirror plate portion 81) from that position, and turned back and reflected in the direction of the folded mirror plate portion 72 of the other reflection mirror 7. The laser beam 9a reaching the folded mirror plate portion 72 is turned back and reflected in the direction of the folded mirror plate portion 71, and then the laser beam is folded back and reflected in the direction of the folded mirror plate portion 81 of the other reflection mirror at the folded mirror plate portion 71, and returned to the black point P.

As described above, the laser beam 9a is continuous as a single beam, and four beam paths which reciprocate between the reflection mirrors 7 and 8 are formed by the discharge spaces 4a to 4d each having a rectangular section whereby the laser beam 9a is to be amplified.

In short, in the waveguide path type $CO_2$ laser apparatus according to the Embodiment 30, the rectangular sections of the four discharge spaces 4a to 4d are arranged in a square shape, and the turn-back reflection mirrors 7 and 8 are used, whereby the laser beam 9a can be amplified within the respective discharge spaces 4a to 4d, and the thus amplified laser beam 9a can be handled solidly as one laser beam. Thus, the apparatus can be miniaturized, and the ceramic plate as a material for dielectrics 10 and 20 can be divided every unit U1 to U4 for use, thus reducing the cost.

EMBODIMENT 31

Figure 41:
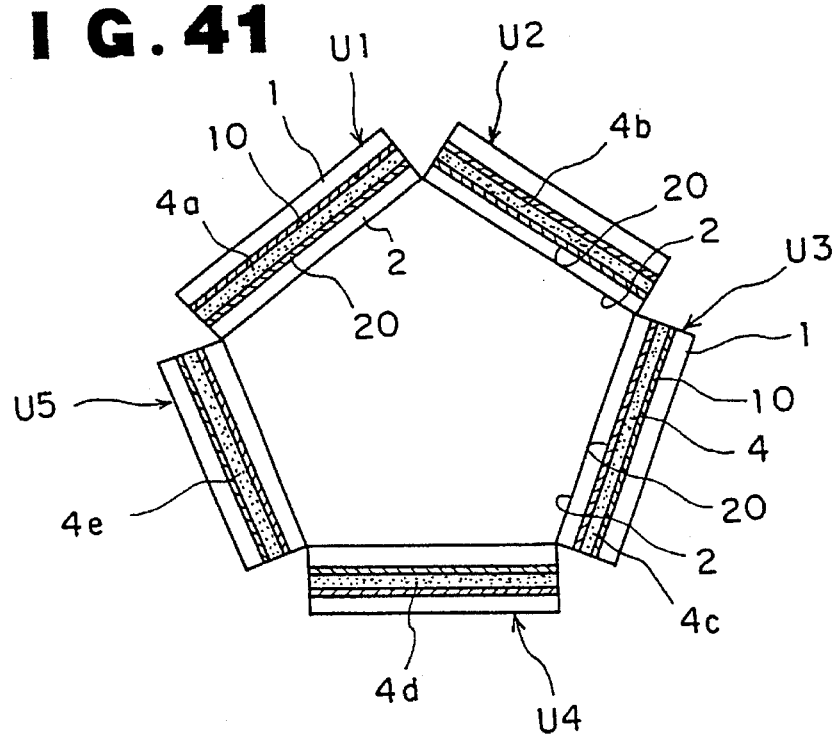
FIG. 41 is a sectional view of a laser apparatus according to an Embodiment 31 of the present invention.
Figure 42:
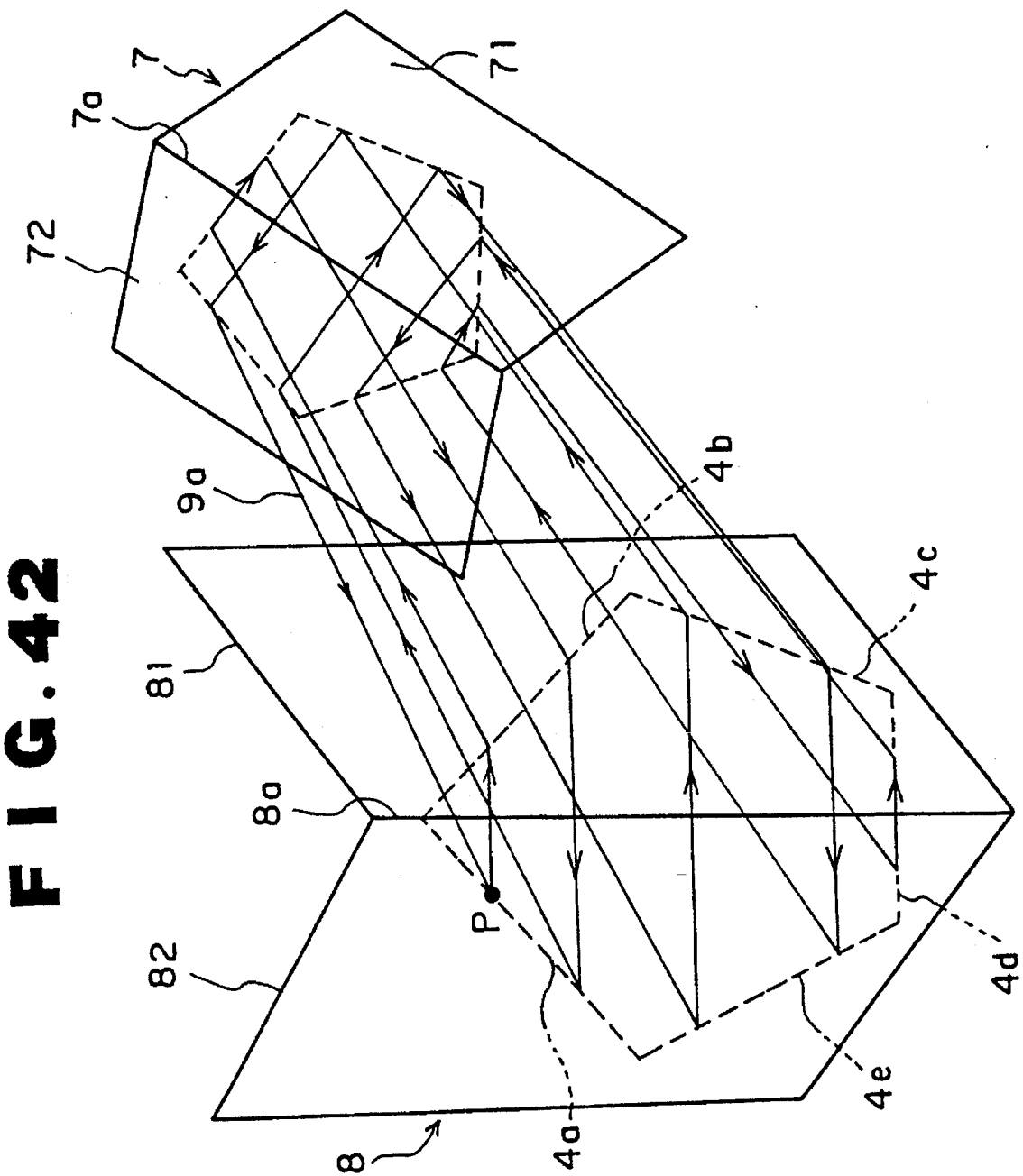
FIG. 42 is a view showing a laser beam light path of the laser apparatus shown in FIG. 41.

FIG. 41 is a sectional view showing a waveguide path type $CO_2$ laser apparatus according to Embodiment 30 of the present invention. FIG. 42 is a perspective view showing a beam path of a laser beam shown in FIG. 41.

In the Embodiment 30, four units U1 to U4 are arranged so that the rectangular sections of the respective discharge spaces 4a to 4d are in the square shape, whereas in the Embodiment 31, five units U1 to U5 are used, and rectangular sections of the discharge spaces 4a to 4e are arranged in a pentagon shape.

The operation of the Embodiment 31 is similar to that of the Embodiment 30 but the beam path of the laser beam 9a is a beam path shown at the arrow in FIG. 42 unlike the case of the Embodiment 30. The operation and effects are similar to those of the case of the Embodiment 30.

EMBODIMENT 32

Figure 43:
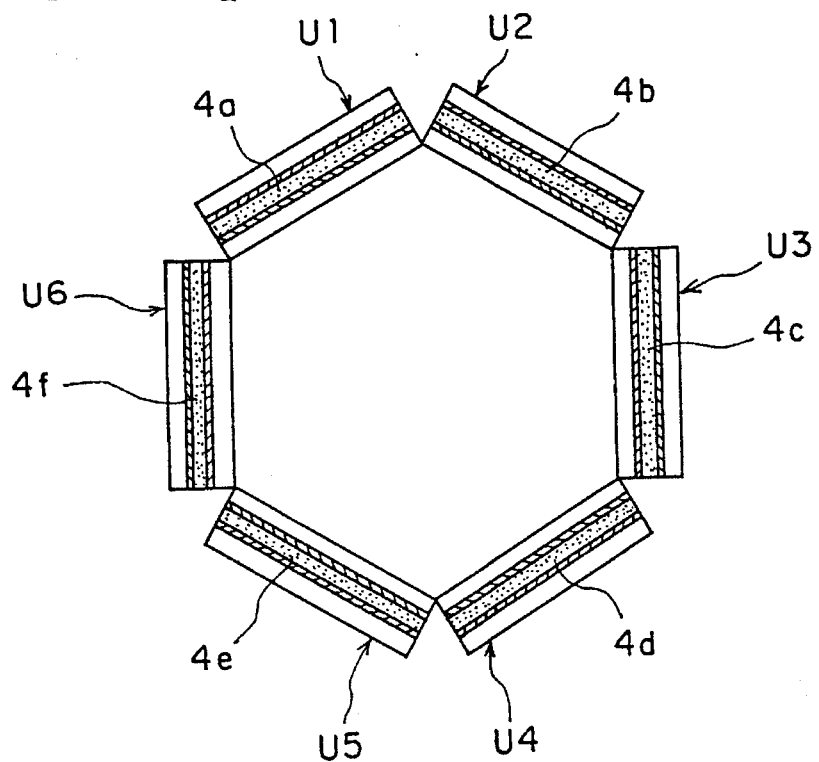
FIG. 43 is a sectional view of the laser apparatus according to an Embodiment 32 of the present invention.
Figure 44:
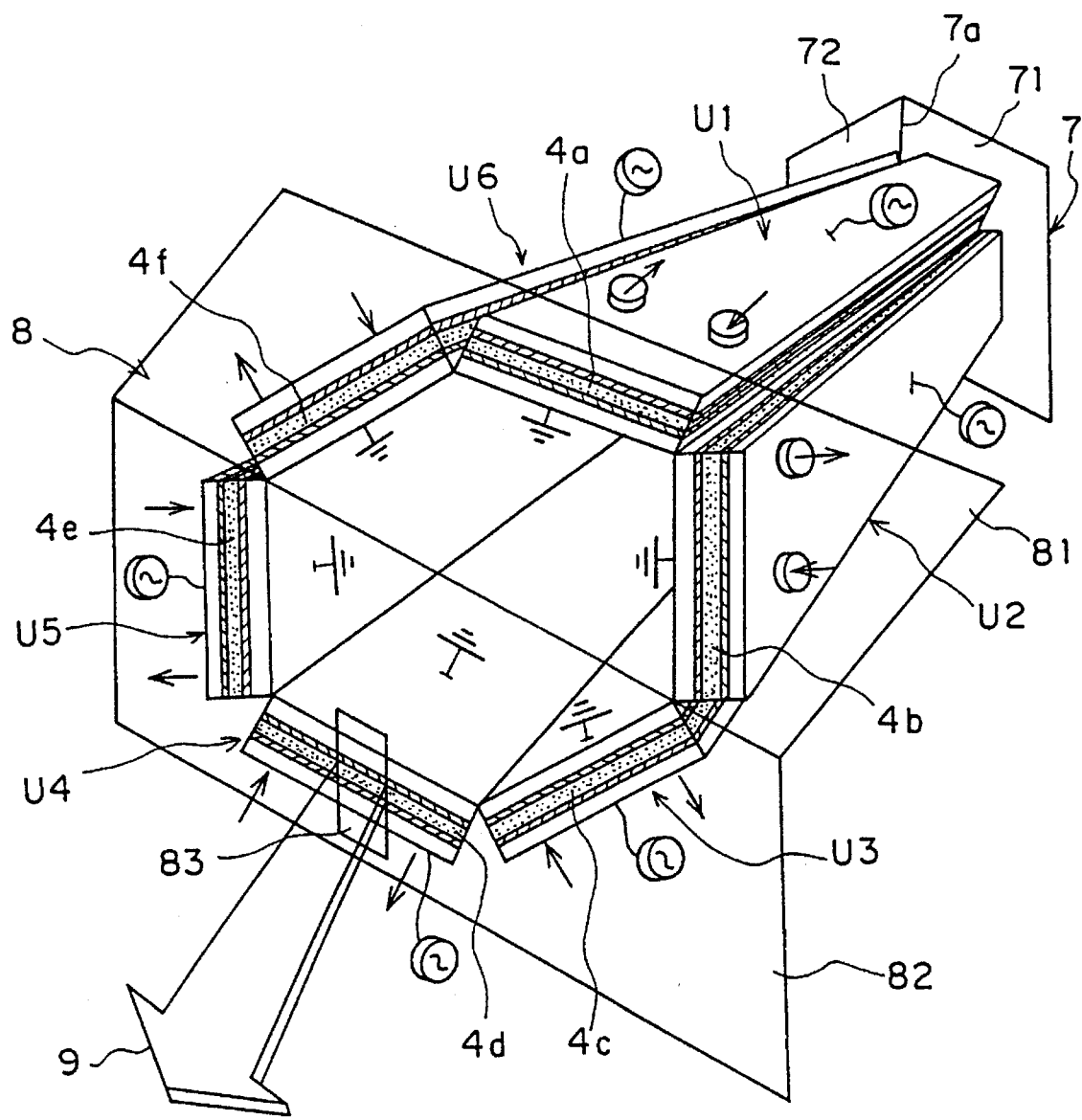
FIG. 44 is a perspective view of the laser apparatus shown in FIG. 43.
Figure 45:
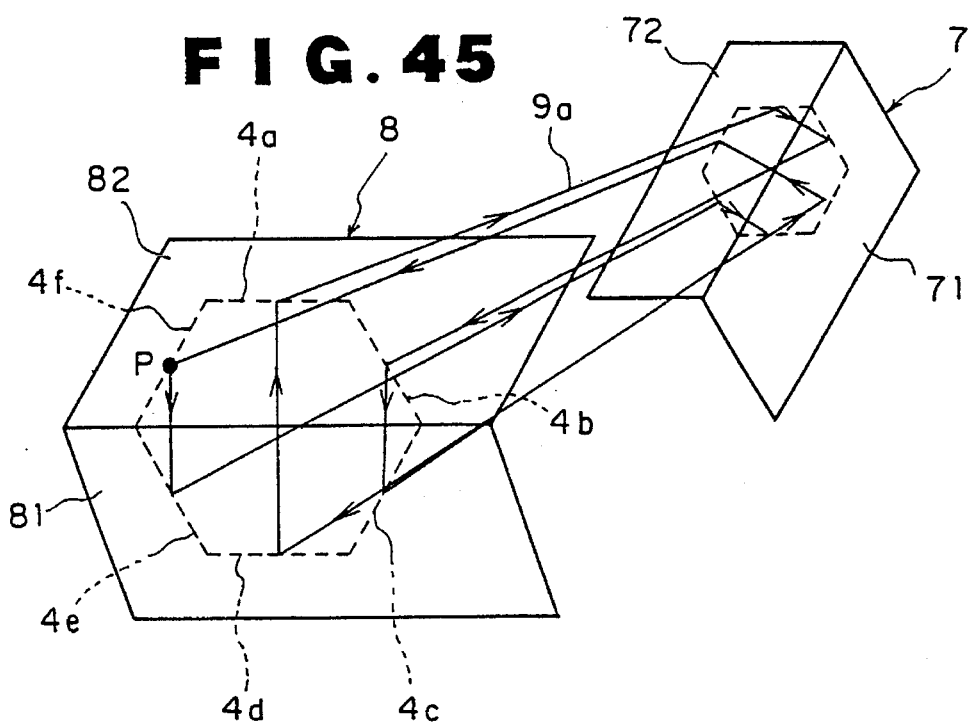
FIG. 45 is a view showing a laser beam light path shown in FIG. 44.

FIG. 43 is a sectional view showing a waveguide path type $CO_2$ laser apparatus according to Embodiment 32 of the present invention. FIG. 44 is a perspective view showing a beam path of a laser beam shown in FIG. 45.

In the Embodiment 32, six units U1 to U6 are used, and rectangular sections of the discharge spaces 4a to 4f are arranged in a hexagon shape. The beam path of the laser beam 9a is a beam path shown at the arrow in FIG. 45, and the similar operation and effects are obtained.

That is, the Embodiments 30, 31 and 32 are characterized in that a plurality of discharge spaces each having a rectangular section are arranged in a polygon shape in section, the laser beam 9a is turned back and reflected by the turn-back type reflection mirrors 7 and 8 to reciprocate it plural times, and the laser beam to be turned back and reflected passes through all the discharge spaces and are amplified whereby it can be handled as a single beam path. Accordingly, the discharge spaces are provided in a the number which can be arranged in a polygon shape and the number is not limited.

EMBODIMENT 33

Figure 46:
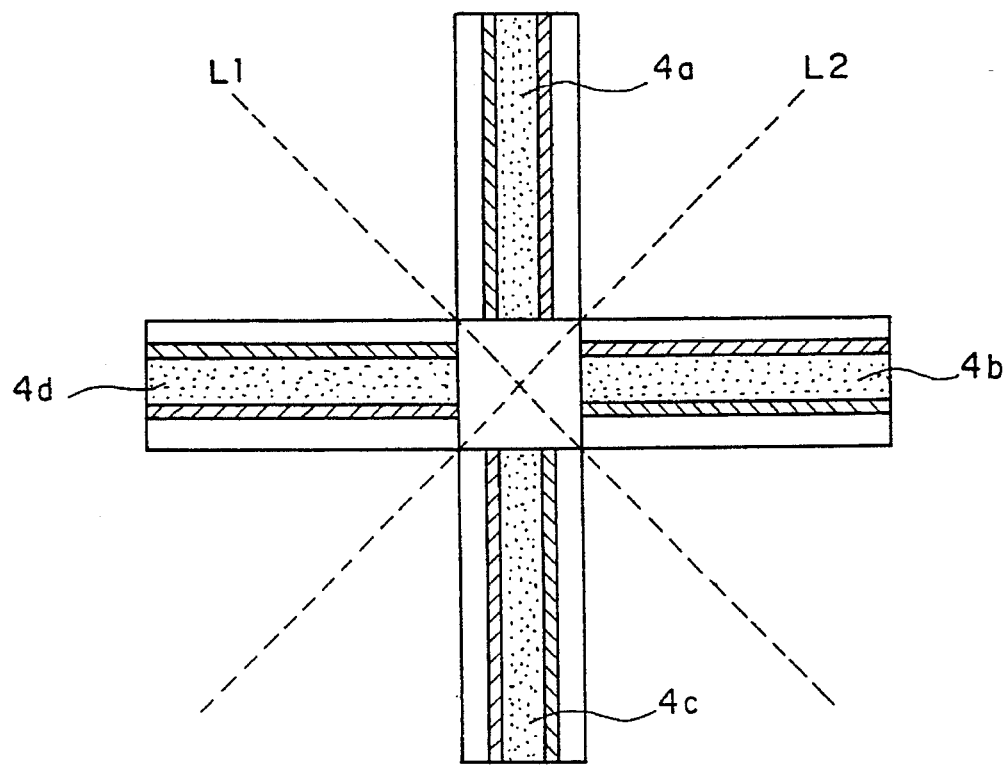
FIG. 46 is a view showing the arrangement of a rectangular discharge space of the laser apparatus according to an Embodiment 33 of the present invention.
Figure 47:
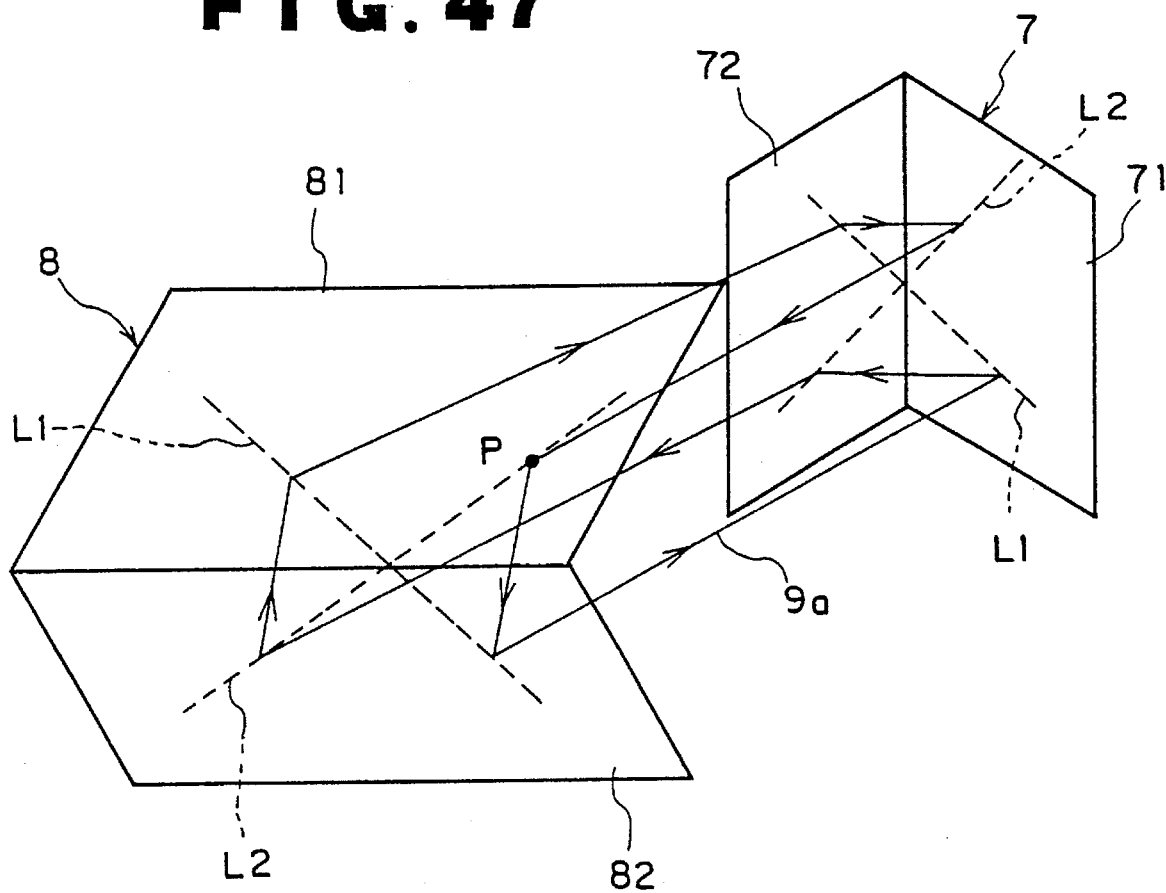
FIG. 47 is a view showing a laser beam light path shown in FIG. 46.

FIG. 46 is a sectional view showing essential parts of a waveguide path type $CO_2$ laser apparatus according to Embodiment 33 of the present invention. FIG. 47 is a perspective view showing a beam path of a laser beam shown in FIG. 46.

In this Embodiment 33, rectangular sections of four discharge spaces 4a to 4d are arranged at equal intervals about a point of intersection of two linear symmetrical axes L1 and L2 intersecting perpendicularly to each other.

With this construction, there is obtained a beam path of a laser beam 9a indicated at the arrow in FIG. 47. Accordingly, the operation and effects similar to the case of the Embodiment 30 are obtained. The linear symmetrical axes L1 and L2 mean the fact similar to that mentioned in connection with the Embodiment 30 (FIG. 40).

EMBODIMENT 34

Figure 48:
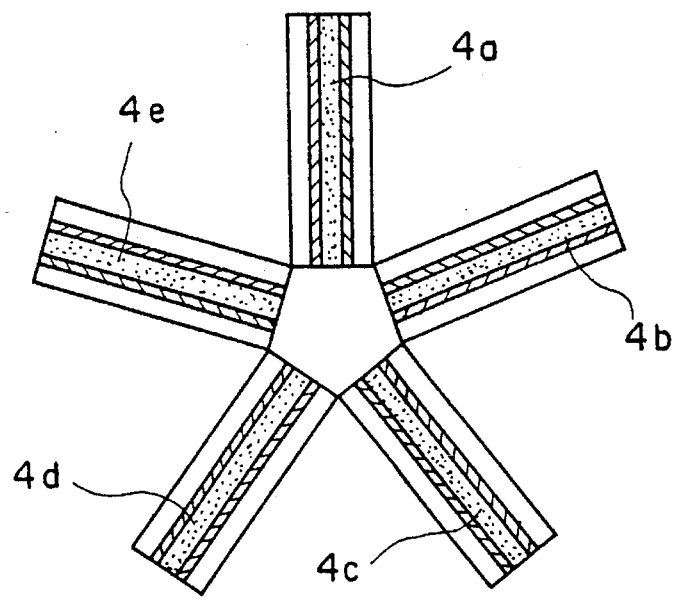
FIG. 48 is a sectional view showing essential parts of a waveguide path type $CO_2$ laser apparatus according to an Embodiment 34 of the present invention.

FIG. 48 is a sectional view showing essential parts of a waveguide path type $CO_2$ laser apparatus according to Embodiment 34 of the present invention.

In the Embodiment 33, the rectangular sections of the four discharge spaces 4a to 4d are arranged at equal intervals in the radial direction, whereas in this Embodiment 34, rectangular sections of five discharge spaces 4a to 4e are radially arranged at equal intervals. A beam path of a laser beam obtained in this case is similar to that shown in FIG. 42. Accordingly, the similar operation and effects are obtained.

EMBODIMENT 35

Figure 49:
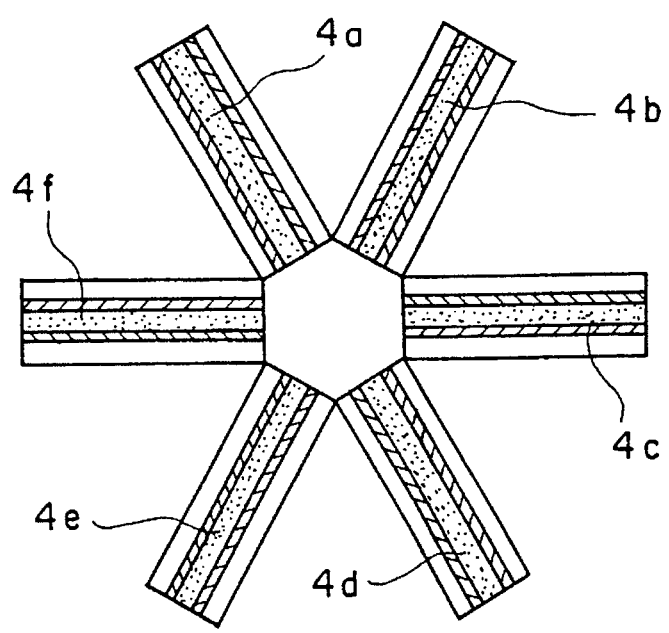
FIG. 49 is a sectional view showing essential parts of a waveguide path type $CO_2$ laser apparatus according to an Embodiment 35 of the present invention.

FIG. 49 is a sectional view showing essential parts of a waveguide path type $CO_2$ laser apparatus according to Embodiment 35 of the present invention.

In this Embodiment 35, rectangular sections of six discharge spaces 4a to 4f are radially arranged at equal intervals. Accordingly, also in this case, the similar operation and effects are obtained.

While in the aforementioned Embodiments 33 to 35, the case has been described in which four to six discharge spaces are radially arranged, it is to be noted that the number of the discharge spaces is not limited but rectangular sections of a plurality of discharge spaces may be radially arranged so that at least two linear symmetrical axes or more may be obtained.

EMBODIMENT 36

Figure 50:
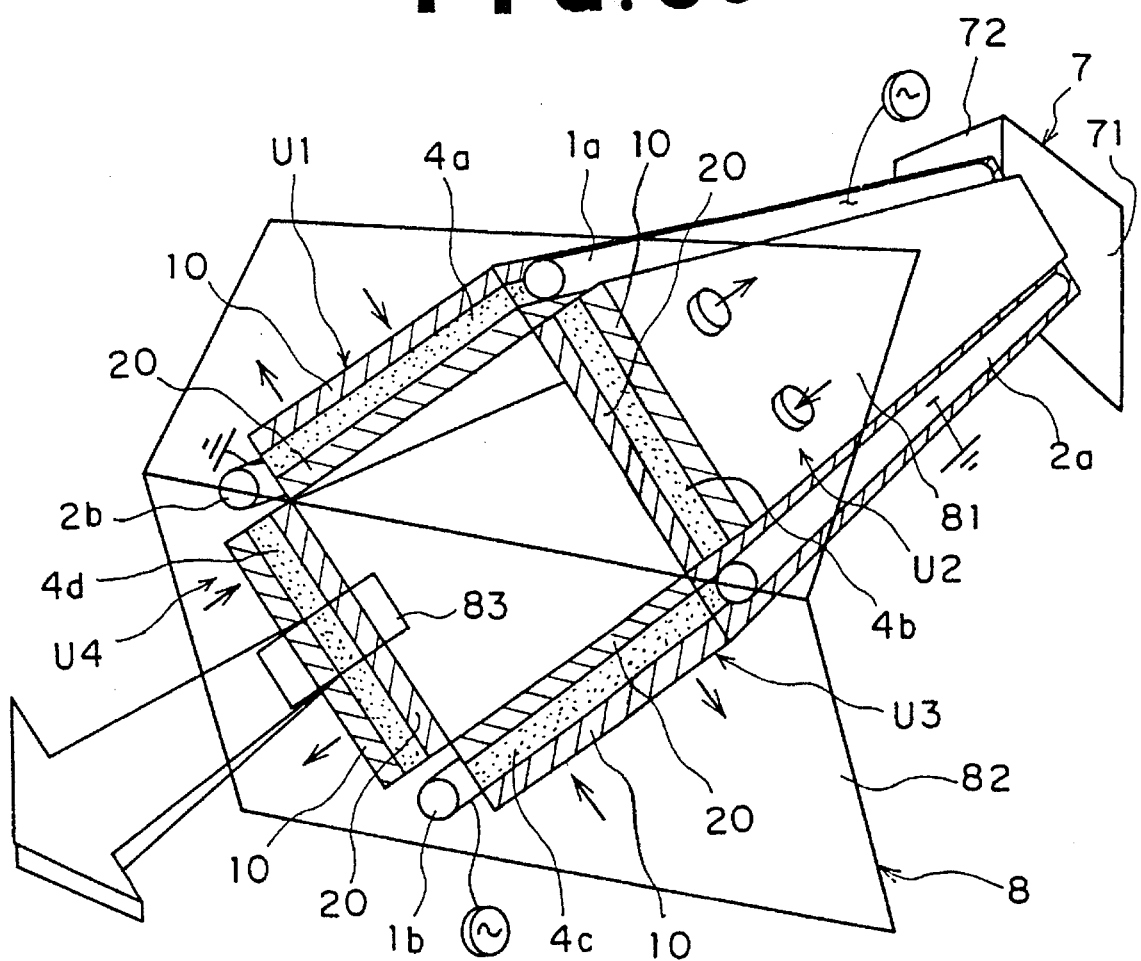
FIG. 50 is a perspective view of a laser apparatus according to an Embodiment 36 of the present invention.

FIG. 50 is a perspective view of a laser apparatus according to Embodiment 36 of the present invention. The fundamental structure of the Embodiment 36 is similar to that of the aforementioned Embodiment 30. However, in the Embodiment 36, rod-like metal electrodes 1a, 2a and 1b, 2b are used in place of the flat plate-like metal electrodes 1, 2 in the Embodiment 30.

That is, in the Embodiment 36, a pair of flat plate-like dielectric plates 10, 20 are opposed to each other form one unit. Such four units U1 to U4 are arranged so that rectangular sections of discharge spaces 4a to 4d assume a square shape, and the four rod-like metal electrodes 1a, 2a and 1b, 2b are arranged in the direction of and along the major sides on both sides of the discharge spaces 4a to 4d.

With such a construction, the discharge is caused in the direction of the major side of the respective discharge spaces 4a to 4d each having a rectangular section. Also in this case, the dielectric plates 10 and 20 are being cooled, whereby the laser gas is cooled through the dielectric plates 10 and 20. Accordingly, the effect similar to that of the Embodiment 30 is obtained.

While in the Embodiment 36, the case has been described in which four discharge spaces 4a to 4d are present, it is to be noted that the number thereof is not limited.

EMBODIMENT 37

Figure 51:
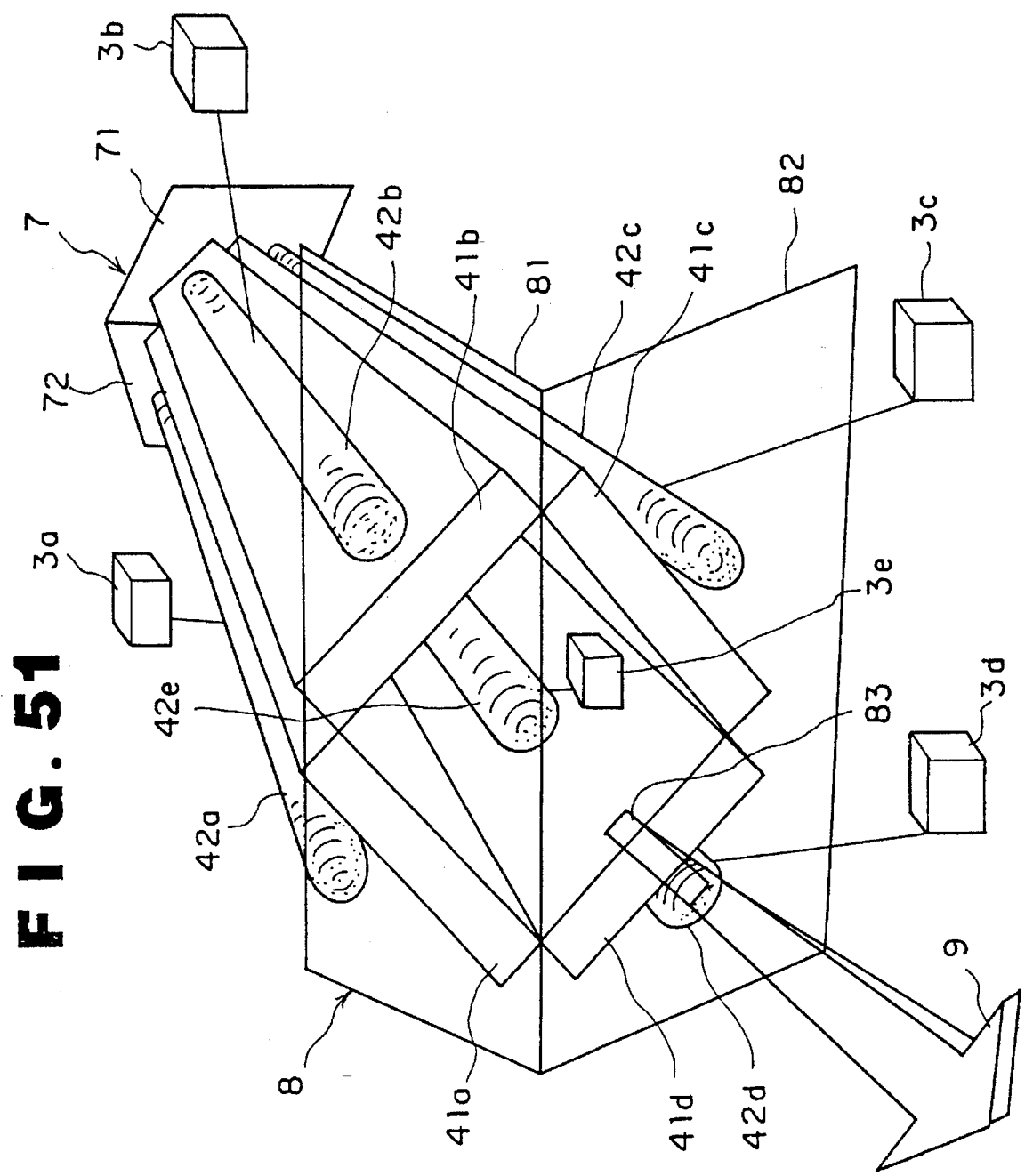
FIG. 51 is a perspective view of a solid laser apparatus according to an Embodiment 37 of the present invention.

FIG. 51 is a perspective view of a solid laser apparatus according to Embodiment 37 of the present invention.

The solid laser apparatus according to the Embodiment 37 is a YAG slab laser apparatus in which a slab type solid laser medium is used as a laser light excitation medium, the laser medium is comprised of YAG ($Y_{3-k}N_{dx}Al_5O_{12}$) and the shape thereof is slab-like.

In the figure, reference numerals 41a to 41d represent four solid elements comprised of a YAG crystal having a slab shape. These solid element 41a to 41d are arranged in a square shape in section.

Reference numerals 42a to 42e represent light sources for exciting the solid elements 41a to 41d. These light sources 42a to 42e consist of external light sources 42a to 42d arranged along the lengthwise of the surfaces of the solid elements 41a to 41d, and an internal light source 42e arranged in the center portion of a space portion surround by the solid elements 41a to 41d.

Reference numerals 3a to 3e designate power sources for lighting the light sources 42a to 42e, and reference numerals 7 and 8 designate reflection mirrors of the turn-back reflection type. These reflection mirrors 7 and 8 are arranged with the beam turn-back directions differentiated at 90° similar to the case of the aforementioned Embodiment 30. Reference numeral 83 designates a laser beam emitting port, and numeral 9 designates a laser beam emitted from the laser beam emitting port 83.

The operation of the Embodiment 37 is substantially similar to that of the Embodiment 30. The laser beams amplified by the four solid elements 41a to 41d provided in the YAG slab laser apparatus are turned back and reflected plural times by the reflection mirrors 7 and 8 to thereby form a solidly joined beam path.

Accordingly, one laser beam 9 is emitted from the laser beam emitting port 83. The function of the reflection mirrors 7 and 8 is exactly the same as that of the Embodiment 30.

While in the Embodiment 37, four solid elements 41a to 41d are arranged in a square shape in section, it is to be noted that the number of the solid elements is not limited but the number of solid elements capable of being arranged in a polygonal shape in section will suffice. In any case, the effect similar to that of the Embodiment 30 is obtained, and a higher output of laser can be attained.

EMBODIMENT 38

Figure 52:
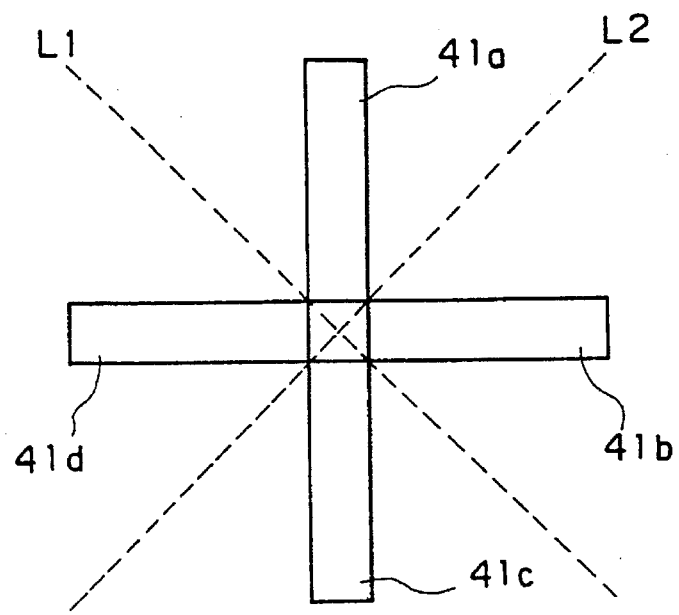
FIG. 52 is a view showing the arrangement of a solid laser medium according to an Embodiment 38 of the present invention.

FIG. 52 is a view showing the arrangement of a solid laser medium of a solid laser apparatus according to Embodiment 38 of the present invention.

In the Embodiment 38, four solid element 41a to 41d are arranged in a cross shape in section so as to obtain at least two linear symmetrical axes L1 and L2. Also in this case, the similar effects are obtained.

EMBODIMENT 39

Figure 53:
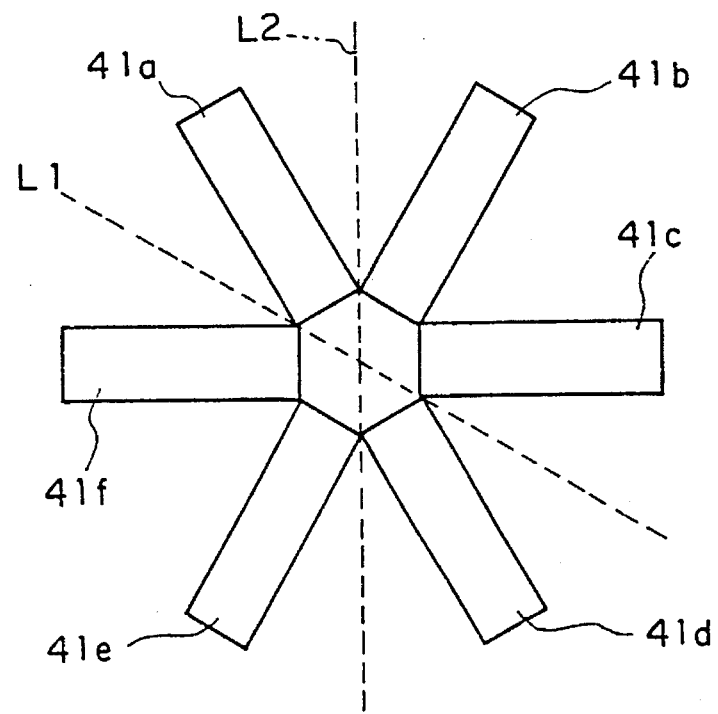
FIG. 53 is a view showing the arrangement of a solid laser medium of a solid laser apparatus according to an Embodiment 39 of the present invention.

FIG. 53 is a view showing the arrangement of a solid laser medium of a solid laser apparatus according to Embodiment 39 of the present invention.

In the Embodiment 39, six solid elements 41a to 41f are used. These solid elements 41a to 41f are radially arranged at equal intervals about a point of intersection of these two linear symmetrical axes L1 and L2. The effects similar to that of the Embodiment 37 are obtained.

EMBODIMENT 40

Figure 54:
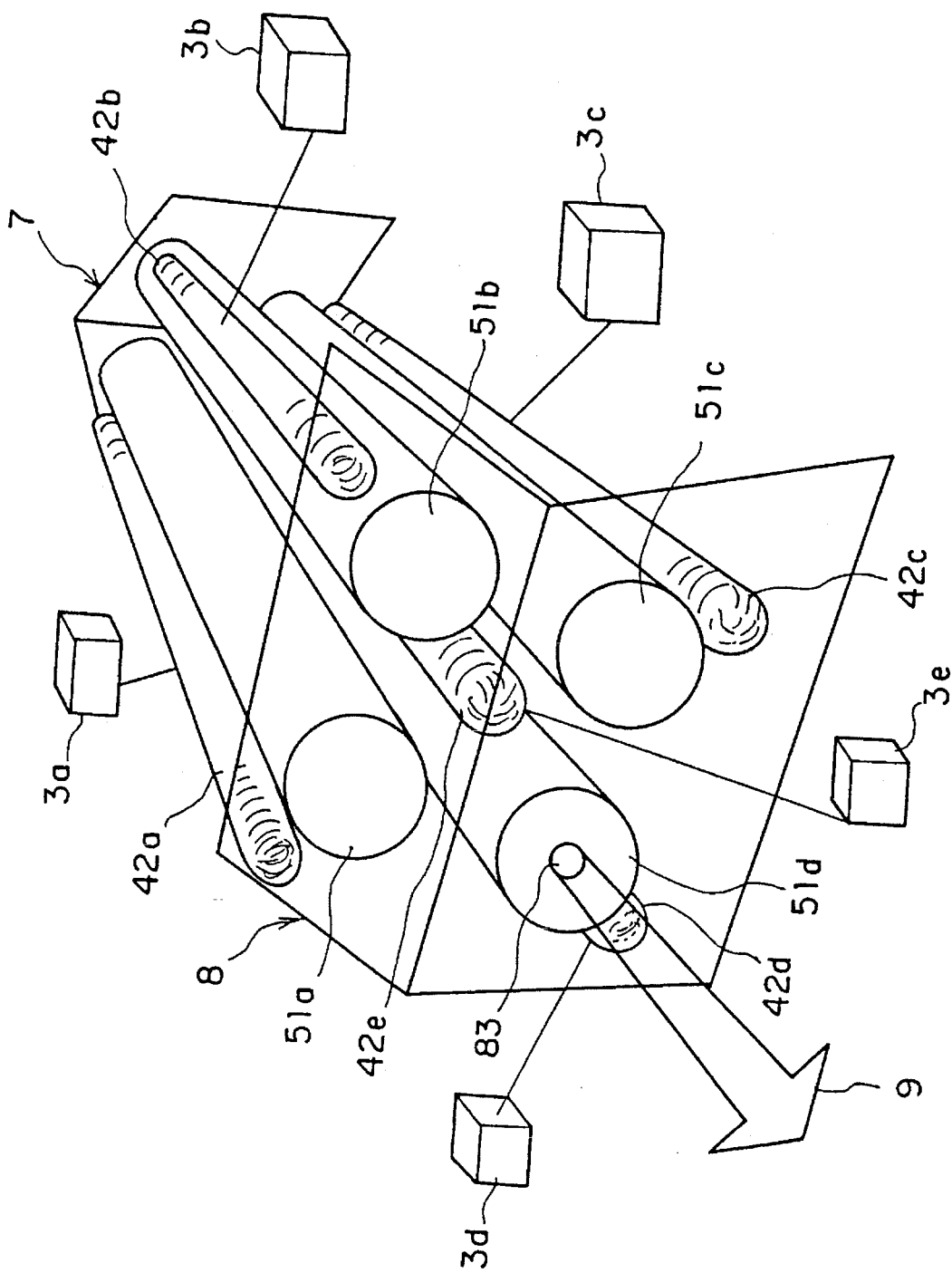
FIG. 54 is a perspective view of a solid laser apparatus according to an Embodiment 40 of the present invention.

FIG. 54 is a perspective view of a solid laser apparatus according to Embodiment 40 of the present invention.

In the Embodiment 40, the flat plate-like solid elements 41a to 41d in the Embodiment 37 are replaced by rod-like solid elements 51a to 51d. Other structures are similar to those of the Embodiment 37, and accordingly, the operation and effects are similar.

It is to be noted that also in the Embodiment 39, the number of solid elements is not limited.

EMBODIMENT 41

Figure 55:
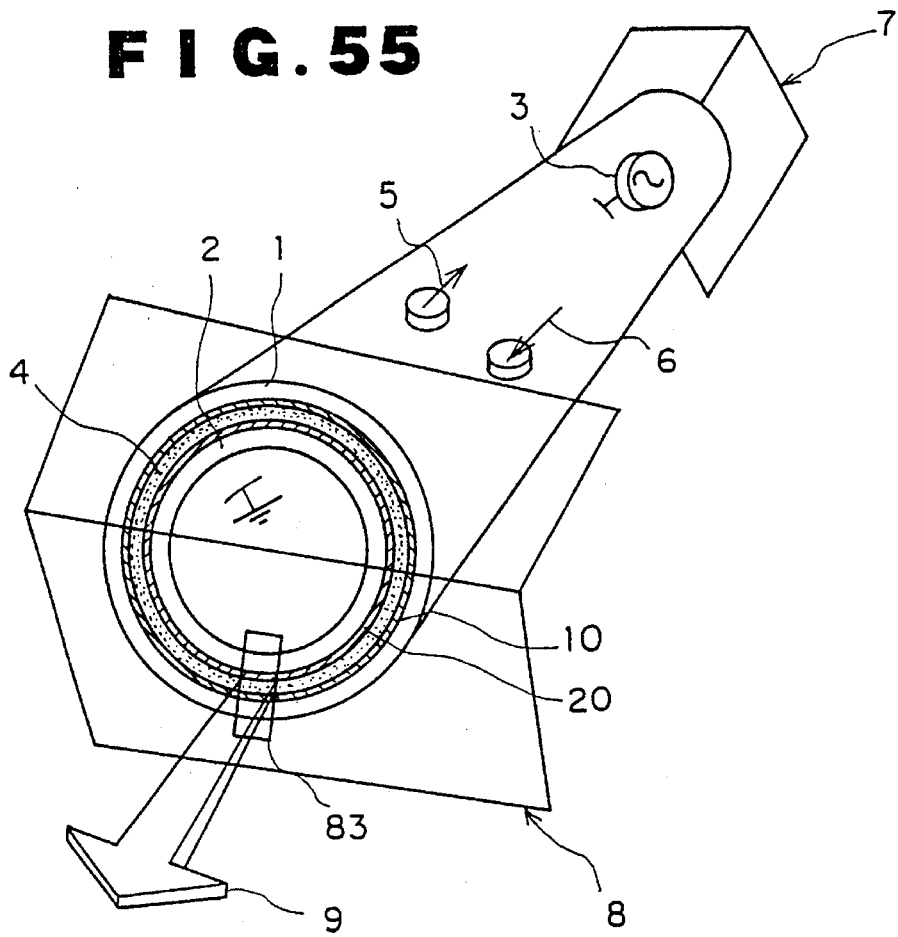
FIG. 55 is a perspective view showing a waveguide path type $CO_2$ laser apparatus according to an Embodiment 41 of the present invention.

FIG. 55 is a perspective view showing essential parts of a waveguide path type $CO_2$ laser apparatus according to Embodiment 41 of the present invention.

In the waveguide path type $CO_2$ laser apparatus in the aforementioned Embodiments 30 to 33, a plurality of rectangular discharge spaces are used, whereas in the Embodiment 41, a single discharge space 4 is formed in a circular shape in section. That is, in the Embodiment 41, metal electrodes 1, 2 and dielectrics 10, 20 are in the form of a circular pipe, which are arranged in a coaxial multiple tubular fashion. Thereby, a single circular discharge space 4 is formed between the circular dielectrics 10 and 20, and reflection mirrors 7 and 8 similar to those of the aforementioned Embodiments 30 to 33. The similar effects are obtained.

EMBODIMENT 42

Figure 56:
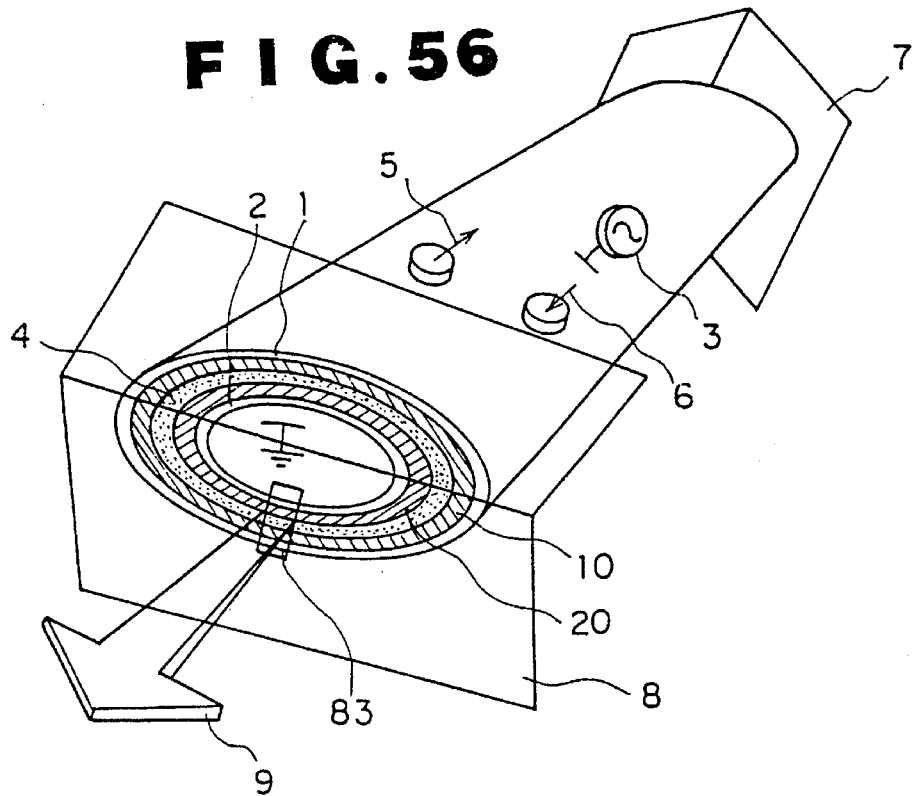
FIG. 56 is a perspective view showing essential parts of a waveguide path type $CO_2$ laser apparatus according to an Embodiment 42 of the present invention.

FIG. 56 is a perspective view showing essential parts of a waveguide path type $CO_2$ laser apparatus according to the Embodiment 42 of the present invention.

In this Embodiment 42, a single discharge space 4 in the Embodiment 40 is formed into an oval shape. Accordingly, the similar effect is obtained even in this case.

EMBODIMENT 43

Figure 57:
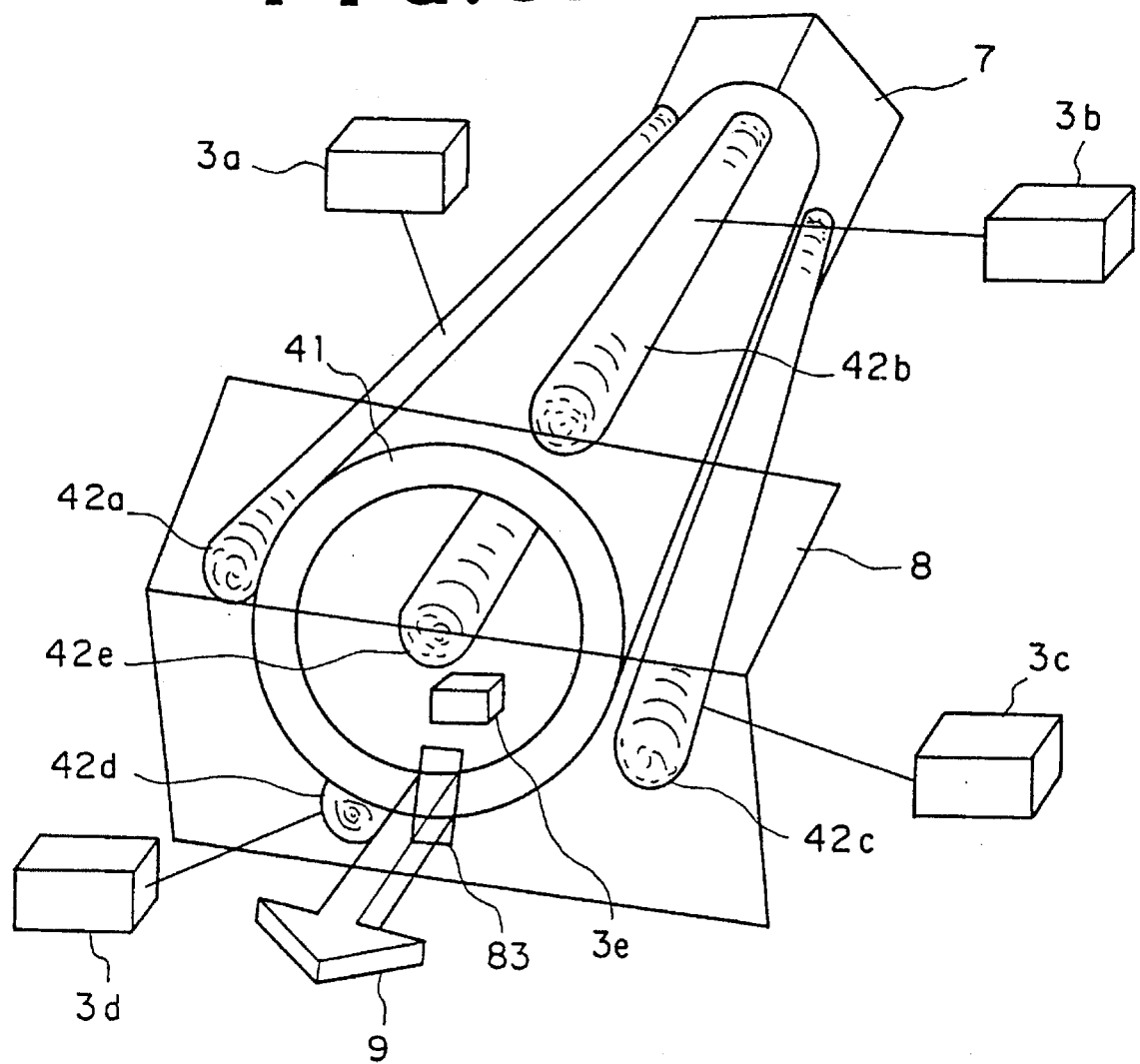
FIG. 57 is a perspective view of a solid laser apparatus according to an Embodiment 43 of the present invention.

FIG. 57 is a perspective view of a solid laser apparatus according to Embodiment 43 of the present invention. In the above-described Embodiments 37 to 39, a solid laser apparatus having a plurality of slab-shaped solid elements is described whereas in the Embodiment 43, a single solid element 41 is formed into a circular tubular configuration. Other structures are similar to those of the Embodiment 37 (FIG. 51). Even a solid laser apparatus having a single circular and annular solid element 41, the similar effects are obtained.

EMBODIMENT 44

Figure 58:
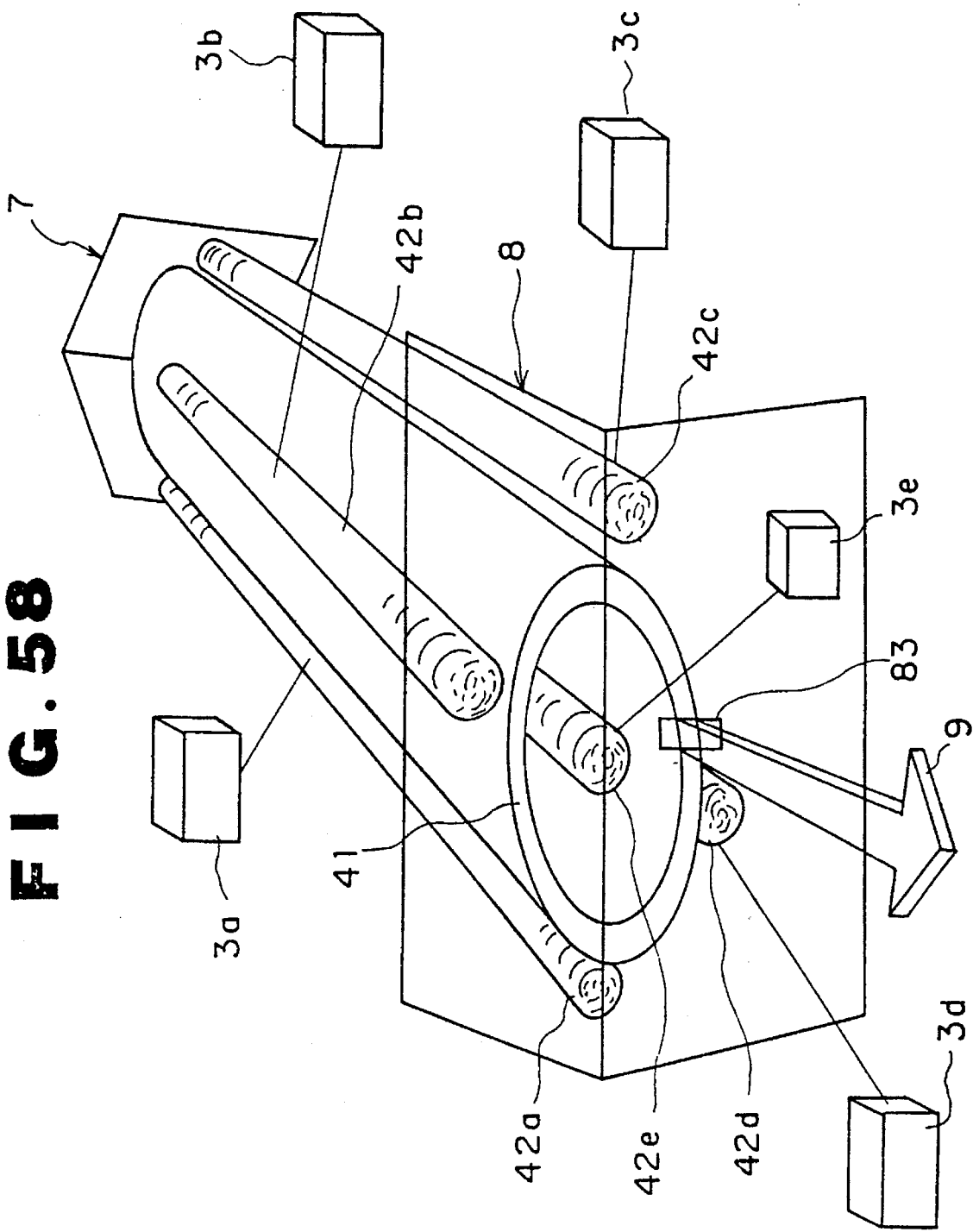
FIG. 58 is a perspective view showing essential parts of a solid laser apparatus according to an Embodiment 44 of the present invention.

FIG. 58 is a perspective view showing essential parts of a solid laser apparatus according to Embodiment 44 of the present invention.

In the Embodiment 44, a single discharge space 4 in the Embodiment 42 is formed into an oval shape. Accordingly, also in this case, the similar effects are obtained.

EMBODIMENT 45

Figure 59:
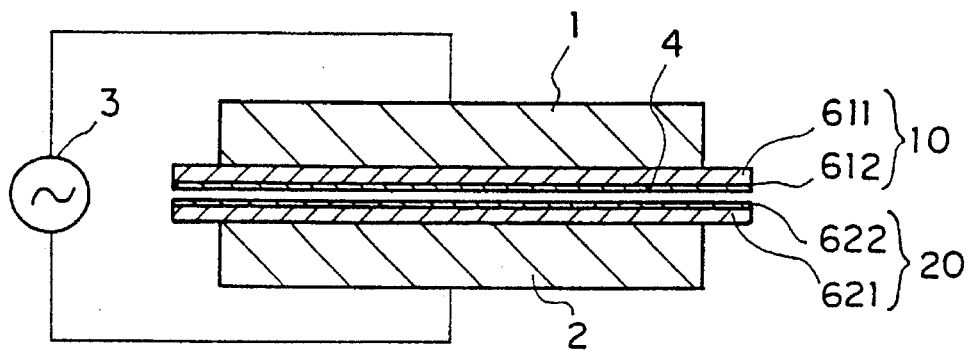
FIG. 59 is a sectional view showing essential parts of a waveguide path type $CO_2$ laser apparatus according to an Embodiment 45 of the present invention.

FIG. 59 is a sectional view showing essential parts of a waveguide path type $CO_2$ laser apparatus according to Embodiment 45 of the present invention. The fundamental configuration of Embodiment 45 is similar to that of the prior art example (FIG. 69).

In this Embodiment 45, dielectric plates 10 and 20 are formed from two kinds of dielectric layers 611, 612 and 621, 622 which are different in dielectric constant from each other.

The two kinds of dielectric layers 611, 612 and 621, 622 may be connected by electric insulative adhesive layers or may be connected by conductive materials. In this case, on the side of metal electrodes 1 and 2, there are provided high dielectric-constant layers 611, 621 formed of a high dielectric-constant material (dielectric constant $\epsilon_H$), and on the side of the waveguide path (discharge side), there are provided low dielectric-constant layers 611, 622 formed of a low dielectric-constant material (dielectric constant: $\epsilon_L$).

A thickness (tH) of the high dielectric-constant layers 611, 621 is set to be thicker (tH>tL) than a thickness (tL) of the low dielectric-constant layers 612, 622.

The operation of the Embodiment 45 is basically similar to the case of the conventional apparatus shown in FIG. 69. When an alternating voltage is applied to the metal electrodes 1 and 2, laser excitation is effected by the discharge occurred in the discharge space 4. Since the low dielectric-constant layers 612, 622 are formed on the waveguide path surface on which laser beam is reflected, the propagation loss of light can be minimized as will be understood from the above-described formula (1).

Next, the electric characteristics will be mentioned. When a sine wave voltage is applied, an energy: discharge power Wd charged into the discharge space 4 is given by the following formula (5):

$$Wd = f\pi C d V^* \sqrt{V2op - V^{*2}} \quad (5)$$

wherein f represents the power source frequency, V* represents the discharge voltage, and Vop represents the crest value of the applied voltage. Cd represents the electrostatic capacity of the dielectrics 10 and 20. In the case where the dielectrics 10 and 20 are formed of a composite material (the electrostatic capacity: $(C_H, C_L)$ as shown in FIG. 59, the electrostatic capacity is as follows:

$$Ceff = \frac{C_H C_L}{C_H + C_L} \quad (6)$$

From the area S and the thickness t of the dielectric plates 10 and 20 and the specific permeability $\epsilon$, the electrostatic capacity C is as follows:

$$C = \epsilon_0 \epsilon \frac{S}{t} \quad (7)$$

So, if the thickness ($t_H$) of the high dielectric-constant layers 611 and 621 is set to be sufficiently thicker ($t_H > t_L$) than the thickness ($t_L$) of the low dielectric constant layers 612 and 622, $$C_L \gg C_H \quad (8)$$

is given from the formula (7).

It is understood from the formulae (6) and (8) that the effective electrostatic capacity Ceff substantially accords with the capacity $C_H$ of the high dielectric-constant layers 611 and 621 ($C_{iH} = C_{iL}$).

That is, even if the low dielectric-constant layers 612, 622 are plated on the high dielectric-constant layers 611, 621, if its thickness increases, the electric characteristics remain unchanged, and the similar discharge characteristics are obtained.

In the waveguide path type laser apparatus, the functions required by the dielectrics 10 and 20, that is, the electric performance related to the discharge and the optical performance related to the light propagation are shared with the dielectrics 10 and 20 layers. Therefore, the low dielectric-constant materials which are hard to be sintered that could not be used heretofore for the apparatus of this kind and the materials from which thick plates could not be fabricated due to the weak thermal distortion are rendered possible to use to extremely widen an allowance of materials to be used.

EMBODIMENT 46

Figure 60:
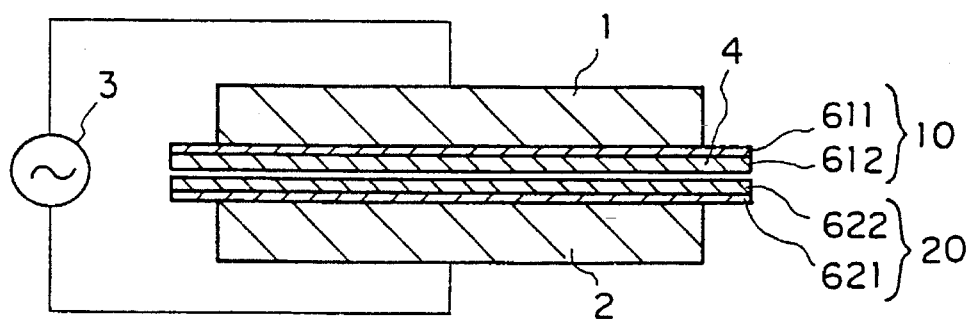
FIG. 60 is a sectional view showing essential parts of a waveguide path type $CO_2$ laser apparatus according to an Embodiment 46 of the present invention.

In the aforementioned Embodiment 45, the case has been disclosed in which the low dielectric-constant layers 612, 622 are made to be sufficiently thin. In the case where the power source frequency to be used is sufficiently high, even an extremely low voltage a high power can be used as will be apparent from the aforementioned formula (5). In this case, not much electric characteristics are not required for the dielectric plates 10 and 20. In the case of such conditions as described, it is not necessary to make the low dielectric-constant layers 612, 622 sufficiently thinner than the high dielectric-constant layers 611, 621 but as shown in FIG. 60, the thickness of the high dielectric-constant layers 611, 621 may be made to be substantially equal to that of the low dielectric-constant layers 612, 622, or the relationship of the thickness therebetween may be reversed.

EMBODIMENT 47

Figure 61:
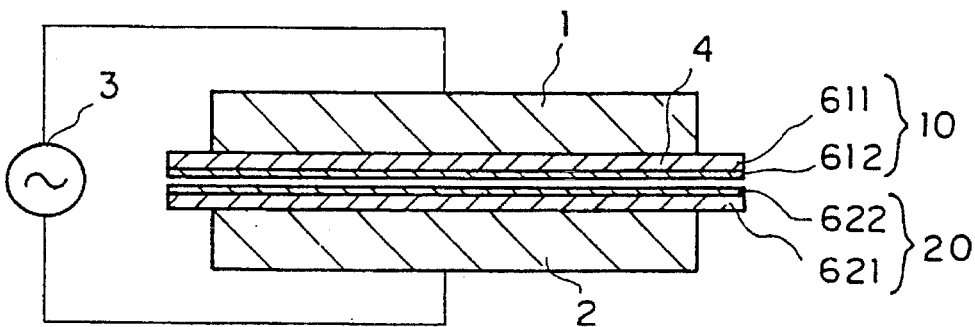
FIG. 61 is a sectional view showing essential parts of a waveguide path type $CO_2$ laser apparatus according to an Embodiment 47 of the present invention.

In the Embodiments 45 and 46, the case has been described in which two dielectric materials are superimposed for use. However, as shown in FIG. 61, the low dielectric-constant layers 612, 622 may be formed on the surfaces of the high dielectric-constant layers 611, 621 by flame spraying. Of course, the low dielectric-constant materials may be coated by processes other than the flame spraying to obtain the similar effects.

EMBODIMENT 48

In the case of a carbon dioxide gas laser of wavelength 10.6 μm, preferable materials used for the low dielectric-constant layers 612, 622 are BeO or AlN.

EMBODIMENT 49

In the Embodiments 45 to 48, the $CO_2$ laser apparatus has been described, but of course it can be applied to the waveguide path type laser apparatus.

EMBODIMENT 50

Figure 62:
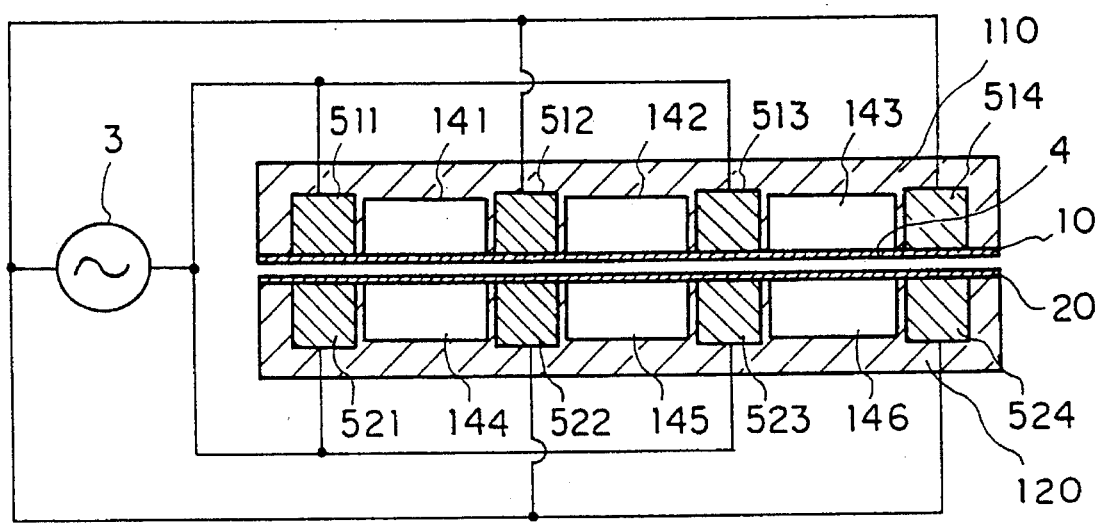
FIG. 62 is a sectional view showing essential parts of a waveguide path type $CO_2$ laser apparatus according to an Embodiment 50 of the present invention.

FIG. 62 is a sectional view of a laser apparatus according to Embodiment 50 of the present invention. The fundamental structure of Embodiment 50 is similar to that of prior art example (FIG. 69). This sectional view is viewed from the direction of an optical axis but it can be likewise viewed from the direction intersecting perpendicularly to the optical axis.

In FIG. 62, reference numerals 511 to 513 and 521 to 524 are individually divided metal electrodes. In these metal electrodes 1, voltages different in polarity or voltage phase are applied to metal electrodes 511 and 512, 512 and 513, 521 and 522, and 522 and 523 adjacent to each other, and voltages of the same phase are applied to metal electrodes 511 and 521, 512 and 522, and 513 and 523 opposed to the discharge space 4.

In order to enhance the cooling of a laser gas, electrically floated cooling pipes 141 to 143 and 144 to 146 are respectively disposed between the metal electrodes 511, 512 and 513, and between 521, 522 and 523. These are cooled along with a feeder pipe.

The laser gas is cooled by the cooling pipes 141 to 146 through the dielectric plates 10 and 20. Further, in order to prevent the discharge breakage other than the discharge space 4, the metal electrodes 511 to 514 and 521 to 524 are molded by the dielectrics 110 and 120. That is, when alternating voltages are applied to the metal electrodes 511 to 514 and 521 to 524, the discharge lengthwise of the discharge space 4 occurs between the adjacent metal electrodes (for example, 511 and 512) which are different in polarity. At that time, the creeping-discharge or the like sometimes occurs in portions other than the discharge space 4. Therefore, the metal electrodes 511 to 514 and 521 to 524 are molded by the dielectrics 110 and 120. For materials of the dielectrics 110 and 120 used, properties such that insulation is excellent (voltage resistance: 5 kV/mm or more); an organic material less generates; and a flexibility after hardened is provided. Therefore, fillers of a silicon family are most suitable for use.

According to the configuration of the Embodiment 50, it is extremely easy to set the effective gas length of the discharge to be long as previously mentioned.

That is, the object is achieved by setting the spacing between the metal electrodes 511 to 514 and 521 to 524 adjacent to each other to be large. Since the spacing between the metal electrodes can be suitably set, the optimization can be provided according to the power source frequency to be used. That is, in case of the low power source frequency, the spacing between the metal electrodes 1 may be set long. However, when the spacing between the metal electrodes 1 becomes long to some extent, the cooling efficiency of gas lowers, but the cooling pipes 141 to 146 are arranged between the metal electrodes adjacent to each other as shown in FIG. 62, thus being more effective. It is to be noted that the cooling pipes 141 to 146 may be electrically floated or installed as previously mentioned.

Figure 63:
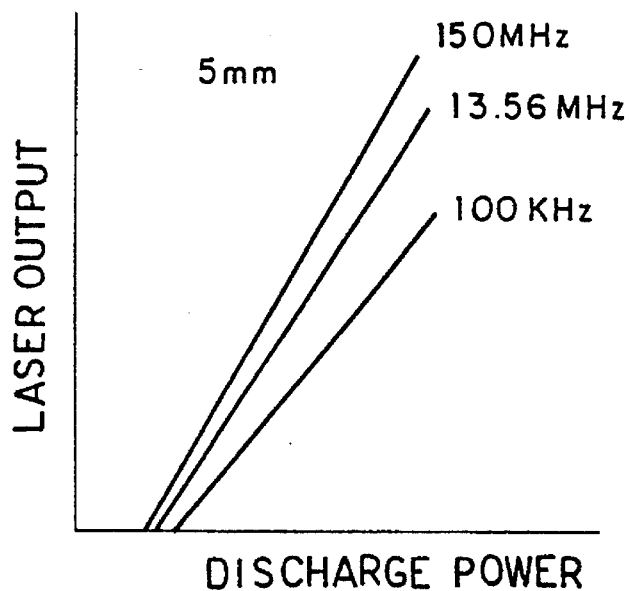
FIG. 63 is a view showing the characteristics under the condition that the spacing between electrodes of the laser apparatus shown in FIG. 62 is 5 mm.
Figure 64:
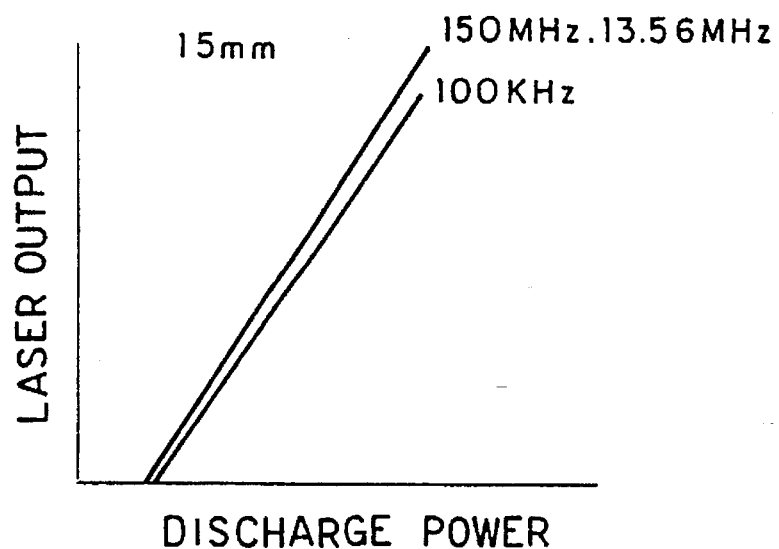
FIG. 64 is a view showing the characteristics under the condition that the spacing between electrodes of the laser apparatus shown in FIG. 62 is 15 mm.

FIGS. 63 and 64 show the results obtained by investigating the dependability of the power source frequency of the laser output wherein the spacings between the metal electrodes 511 to 514 and 521 to 524 are 5 mm and 15 mm, respectively, under the condition that the gas length is 2 mm. In the case of 5 mm (FIG. 63), the excitation efficiencies of 150 MHz and 13.56 MHz are nearly the same, and in the case of 15 mm (FIG. 64), the excitation efficiency of 100 KHz is also nearly the same. It has been found that the laser excitation efficiency in a low frequency region has been improved.

EMBODIMENT 51

Figure 65:
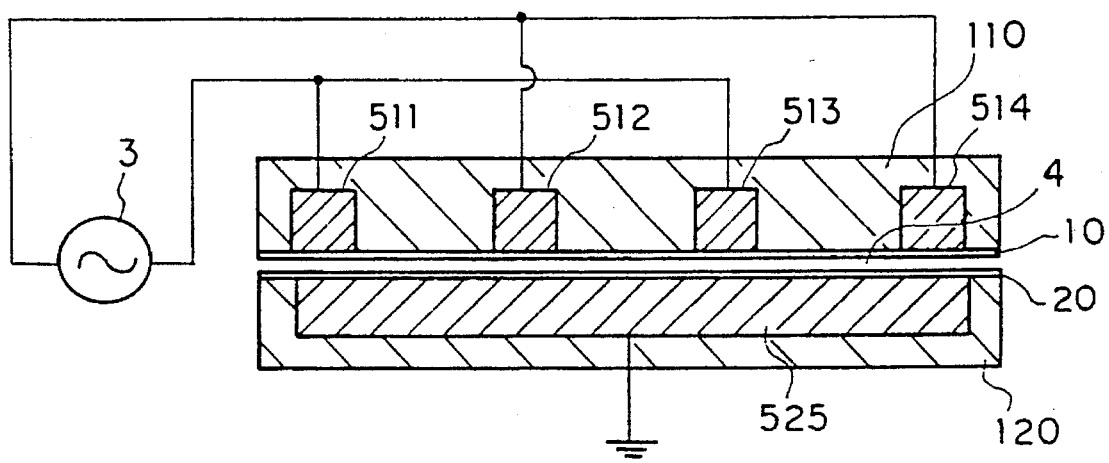
FIG. 65 is a sectional view showing a waveguide path type $CO_2$ laser apparatus according to an Embodiment 51 of the present invention.

While in the Embodiment 50, the case has been described where the voltages of the same phase are applied to the metal electrodes 511 and 521, 512 and 522, and 513 and 523 opposed to the discharge space 4, it is to be noted that one of opposed metal electrodes 525 need not be divided as shown in FIG. 65 but it may be installed or electrically floated.

EMBODIMENT 52

Figure 66:
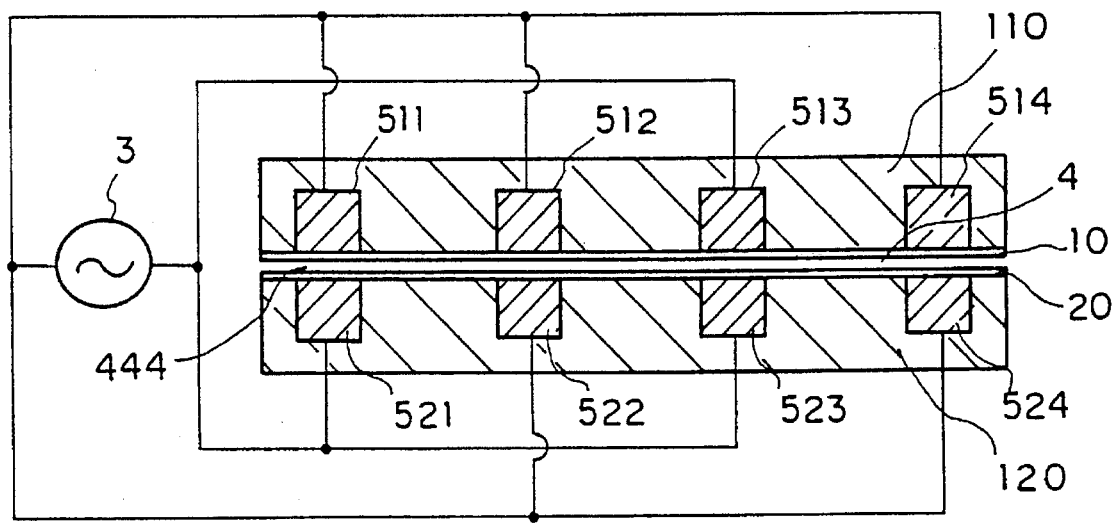
FIG. 66 is a sectional view showing essential parts of a waveguide path type $CO_2$ laser apparatus according to an Embodiment 52 of the present invention.

As shown in FIG. 66, when a voltage different in phase is applied to a part (in the figure, 511 and 521) of the metal electrodes opposed to the discharge space 4, the discharge occurs between the metal electrodes 511 and 521 with an extremely low voltage to facilitate the start of other discharges, and enable the enhancement of stability of the discharge. This may result from the preliminary ionization effect of the space caused by charged particles or ultraviolet rays generated from the discharge 444. Even in the case where either the metal electrode 511 or 521 is grounded, the similar effects are obtained.

EMBODIMENT 53

Figure 67:
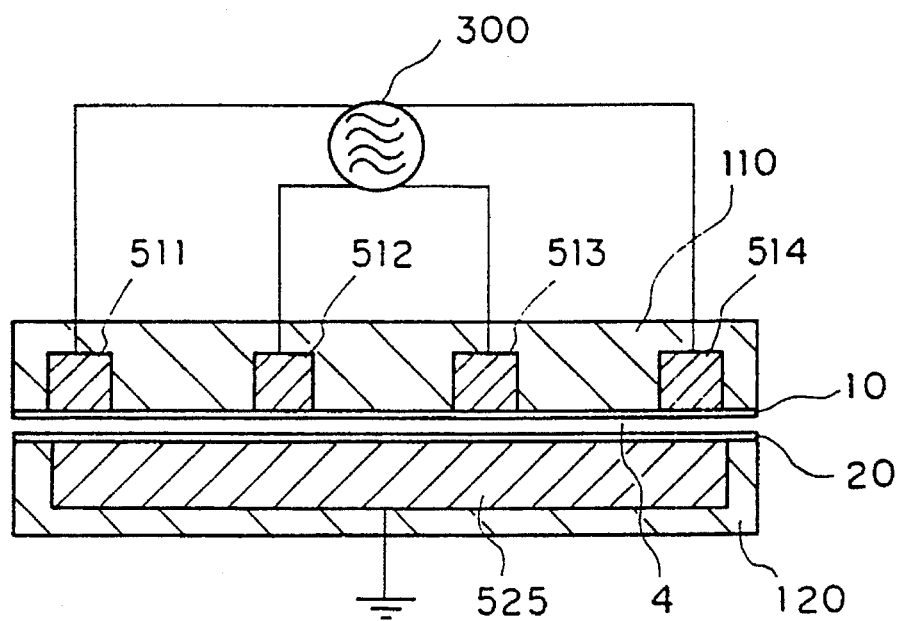
FIG. 67 is a sectional view showing essential parts of a waveguide path type $CO_2$ laser apparatus according to an Embodiment 53 of the present invention.

In this Embodiment 53, a polyphase power source 300 is used as shown in FIG. 67 to vary a movement of voltage to be applied to the metal electrodes adjacent to each other. In this way, the effects similar to those mentioned in connection with the Embodiments 50 to 53 are obtained. While here, an example of four-phase power source has been shown, it is to be noted that three-phase or other polyphase power sources may be used of course.

EMBODIMENT 54

Figure 68:
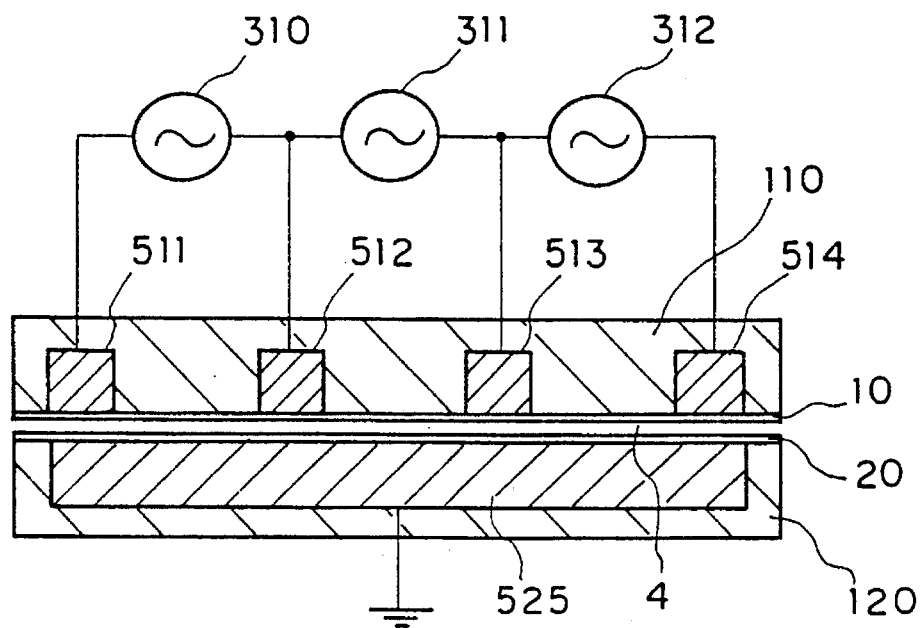
FIG. 68 is a sectional view showing essential parts of a waveguide path type $CO_2$ laser apparatus according to an Embodiment 54 of the present invention.

In this Embodiment, a plurality of power sources 310, 311 and 312 are used as shown in FIG. 68. Also in this case, the similar effects are obtained.

EMBODIMENT 55

While in the Embodiments 50 to 54, the $CO_2$ laser apparatus has been described, it is to be noted that other gas lasers such as a CO laser which require for excitation with low energy can be also employed.

It is to be noted that the present invention is not limited to the embodiments described above and many changes and modifications can be made thereto without departing from the spirit and scope of the invention as set forth herein.

What is claimed is:

1. A laser apparatus comprising: means defining a discharge space having a doughnut-like annular section comprising an outer pipe and an inner pipe coaxially disposed, an inner periphery of said outer pipe and an outer periphery of said inner pipe being utilized as waveguide paths for a laser beam that is output by said discharge space in a direction intersecting perpendicularly to said annular section; and two or more electrodes for applying an alternating voltage disposed in the outer periphery of said outer pipe, wherein said outer pipe is formed from a dielectric.

2. A laser apparatus comprising: means defining a discharge space having a doughnut-like annular section comprising an outer pipe and an inner pipe coaxially disposed, an inner periphery of said outer pipe and an outer periphery of said inner pipe being utilized as waveguide paths for a laser beam that is output by said discharge space in a direction intersecting perpendicularly to said annular section; and two or more electrodes for applying an alternating voltage juxtaposed in the direction of outputting a laser beam in the outer periphery of said outer pipe, wherein said outer pipe is formed from a dielectric.

3. A laser apparatus according to claim 1 or 2, wherein said inner pipe is formed from a conductor.

4. A laser apparatus according to claim 1 or 2, wherein said inner pipe is formed from a dielectric.

5. A laser apparatus according to claim 1 or 2, wherein said inner pipe is constituted by coating a dielectric layer on the outer periphery of a tubular body formed from a conductor.

6. A laser apparatus according to claim 5, wherein said tubular body is grounded.

7. A laser apparatus according to claim 1 or 2, further comprising, in the outer periphery of said outer pipe, electrically floated conductive members alternately disposed with said electrodes for applying a voltage, said electrodes and said conductive members being cooled.

8. A laser apparatus according to either of claims 1 to 2, wherein the inner pipe is cooled.

9. A laser apparatus according to either of claims 1 or 2, further comprising a polyphase alternating power source having more than three phases.

10. A laser apparatus according to either of claims 1 or 2, wherein said electrodes are adjacent to each other, and alternating voltages different in phase are applied to said electrodes.

11. A laser apparatus according to claim 10, further comprising an electrically floated or grounded cooling pipe disposed between electrodes adjacent to each other.

\* \* \* \* \*